United States Patent
Shimizu et al.

(10) Patent No.: US 7,346,588 B2
(45) Date of Patent: Mar. 18, 2008

(54) COST ESTIMATION METHOD AND SYSTEM, AND COMPUTER READABLE MEDIUM FOR THE METHOD

(75) Inventors: Tatsuya Shimizu, Noda (JP); Masayuki Ueda, Ebina (JP); Hikaru Amano, Tokyo (JP); Kenichi Ishida, Tokyo (JP); Masafumi Aoyama, Sagamihara (JP); Yohichiroh Mukunoki, Tokyo (JP); Daiho Sakuragi, Yokohama (JP); Manabu Ogishima, Sagamihara (JP); Yoichi Terashima, Sendai (JP)

(73) Assignee: Ricoh Company Limited, Tokyo (JP)

( * ) Notice: Subject to any disclaimer, the term of this patent is extended or adjusted under 35 U.S.C. 154(b) by 741 days.

(21) Appl. No.: 10/212,687

(22) Filed: Aug. 7, 2002

(65) Prior Publication Data
US 2003/0037014 A1    Feb. 20, 2003

(30) Foreign Application Priority Data
Aug. 7, 2001   (JP)   .............................. 2001-239708
Sep. 11, 2001  (JP)   .............................. 2001-275427

(51) Int. Cl.
*G06Q 99/00* (2006.01)
(52) U.S. Cl. .................. 705/400; 705/1; 705/20; 703/6; 703/7; 700/96
(58) Field of Classification Search .................. 705/1, 705/7, 400; 700/107, 173; 703/1, 4, 6–7
See application file for complete search history.

(56) References Cited

U.S. PATENT DOCUMENTS 5,249,120 A * 9/1993 Foley ............................. 705/1
5,495,430 A * 2/1996 Matsunari et al. ............. 703/6

(Continued)

FOREIGN PATENT DOCUMENTS

| CN | 1189228 A | 7/1998 |
| EP | 1 087 278 A2 | 3/2001 |
| JP | 7-282142 | 10/1995 |
| WO | WO 96/35187 | 11/1996 |

OTHER PUBLICATIONS

Yang, Yung-Nien, Ph.D. , "A prototype manufacturing process planning and scheduling system with a manufacturing cost estimating module", 1998, Dissertation-University of Louisville, 129 pages.*

(Continued)

*Primary Examiner*—John W. Hayes
*Assistant Examiner*—Freda A Nelson
(74) *Attorney, Agent, or Firm*—Oblon, Spivak, McClelland, Maier & Neustadt, P.C.

(57) ABSTRACT

A part cost estimation system including a processing cost information storage device; a shape designating device configured to designate the shape of the part; a processing designating device configured to designate contents of processing to be performed on a material to form the part having the designated shape; a processing facility designating device configured to designate a processing facility; a processing time calculating device configured to calculate a processing time; a processing cost calculating device configured to calculate a processing cost spent on manufacturing the part based on a unit machining cost and the processing cost calculated by the processing time calculating device; and an adding device configured to add the processing cost to determine a cost of the part.

24 Claims, 55 Drawing Sheets

U.S. PATENT DOCUMENTS

| | | | |
|---|---|---|---|
| 5,815,400 A * | 9/1998 | Hirai et al. | 700/173 |
| 6,343,285 B1 * | 1/2002 | Tanaka et al. | 705/400 |
| 6,775,647 B1 * | 8/2004 | Evans et al. | 703/7 |
| 2001/0023418 A1 * | 9/2001 | Suzuki et al. | 705/400 |
| 2002/0023060 A1 * | 2/2002 | Cooney et al. | 705/400 |
| 2002/0026392 A1 * | 2/2002 | Shimizu et al. | 705/29 |
| 2002/0087490 A1 * | 7/2002 | Ueda et al. | 705/400 |

OTHER PUBLICATIONS

Fischer, Gary, "A resource consumption model (RCM) for process design", Jun. 1998, The Dissertation-University of Iowa.*

* cited by examiner

FIG. 3

| COST CENTER (FACILITY) | MACHINING ABILITY | UNIT MACHINING COST (¥/Hr) |
|---|---|---|
| PRESSING MACHINE | 150t | ¥124816/Hr |
| | 300t | ¥1684210/Hr |
| | ..... | ........ |
| CAM SHAFT AUTOMATIC LATHE | TYPE-12 | ¥1234567/Hr |
| | TYPE-16 | ¥2243716/Hr |
| | ..... | ........ |
| ........ | ..... | ........ |

FIG. 4

| BUSINESS FIELD | INDEXICAL RATIOS | VALUE |
|---|---|---|
| ELECTRONIC COMPONENT MANUFACTURING INDUSTRY | FACILITY-RELATED COMMON COST RATIO | 111YEN/Hr |
| | LABOR-RELATED COMMON COST RATIO | 224YEN/Hr |
| | DIRECT/INDIRECT WORKER RATIO | 3:1 |
| | PROFIT RATE | 24.3% |
| | SALES AMOUNT PER CAPITA | 14141356YEN |
| | ALLOCATED COST RATIO | 33.9% |
| | MANAGEMENT/SALES COST RATIO | 44.16% |
| | MATERIAL MANAGEMENT COST RATIO | 55.25% |
| ...... | ...... | ...... |
| AUTOMOBILE MANUFACTURING INDUSTRY | FACILITY-RELATED COMMON COST RATIO | 6636YEN/Hr |
| | LABOR-RELATED COMMON COST RATIO | 7749YEN/Hr |
| | ...... | ...... |
| ...... | ...... | ...... |

ANALYSIS AT A PROCESSING FACILITY UNIT

ANALYSIS AT A COMPANY UNIT

COMPARISON AT COST CENTERS

FIG. 9

MALAYSIA
CHINA
JAPAN

| COST CENTER (FACILITY) | MACHINING ABILITY | UNIT MACHINING COST (¥/Hr) |
|---|---|---|
| PRESSING MACHINE | 150t | 124816 |
|  | 300t | 1684210 |
|  | ...... | ...... |
| CAM SHAFT AUTOMATIC LATHE | TYPE-12 | 1234567 |
|  | TYPE-16 | 2243716 |
|  | ...... | ...... |
| ...... | ...... | ...... |

FIG. 10

MALAYSIA / CHINA / JAPAN (stacked tables)

| BUSINESS FIELD | INDEXICAL RATIOS | VALUE |
|---|---|---|
| ELECTRONIC COMPONENT MANUFACTURING INDUSTRY | FACILITY-RELATED COMMON COST RATIO | 111YEN/Hr |
| | LABOR-RELATED COMMON COST RATIO | 224YEN/Hr |
| | DIRECT/INDIRECT WORKER RATIO | 3:1 |
| | PROFIT RATE | 24.3% |
| | SALES AMOUNT PER CAPITA | 14141356YEN |
| | ALLOCATED COST RATIO | 33.9% |
| | MANAGEMENT/SALES COST RATIO | 44.16% |
| | MATERIAL MANAGEMENT COST RATIO | 55.25% |
| ...... | ...... | ...... |
| AUTOMOBILE MANUFACTURING INDUSTRY | FACILITY-RELATED COMMON COST RATIO | 6636YEN/Hr |
| | LABOR-RELATED COMMON COST RATIO | 7749YEN/Hr |
| | ...... | ...... |
| ...... | ...... | ...... |

FIG. 17A

SELECTION OF PROCESSING

·PLEASE SELECT A PROCESSING TO BE EXECUTED.

CALCULATION OF UNIT MACHINING COST AND INDEXICAL RATIOS
·········

FIG. 17B

| SELECTION OF BUSINESS FIELD AND FACILITY(COST CENTER) | |
|---|---|
| ·PLEASE SELECT BUSINESS FIELD | ·PLEASE SELECT FACILITY |
| ELECTRONIC COMPONENT MANUFACTURING INDUSTRY | PRESSING MACHINE 20t |
| AUTOMOBILE MANUFACTURING INDUSTRY | PRESSING MACHINE 50t<br>PRESSING MACHINE 70t |
| SEMICONDUCTOR APPARATUS MANUFACTURING INDUSTRY | CAM SHAFT AUTOMATIC LATHE |
| POWER SOURCE MANUFACTURING INDUSTRY | LATHE |
| ········· | ········· |

FIG. 20A

| FIG. 20 | FIG. 20A |
|---------|----------|
|         | FIG. 20B |

| NAME OF MATERIAL | MATERIAL | OUTSIDE DIAMETER (mm) | INSIDE DIAMETER (mm) | SURFACE ROUGHNESS (Å) | TOLERANCE | GRADE IN DIMENSION (GRADE) |
|---|---|---|---|---|---|---|
| SUW24L(D) | SUW24L | 6.00 | 0.00 | 6.3 | NORMAL TOLERANCE | 3 |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

| NAME OF COST CENTER | ABILITY OF COST CENTER | FACILITY COST (YEN/Hr) | LABOR COST (YEN/Hr) | TOTAL COST (YEN/Hr) | FACILITY COST (YEN/Sec) | LABOR COST (YEN/Sec) | TOTAL COST (YEN/Sec) |
|---|---|---|---|---|---|---|---|
| CAM SHAFT AUTOMATIC LATHE | TYPE-12 | 363.61 | 2614.25 | 2977.86 | 0.1 | 0.73 | 0.83 |
| CAM SHAFT AUTOMATIC LATHE | TYPE-16 | 400.29 | 2614.25 | 3014.54 | 0.11 | 0.73 | 0.84 |
| ... | ... | ... | ... | ... | ... | ... | ... |
| ... | ... | ... | ... | ... | ... | ... | ... |
| ... | ... | ... | ... | ... | ... | ... | ... |

FIG. 23A

| PARTS NO. | NAME OF MATERIAL | THE NUMBER OF LOTS (PIECES/MONTH) | PRODUCT LENGTH | MATERIAL | OUTSIDE DIAMETER (mm) | INSIDE DIAMETER (mm) | SURFACE ROUGHNESS (Å) |
|---|---|---|---|---|---|---|---|
| TEST | SUM24L(D) | 10.000 | 100.000 | SUM24L | 6.000 | 0.000 | 6.3 |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

241, 24

| FIG. 23 | FIG. 23A |
|---|---|
| | FIG. 23B |

FIG. 23B

| TOLERANCE | GRADE IN DIMENSION | | | |
|---|---|---|---|---|
| NORMAL TOLERANCE | 3 | ... | ... | ... |
| ... | ... | ... | ... | ... |

| PARTS NO. | CHAMFERING INFORMATION | GROOVING INFORMATION | EDGE-DRESSING INFORMATION | RADIAL PROCESSING INFORMATION | FRAISE CUTTING INFORMATION | OTHER PROCESSING INFORMATION |
|---|---|---|---|---|---|---|

| PARTS NO. | PART COST | MATERIAL COST | PROCESSING COST | OTHER PROCESSING COSTS |
|---|---|---|---|---|
| TEST | 26.66 | 2.93 | 17.17 | 6.56 |
| ... | ... | ... | ... | ... |
| ... | ... | ... | ... | ... |
| ... | ... | ... | ... | ... |

| MATERIAL | SPINDLE ROTATION COEFFICIENT |
|---|---|
| SUM-Te | 1.11 |
| SUM24L | 1.05 |
| ... | ... |
| ... | ... |
| ... | ... |

FIG.27

| OUTSIDE DIAMETER OF MATERIAL | THE NUMBER OF SPINDLE ROTATION |
|---|---|
| ~ φ6 | 4780rpm |
| ~ φ8 | 3580rpm |
| ... | ... |
| ... | ... |
| ... | ... |

| | FACTOR IN DRAWING | | | FEEDING (STD.) mm/rev | | | | |
|---|---|---|---|---|---|---|---|---|
| | SURFACE | | TOLERANCE | OPERATION | | | | |
| | NEW | OLD | | OUTSIDE DIAMETER GRINDING | GROOVING | PARTING | CHAMFERING |
| ROUGH FINISHING | ▽ | ²⁵▽ | 0.10< | 0.100 | 0.015 | 0.025 | 0.030 |
| NORMAL FINISHING | ▽▽ | ⁶·³▽ | ≦0.10 | 0.050 | 0.015 | 0.025 | 0.030 |
| FINE FINISHING | ▽▽▽ | ¹·⁶▽ | ≦0.04 | 0.030 | 0.010 | 0.025 | 0.030 |

FIG. 29

| ITEM | CONDITION | | COEFFICIENT |
|---|---|---|---|
| MATERIAL | SUM22 | | 1.0 |
| | SUM24L | | 1.4 |
| | SUM-Te | | 1.7 |
| | SUS | | 0.9 |
| | ALUMINUM, BRASS | | 2.0 |
| OPERATION | BACKSIDE GRINDING | RABBET LENGTH ≦2mm | 1.0 |
| | | RABBET LENGTH >2mm | 0.8 |
| | OTHERS | | 1.0 |

| OPERATION | SIDE | QUANTITY OF APPROACH |
|---|---|---|
| OUTSIDE GRINDING | $L_1$ | 0.2 |
| BACKSIDE GRINDING | $(D_0-D_1)/2+L_2$ | 0.2 |
| GROOVING | $(D_1-D_2) \times 1/2$ | 0.1 |
| CHAMFERING | C | – |
| PARTING | $D_0 \times 1/2$ | 0.7 |

| OPERATION | THE NUMBER OF MOUNTED TOOLS |
|---|---|
| COUNTERSINKING, CENTER HOLE | 1 |
| DRILLING (INCLUDING CENTER HOLE) | 2 |
| TAPPING (CENTER HOLE, INCLUDING DRILLING) | 3 |

FIG. 32

| OPERATION | TIME (sec) |
|---|---|
| COUNTERSINKING, CENTER HOLE | 2 |
| DRILLING (INCLUDING CENTER HOLE) | (2.5+0.17d)/SPINDLE ROTATION COEFFICIENT |
| TAPPING (CENTER HOLE, INCLUDING DRILLING) | (3+0.50t)/SPINDLE ROTATION COEFFICIENT | d=HOLE DEPTH
t=TAPING DEPTH

FIG. 40

| NO. | PROCESS | COST CENTER | READYING COST | TIME EXPENDED | FACILITY COST | TIME EXPENDED | LABOR COST | PROCESSING COST |
|-----|---------|-------------|---------------|---------------|---------------|---------------|------------|-----------------|
| 1 | GROOVING | COMPLEX NC AUTOMATIC LATHE | 0.45 | 36.38 | 8.00 | 6.06 | 4.42 | 12.87 |
| 2 | CHAMFERING | COMPLEX NC AUTOMATIC LATHE | 0.00 | 0.00 | 0.00 | 0.00 | 0.00 | 0.00 |
| 3 | PARTING | COMPLEX NC AUTOMATIC LATHE | 0.00 | 0.00 | 0.00 | 0.00 | 0.00 | 0.00 |
| 4 | COUNTER-SINKING | COMPLEX NC AUTOMATIC LATHE | 0.00 | 0.00 | 0.00 | 0.00 | 0.00 | 0.00 |
| 5 | FRAISE D CUTTING | COMPLEX NC AUTOMATIC LATHE | 0.00 | 0.00 | 0.00 | 0.00 | 0.00 | 0.00 |
| 6 | RADIAL HOLE OPENING | COMPLEX NC AUTOMATIC LATHE | 0.00 | 5.40 | 0.11 | 5.40 | 2.00 | 2.11 |
| 7 | DEFLASHING | FILE | 0.00 | 5.60 | 0.11 | 5.60 | 2.07 | 2.19 |
| 8 | SIZING | SIZING | 0.01 | | | | | |
| 9 | | | | | | | | |
| 10 | | | | | | | | |

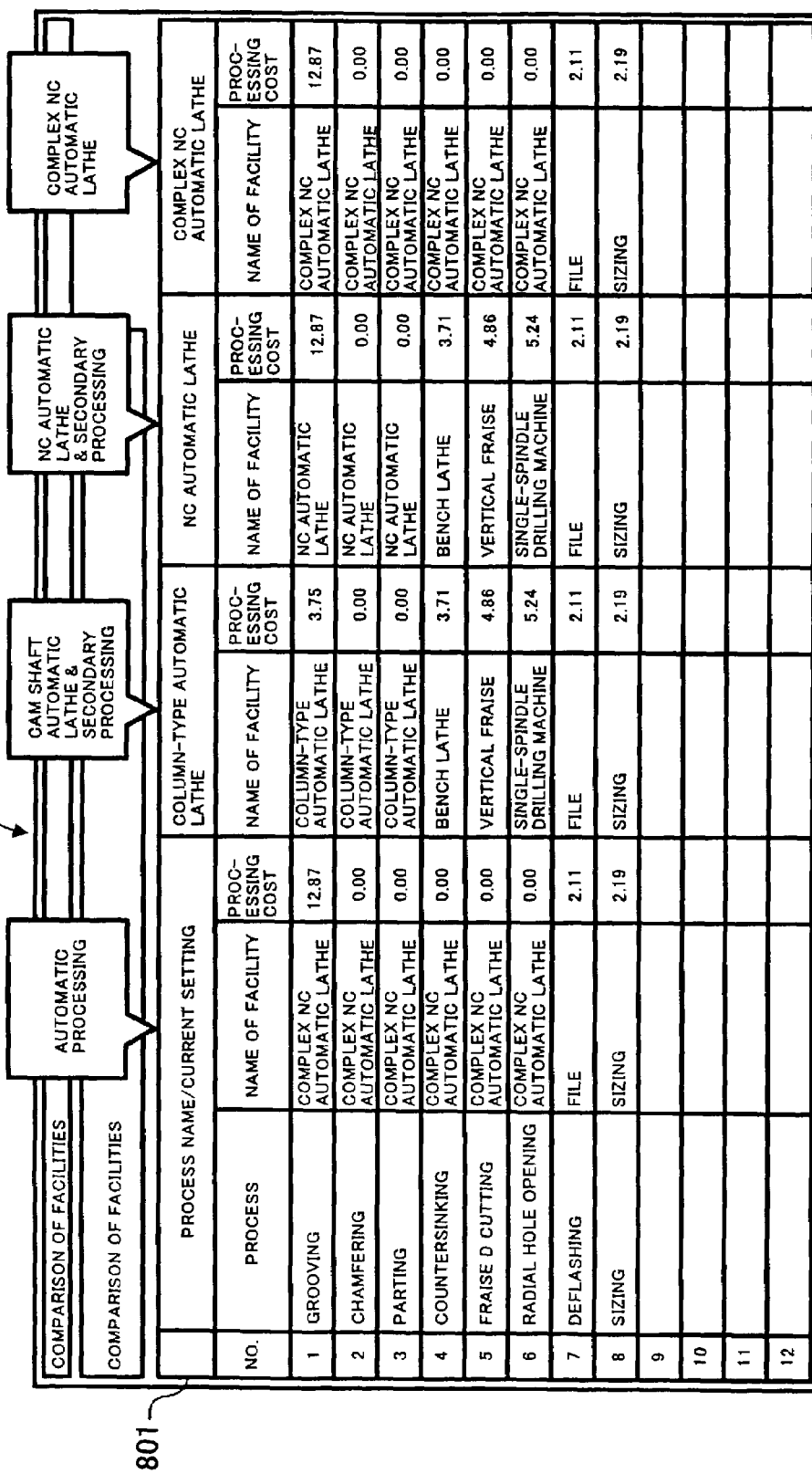

FIG. 42B

| | | | | | | | | | | |
|---|---|---|---|---|---|---|---|---|---|---|
| 13 | 14 | 15 | 16 | 17 | 18 | 19 | 20 | 21 | 22 | 23 | 24 |

With annotations:
- @26.66 — PROCESSING COST 17.17 — PART COST 26.26
- @32.50 — PROCESSING COST 21.86 — PART COST 32.50 — COLUMN-TYPE AUTOMATIC LATHE
- @32.87 — PROCESSING COST 22.15 — PART COST 32.87 — NC AUTOMATIC LATHE
- @26.66 — PROCESSING COST 17.17 — PART COST 26.66 — COMPLEX NC AUTOMATIC LATHE

FIG. 43

PROCESS INFORMATION

| PART COST | 26.66 | YEN | CALCULATED PART COST | 0.00 | YEN | DESIGNATION CANCEL |
|---|---|---|---|---|---|---|
| PROCESSING COST | 17.17 | YEN | CALCULATED PROCESSING COST | 0.00 | YEN | |

<PROCESS INFORMATION>

| NO. | PROCESS | C/T-SELECTED COST CENTER | DESIGNATED COST CENTER | PROCESSING COST |
|---|---|---|---|---|
| 1 | GROOVING | COMPLEX NC AUTOMATIC LATHE | COMPLEX NC AUTOMATIC LATHE | 12.87 |
| 2 | CHAMFERING | COMPLEX NC AUTOMATIC LATHE | COMPLEX NC AUTOMATIC LATHE | 0.00 |
| 3 | PARTING | COMPLEX NC AUTOMATIC LATHE | COMPLEX NC AUTOMATIC LATHE | 0.00 |
| 4 | COUNTERSINKING | COMPLEX NC AUTOMATIC LATHE | COMPLEX NC AUTOMATIC LATHE | 0.00 |
| 5 | FRAISE D CUTTING | COMPLEX NC AUTOMATIC LATHE | COMPLEX NC AUTOMATIC LATHE | 0.00 |
| 6 | RADIAL HOLE OPENING | COMPLEX NC AUTOMATIC LATHE | COMPLEX NC AUTOMATIC LATHE | 0.00 |
| 7 | DEFLASHING | FILE | FILE | 2.11 |
| 8 | SIZING | SIZING | SIZING | 2.19 |

PROCESS: GROOVING

D1 6.00 mm   D2 4.00 mm

TOLERANCE: NORMAL TOLERANCE
GRADE IN DIMENSION: 3

SELECTED COST CENTER: COMPLEX NC AUTOMATIC LATHE
DESIGNATED COST CENTER: COMPLEX NC AUTOMATIC LATHE
☐ DESIGNATED COST CENTER HAS PRIORITY ex. )C  D0  L  L  h  D2×1  D1

PROCESS INFORMATION RENEWAL   PROCESS INFORMATION DELETION

RETURN   CANCEL   CALCULATION   HELP

NUMBER OF TOOLS MOUNTED ON MAIN BODY: 2

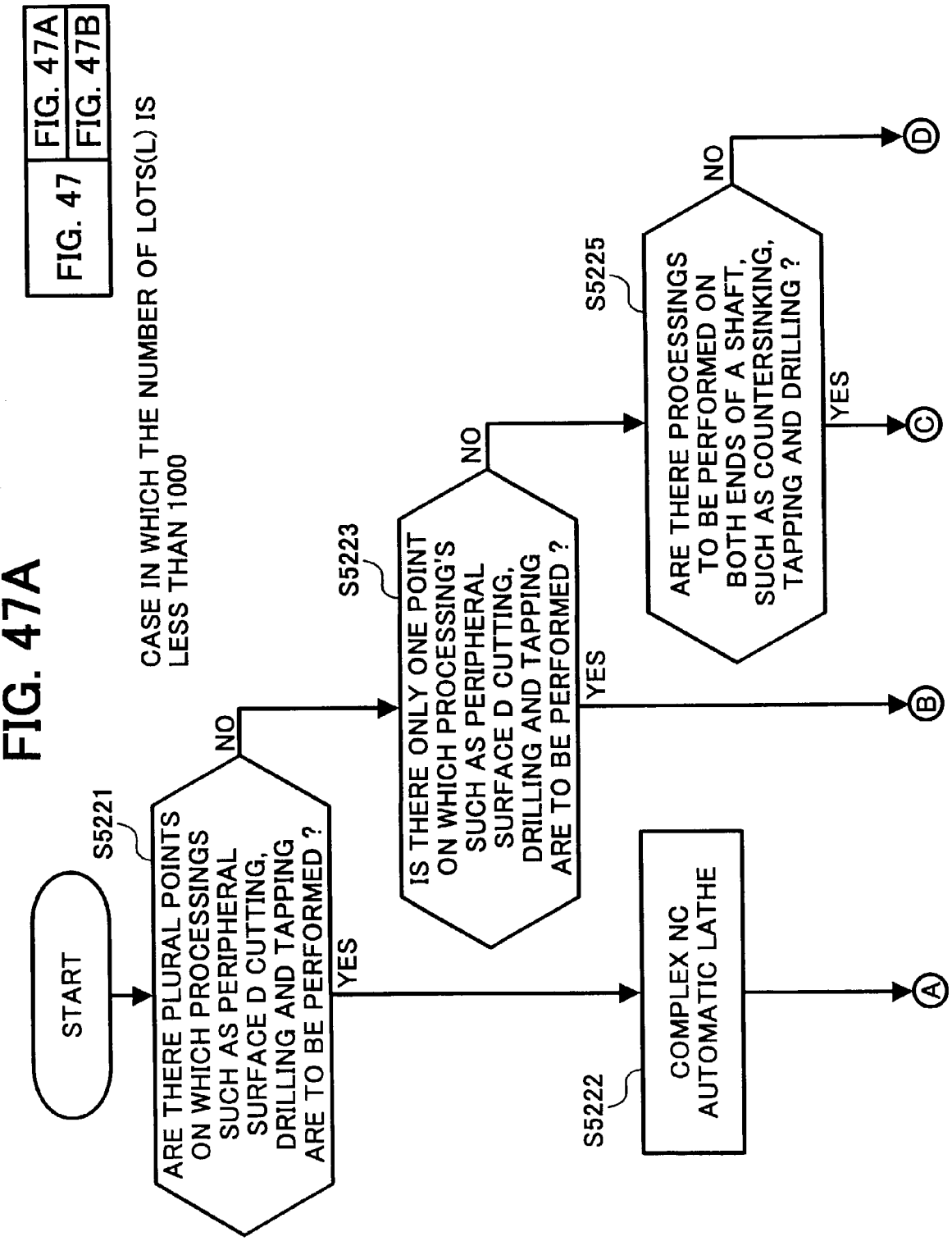

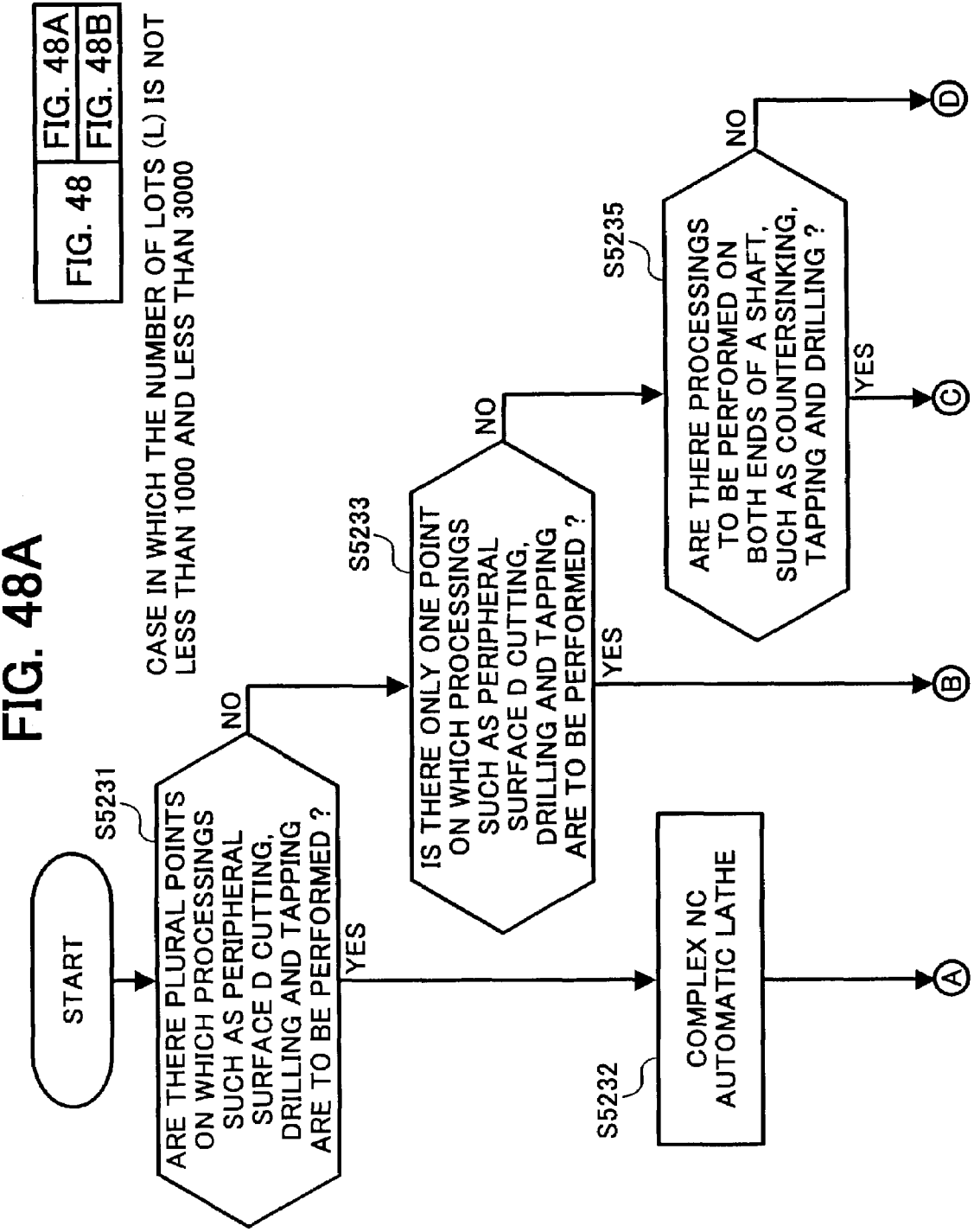

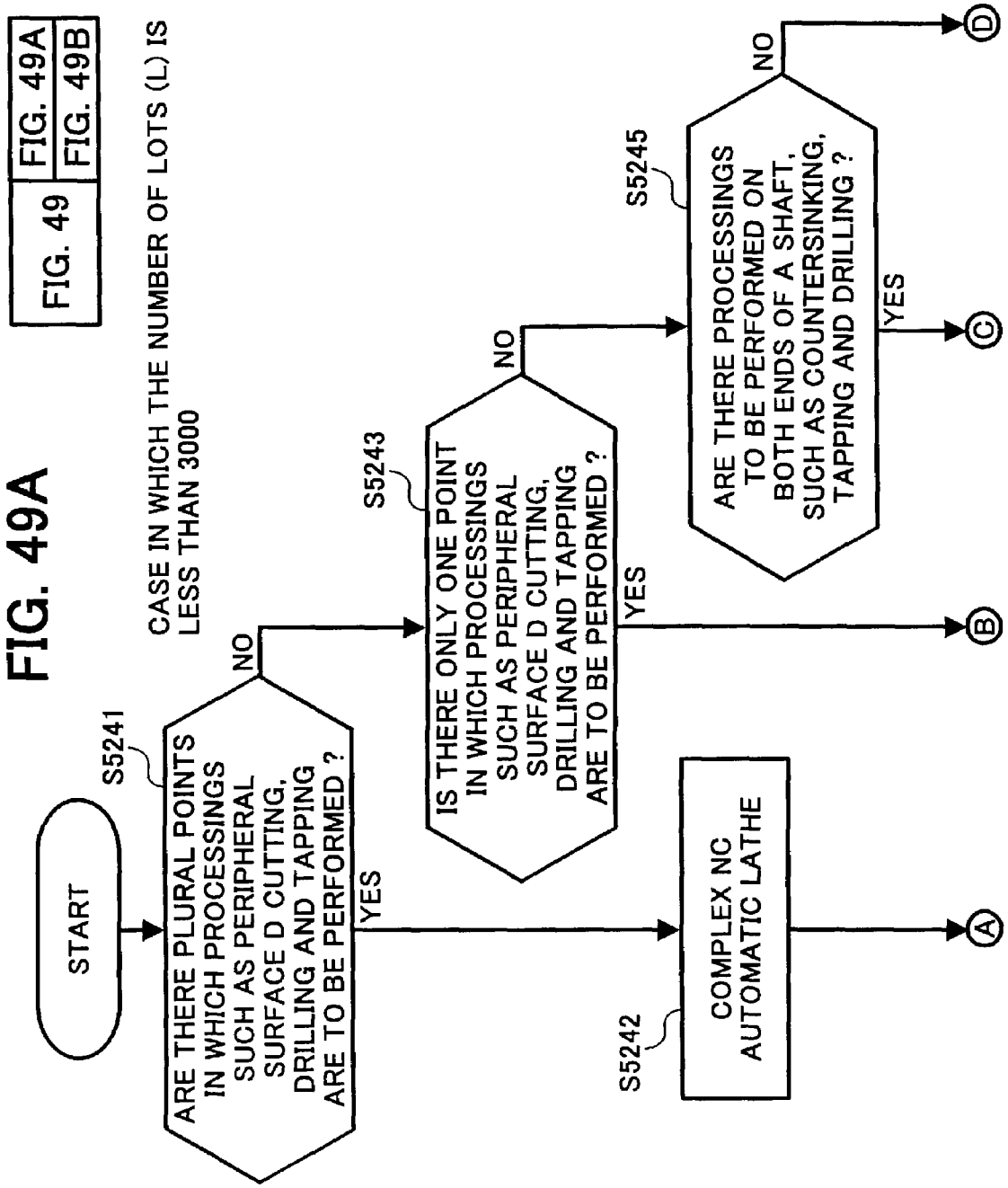

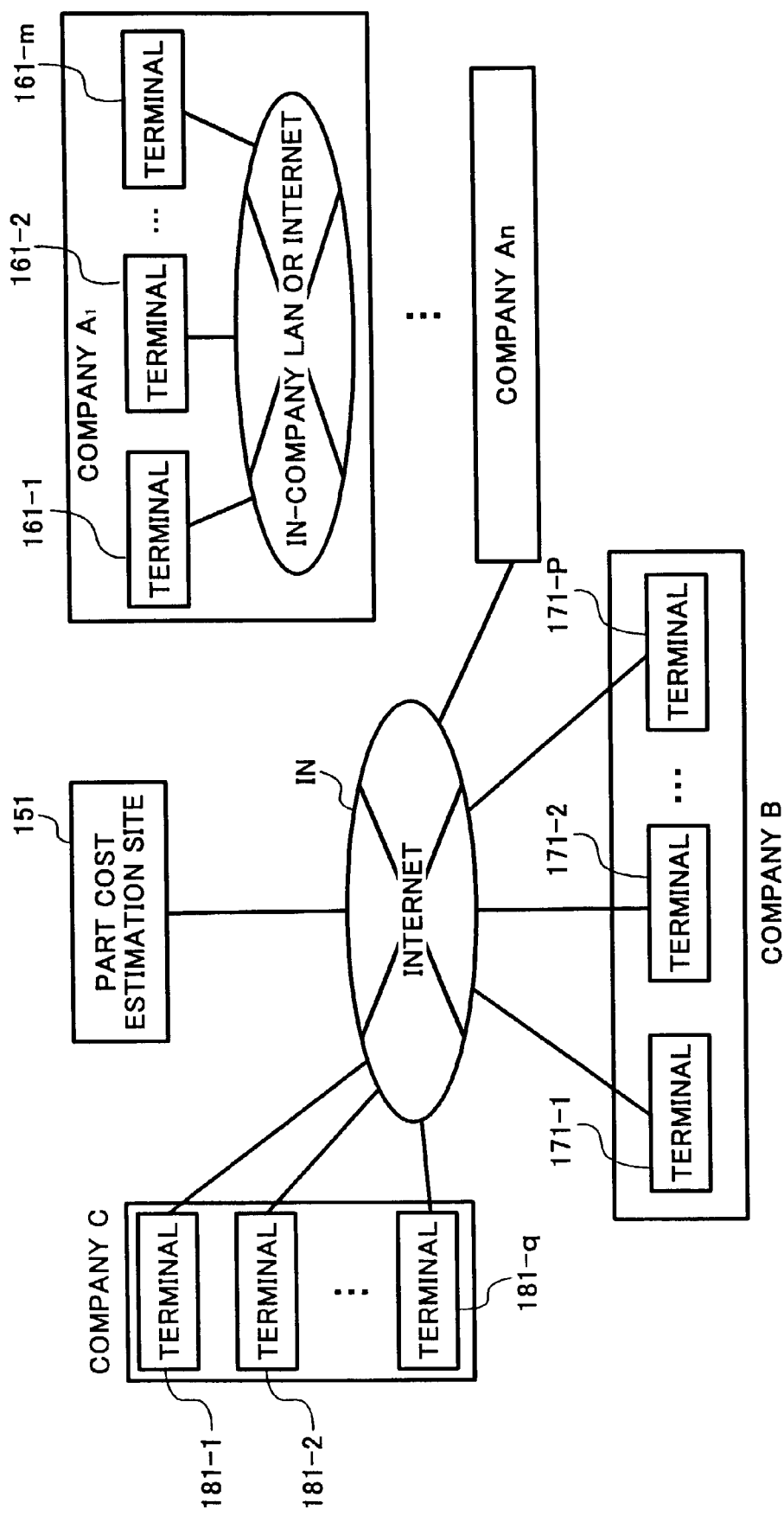

COST ESTIMATION METHOD AND SYSTEM, AND COMPUTER READABLE MEDIUM FOR THE METHOD

BACKGROUND OF THE INVENTION

1. Field of the Invention

The present invention relates to a cost estimation method and system, and computer readable medium for the cost estimation method. In addition, the present invention also relates to a part cost estimation method and system for estimating the cost of a part which is prepared by, for example, cutting or turning a source material.

2. Discussion of the Background

Manufacturers perform their business while having dealings with many suppliers. Conventionally, suppliers have been determined for such a reason that the suppliers are the affiliate companies of the manufacturers; or the manufacturers have dealt with the suppliers for a long period of time. However, such a business system cannot be used in the current price competition age.

In addition, a business method in which a company offering a minimum price is chosen as the supplier for a manufacturer is also adopted. However, it is difficult for the manufacturer to maintain a good relationship with such a company for a long period of time.

On the other hand, members of each factory and office of a manufacturer try to discover problems to be solved, and continuously perform improving activities therefor. However, it is difficult for the members to perform the improving activities while objectively evaluating the business system of the factory and office of the manufacturer.

Therefore, there are often the cases in which wasteful activities such that energy is consumed for unimportant problems (i.e., energy is not consumed for important problems), are performed.

In addition, estimation of the costs of parts to be prepared for a product to be manufactured needs knowledge concerning manufacturing processes of the parts and facilities used for manufacturing the parts.

Currently, computer-aided part cost estimation methods have been developed and introduced, and thereby persons who are not familiar with a part and processings to be performed on the part can estimate the cost of the part.

For example, Japanese Laid-Open Patent Publication No. 07-282142 discloses a cost estimation method in which cost estimation processes of from a process in which processing factors are extracted to a process in which the cost is estimated are automatically performed. This cost estimation method includes the following steps:
(1) the shape of a metal plate product, cost of which is to be estimated, is recognized using drawing information thereof (i.e., using preliminarily prepared cross-sectional shape data);
(2) a process suitable for producing the metal plate product is selected;
(3) the cost of the metal plate product is estimated based on the process information.

However, this cost estimation method can be used only for metal products made by using a die. Therefore this method cannot be applied to the parts which are made by, for example, cutting a rod material to form small rods; chamfering the small rods; grooving the small rods; radially drilling the small rods; edge-dressing; and fraise processing. Namely, the cost estimation method cannot be applied to the parts which are manufactured by subjecting a material to various cutting processings.

In addition, the cost estimation method have drawbacks in that a theoretical cost estimation cannot be performed and the cost estimation is rough.

Further, in the cost estimation method the cost of parts cannot be estimated for each of the facilities which can be used for producing the parts. Therefore, the cost estimation method has a drawback in that it is impossible to select the most suitable facility by which parts having good qualities can be produced at a minimum cost.

Furthermore, the cost estimation method has a drawback in that cost information of other section members cannot be used therefor.

Because of these reasons, needs exist for a cost estimation method and system which can be used when advantages and disadvantages of a business are grasped; and a parts cost estimation method and system by which a pats cost can be easily precisely estimated.

SUMMARY OF THE INVENTION

Accordingly, an object of the present invention is to provide a cost estimation method and system which provide information by which strengths and weaknesses of a business can be easily understood.

Another object of the present invention is to provide a part cost estimation method and system by which a part cost can be precisely and easily estimated.

Yet another object of the present invention is to provide a part cost estimation method and system in which a part cost is estimated while selecting the most suitable facility so as to fulfill the requests concerning accuracy and target cost of the parts.

Briefly these objects and other objects of the present invention as hereinafter will become more readily apparent can be attained by a cost estimation system including:

a storage device configured to store a model unit machining cost and a model indexical ratio (such as facility-related common cost ratio, labor-related common cost ratio, direct/indirect worker ratio, profit rate and sales amount per capita) concerning a business;

an inputting device configured to input cost factors and cost information concerning the business;

a processing device configured to determine an actual unit machining cost and an actual indexical ratio based on the cost factors and cost information input by the inputting device; and an outputting device configured to output the actual unit machining cost and actual indexical ratio while comparing the actual unit machining cost and actual indexical ratio with the model unit machining cost and model indexical ratio.

The model unit machining cost and model indexical ratio is preferably set to be a target unit machining cost and a target indexical ratio, i.e., the unit machining cost and indexical ratio that can be achieved by considerable efforts of the members in charge of the business.

In this case, the cost factors includes, for example, specifications of the processing facility, labor cost, and shape of apart to be manufactured, and cost information includes, for example, cost of a product such as parts. The cost estimation system may include plural inputting devices, at least one of which is connected with the processing device through a network. In addition, the cost estimation system may include plural inputting devices and plural outputting devices, wherein at least one of the plural inputting devices and at least one of the plural outputting devices are connected with the processing device through a network. The at least one of the plural inputting devices and the at least one of the plural outputting devices may be set in a business unit other than the business unit in which the processing device is set.

In another aspect of the present invention, a cost estimation system is provided which includes:

a storage device configured to store unit cost information which includes plural kinds of cost factors for a product and a unit cost concerning the product;

a cost estimating device configured to estimate a standard cost of the product using the unit cost information stored in the storage device; and a cost outputting device configured to output the cost estimated by the cost estimating device.

The cost information estimation system preferably includes an inputting device configured to input actual data of the plural cost factors, wherein the processing device determines an actual cost of the product while comparing the actual cost of the product with the standard cost thereof.

In yet another aspect of the present invention, a part cost estimation system is provided which includes:

a storage device configured to store processing cost information including information on facilities which are used for producing a part and information on the unit machining costs of the facilities;

a shape designating device configured to designate a shape of the part to be produced;

a process designating device configured to designate a process by which a material is processed into the part having the shape designated by the shape designating device;

a facility designating device configured to designate a facility by which the material is processed into the part having the shape designated by the shape designating device;

a processing time calculating device configured to calculate a processing time needed for processing the material into the part having the shape designated by the shape designating device;

a processing cost calculating device configured to calculate a processing cost of the part using the processing time and the unit machining cost information stored in the storage device; and an adding device configured to add the processing costs which are calculated by the processing cost calculating device and which are spent on processing the part.

The parts cost estimation system may further include a figure storage device configured to store a basic shape of the part. In addition, the shape designating device may include a figure displaying device configured to display the shape of the basic figure; a figure changing device configured to change the basic shape; and a shape changing device configured to change the shape of the part to display the changed shape.

In a further aspect of the present invention, a cost estimation method is provided which includes:

storing a model unit machining cost and a model indexical ratio of a business;

inputting cost factors and a cost of the business;

estimating an actual unit machining cost and an actual indexical ratio of the business based on the input cost factors and cost of the business; and outputting the actual unit machining cost and actual indexical ratio of the business while comparing them with the model unit machining cost and model indexical ratio.

In a still further aspect of the present invention, a part cost estimation method is provided which includes:

designating a shape of a part to be produced;

designating a process by which a material is processed into the part having the designated shape;

designating a facility by which a material is processed into the part having the designated shape;

calculating a processing time needed for processing the material into the part having the designated shape;

calculating a processing cost of the part using the processing time and the processing cost information stored in the storage device;

optionally repeating the steps of designating a process, designating a facility, calculating a processing time and calculating a processing cost for at least another processing to be performed on the part; and adding the processing costs of the part to determine a total processing cost of the part.

In a still further aspect of the present invention, computer programs are provided to allow a computer to execute the methods as mentioned above.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 3 is a view illustrating an example of the unit machining cost information of a facility to be stored in the storage device of the system illustrated in FIG. 2;

FIG. 4 is a view illustrating an example of the information concerning indexical ratios to be stored in the storage device of the system illustrated in FIG. 2;

FIG. 9 is a view illustrating unit machining costs to be stored in the storage device of the system while the costs are classified with respect to countries and businesses;

FIG. 10 is a view illustrating the ratios to be stored in the storage device of the system when the ratios are classified with respect to countries and facilities;

FIG. 17 is a view illustrating an example of the image displayed in the system;

FIG. 21 is a schematic view illustrating an embodiment of the processing facility master file illustrated in FIG. 19;

FIG. 23 is a schematic view illustrating an embodiment of the material designation data file illustrated in FIG. 19;

FIG. 24 is a schematic view illustrating an embodiment of the processing data file illustrated in FIG. 19;

FIG. 25 is a schematic view illustrating an embodiment of the part cost data file illustrated in FIG. 19;

FIGS. 26 to 32 are schematic views illustrating embodiments of the parameter selection table groups illustrated in FIG. 19;

FIGS. 40 and 41 are schematic views illustrating the windows displaying embodiments of the estimation details;

FIG. 42 is a schematic view illustrating the window displaying an embodiment of the estimation results of the processing cost and part cost with respect to each facility;

FIG. 43 is a schematic view illustrating the window displaying an embodiment of the image in which process and facility change information is input;

FIG. 50 is a block diagram illustrating another embodiment of the part cost estimation system of the present invention;

DETAILED DESCRIPTION OF THE INVENTION

First Embodiment

The first embodiment of the cost estimation system of the present invention will be explained in detail.

In the system, it is possible to understand the problems of the actual situation of a business by comparing the actual situation with an assumed ideal model of the business.

Figure 1:
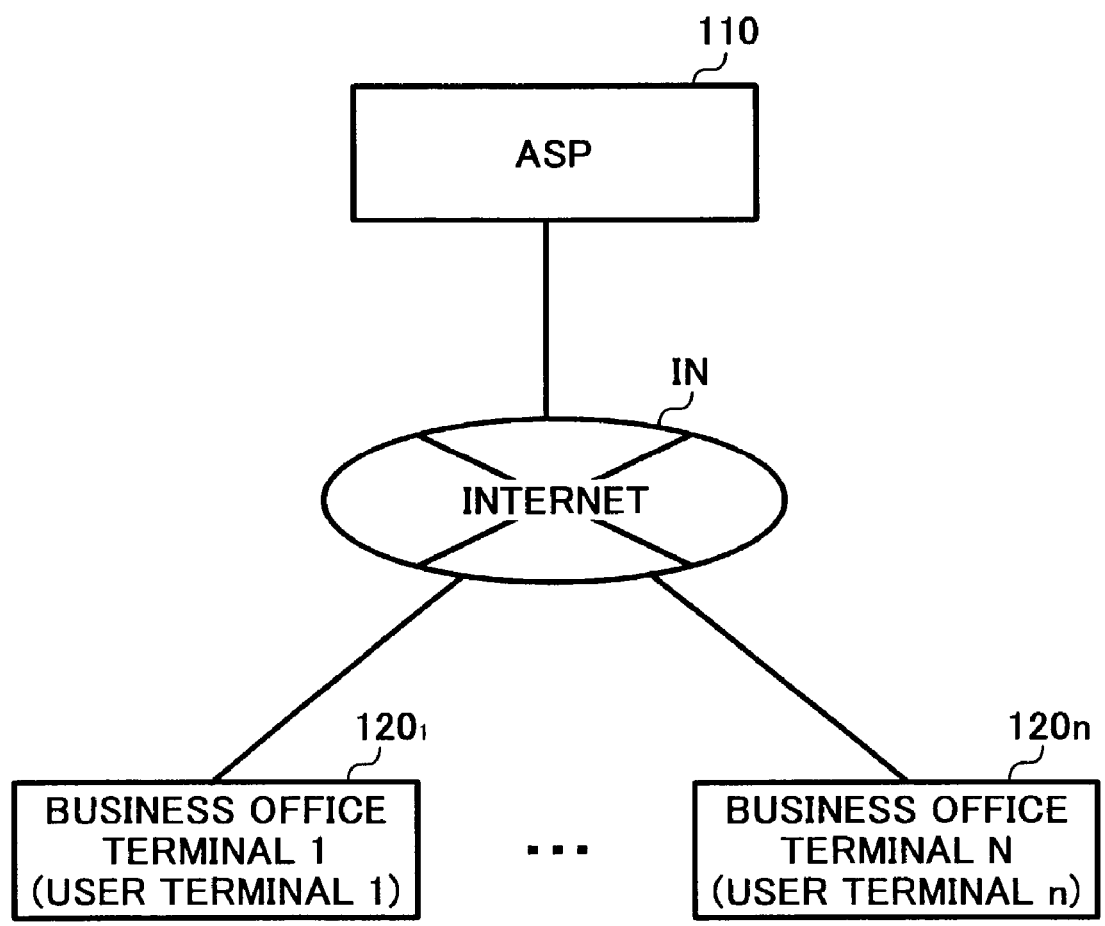
FIG. 1 is a view illustrating the constitution of an embodiment of the cost estimation system of the present invention.

As illustrated in FIG. 1, the cost estimation system of the present invention includes an ASP (Application Service Provider) 110 and plural business office terminals (i.e., user terminals) 120 (i.e., $120_1$ to $120_n$) which are connected with the ASP 110 through Internet IN.

Figure 2:
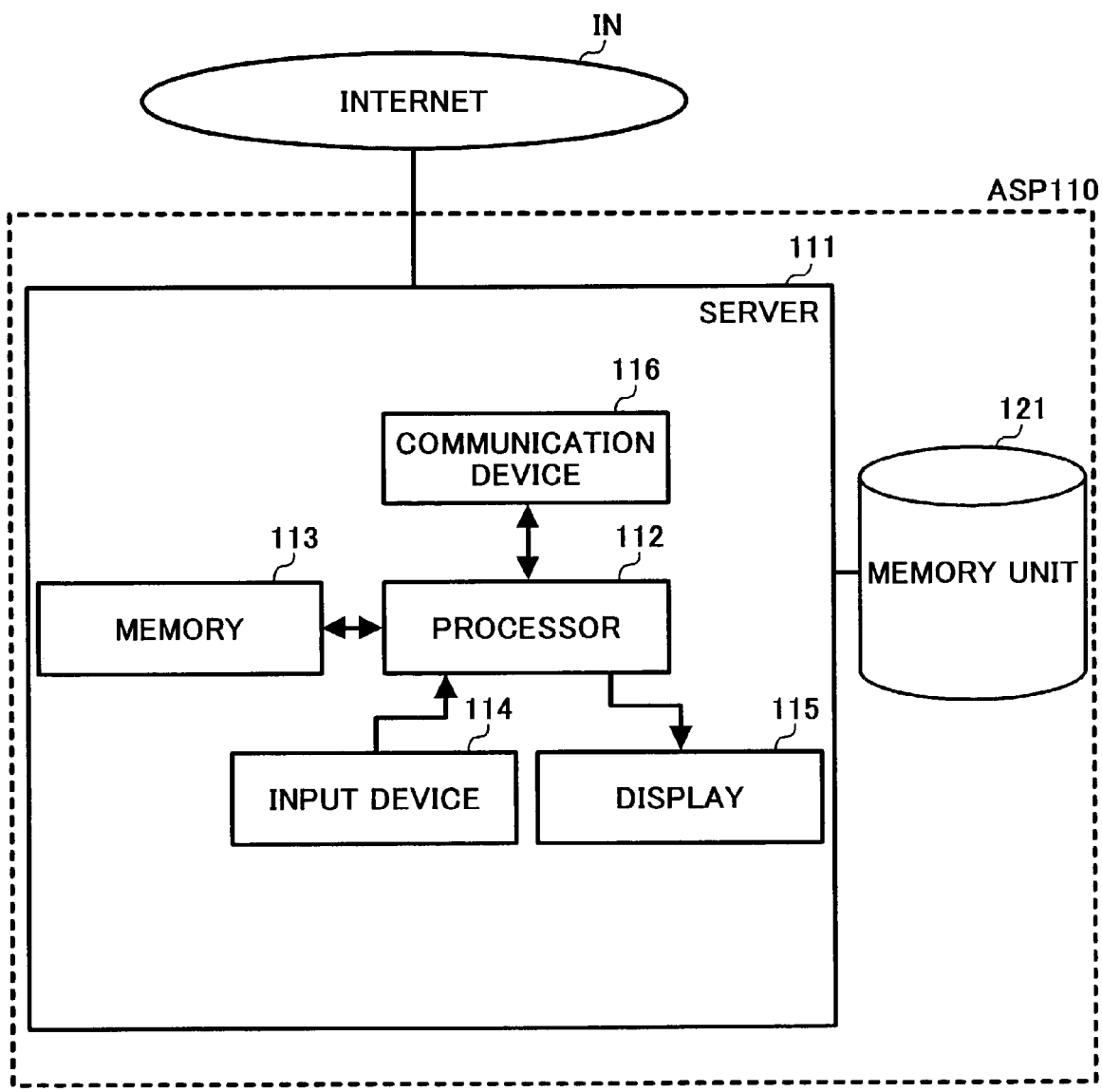
FIG. 2 is a block diagram illustrating the embodiment of the system illustrated in FIG. 1.

As illustrated in FIG. 2, the ASP 110 includes a server 111 and a storage device 121. The server 111 receives business data concerning the business of each business office, which are sent from the terminal $120_n$ of the business office. The business data are evaluated using the information stored in the storage device 121. The evaluation results are sent to the terminal $120_n$ of the business office. The server 111 includes a CGI (Common Gateway Interface), etc., and has a function of forming and providing a web page.

The server 111 includes a processor 112, a memory 113, an input device 114, a display 115 and a communication device 116.

The storage device 121 stores various indexes that an ideal business office preferably has. Specifically, as shown in FIG. 3, the storage device 121 stores the unit machining cost of each facility. In addition, as shown in FIG. 4, the storage device 121 also stores various indexical ratios of each business field, such as a facility-related common cost ratio, a labor-related common cost ratio, a direct/indirect worker ratio, a profit rate, a sales amount per capita, an allocated cost ratio, a management/sales cost ratio and a material management cost ratio.

At this point, the "unit machining cost" means "a unit cost obtained by dividing a total cost of a facility spent on a processing by a working time of the facility" and the unit thereof is Yen/Hr (i.e., unit time). By multiply the unit machining cost by a working time, the processing cost can be obtained.

In the present application, a cost center (hereinafter sometimes referred to as C/C) is defined as a unit for which a cost is calculated. Specifically, as the cost center, for example, a facility (including its ability), and a combination of works are exemplified. More specifically, a 45-ton pressing machine, a 25-ton pressing machine, a 350-ton molding machine, a 250-ton molding machine, a tapping machine, screw fastening, de-flashing (i.e., flash removing), etc., are considered as a cost center in the application.

The unit machining cost of a facility can be determined by dividing the total cost of the facility by the life of the facility. The unit machining cost of a combination of works can be determined by dividing the total cost needed for performing the combination of works by the running time.

The unit machining cost includes not only the facility cost and labor cost, but also other costs which cannot be estimated for each facility. Specific examples of such other costs include costs of the facilities, equipment and office building which are commonly used by the members to perform the business; labor costs of workers of indirect management sections; costs of other buildings such as warehouses, administration buildings, dining halls and rest rooms; and overhead costs. These cost information is changed into a common cost ratio, an allocated cost ratio, a management/ sales cost ratio, a material management cost ratio, etc.

The common cost is not a cost needed for directly producing an added value, but a cost needed for directly producing an added value which is commonly used by the cost centers, i.e., costs of common facilities, costs of buildings, and expenditure. These costs should be shared by each cost center at a specific rate. Namely, the common cost ratio can be determined by multiplying the common cost by the specific rate. The unit of the common cost ratio is Yen/Hr (unit time). The common cost ratio is broadly classified into a facility-related common cost ratio relating the facility of the cost center and a labor-related common cost ratio relating the labor (i.e., workers and indirect workers). The unit thereof is Yen/Hr (unit time).

The allocated cost is a cost which is spent on assistance and services provided for efficiently performing the processing. The unit thereof is percent (%). The allocated cost ratio is represented by the following equation:

Allocated cost ratio=(sum of allocated costs)/(sum of cost center facility costs+sum of cost center labor cost+sum of common costs of the work site)

The management/sales cost ratio is obtained by allocating a certain percentage of the management and sales costs of the company to the cost center. The unit thereof is percent (%).

The material management cost ratio is obtained by allocating a certain percentage of the material management costs such as a material purchase planning cost, a material ordering cost and a material preserving cost to the cost center. The unit thereof is percent (%).

These unit machining cost and indexical ratios are determined by performing detailed examination based on the latest information on facilities of the company and information on the present situation of various top companies.

Next, the operation of the system having the above-mentioned constitution will be explained.

A person in charge of the business of a business unit (hereinafter the person is sometimes referred to as a user) accesses the ASP 110 using the terminal 120$_n$ of the business unit to input the following items of a facility of the business unit.
(1) specifications of the facility;
(2) facility depreciation;
(3) labor cost ratio;
(4) facility repairing cost ratio;
(5) indirect material cost ratio;
(6) consumable tool cost ratio;
(7) electric power cost ratio;
(8) ratio of depreciation, tax, insurance and repairing cost of building; and
(9) ratio of tax and insurance cost of the facility.

Alternatively, the user inputs a material management cost ratio, a facility-related common cost ratio, a labor-related common cost ratio, a direct/indirect worker ratio, a profit rate, a sales amount per capita, an allocated cost ratio, and a management/sales cost ratio of the business unit.

Figure 5:
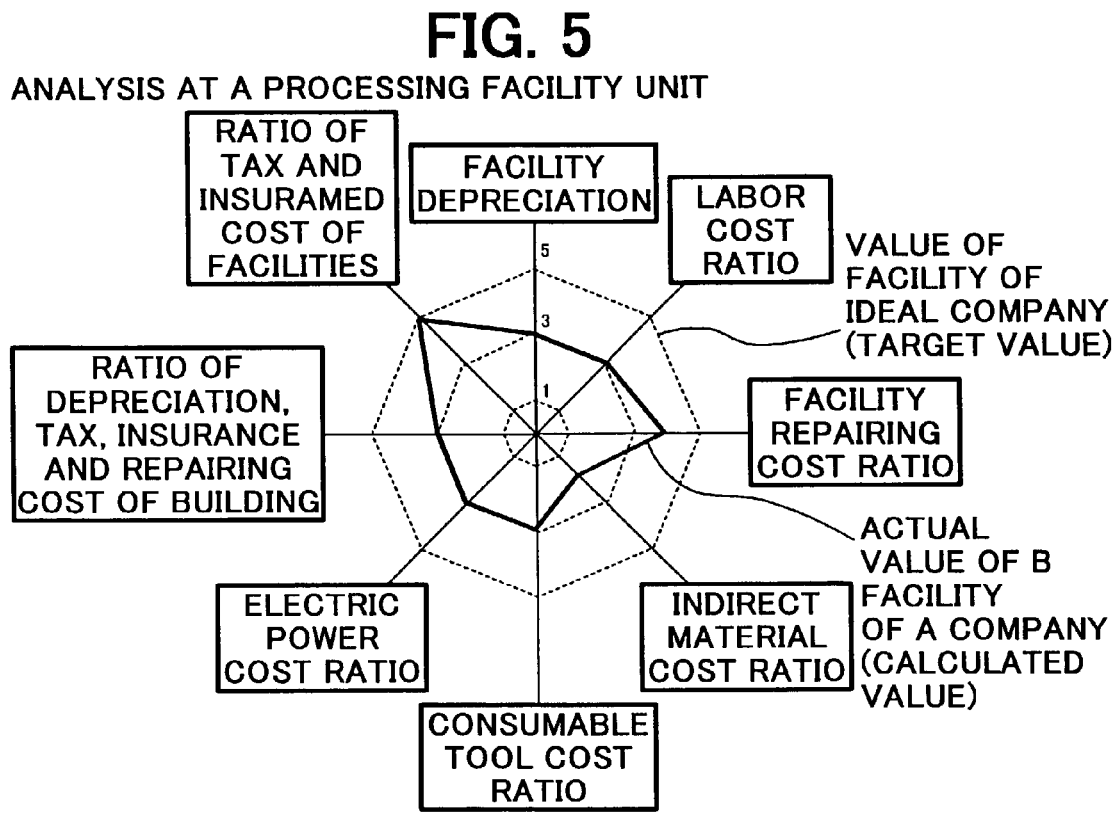
FIG. 5 is a radar chart in which the unit machining cost in a business unit is compared with that in a model business unit.

The server 111 receives the input data, and reads model indexical ratios from the memory unit 121 to prepare a radar chart as illustrated in FIG. 5. The radar chart is sent to the terminal 120$_n$ through Internet IN.

Figure 6:
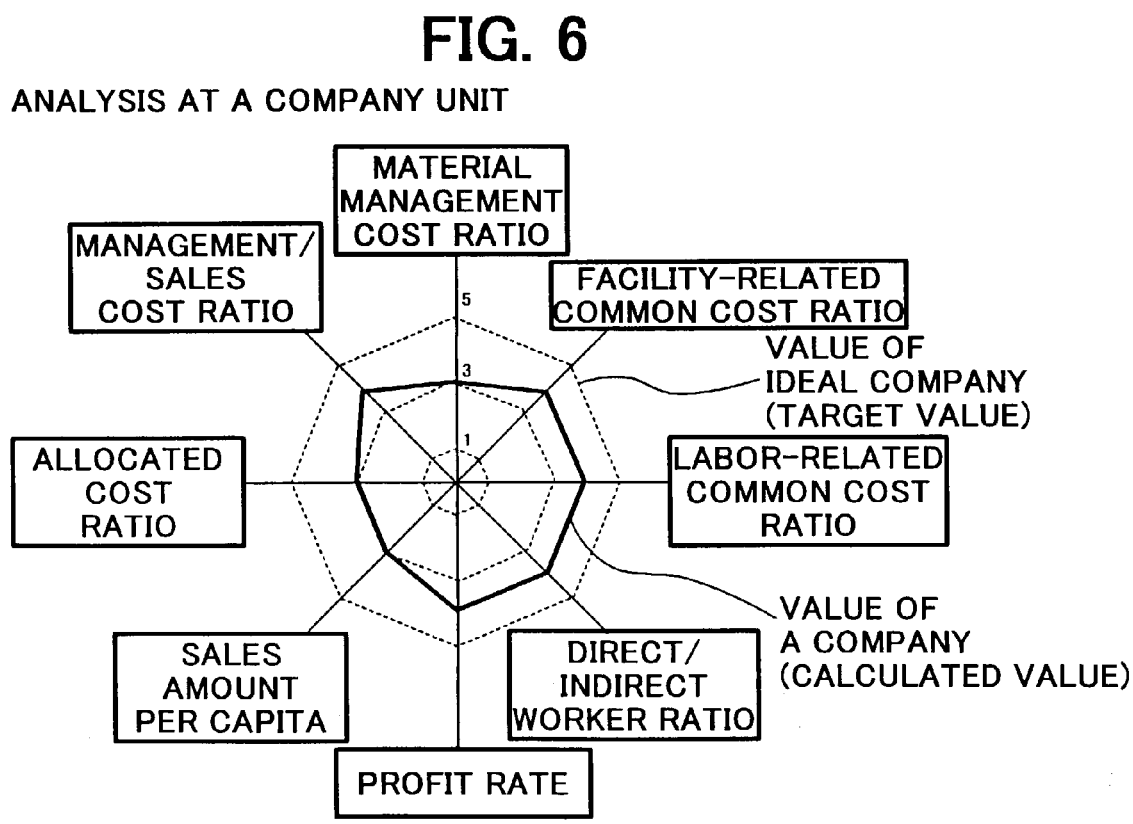
FIG. 6 is a radar chart in which the indexical ratios in a business unit are compared with those in a model business unit.

Similarly, when the input data concern the business unit, the server 111 reads the ideal model indexical ratios of the business from the memory unit 121 to prepare a radar chart as illustrated in FIG. 6. The radar chart is sent to the terminal 120$_n$ through Internet IN.

The terminal 120$_n$ displays the sent radar chart.

Thus, the user can understand the problems of the cost center or the business unit and the points to be further improved.

Figure 7:
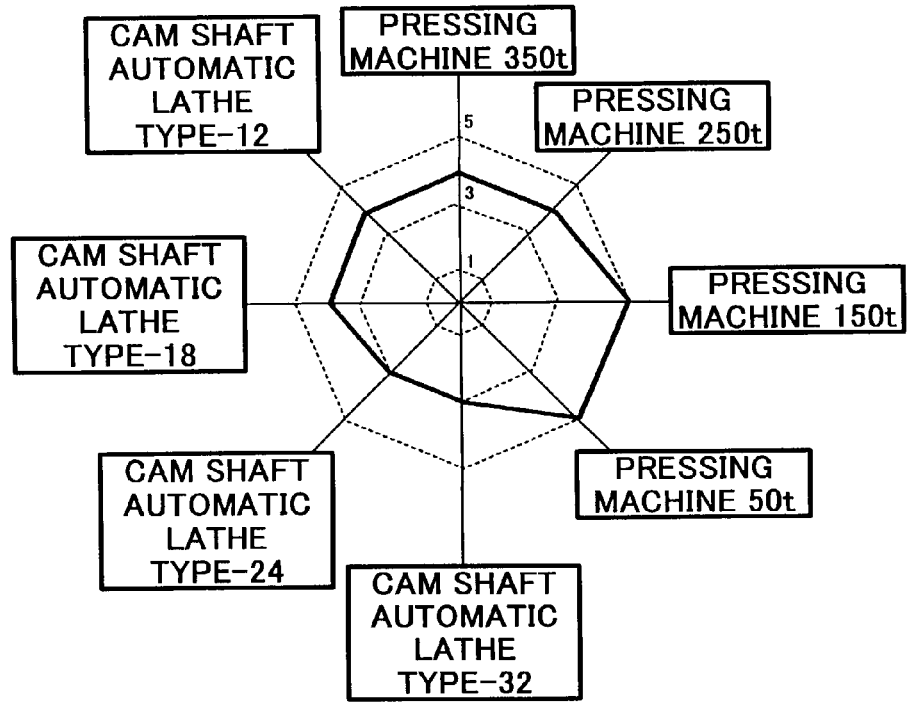
FIG. 7 is a radar chart in which the unit machining cost in a business unit is compared with that in a model business unit with respect to each cost center.

In addition, it is also preferable to evaluate each item by scoring and to obtain a total score, and then a radar chart as illustrated in FIG. 7 is prepared for each facility of the company. Thus, it becomes clear which facility should be improved at first.

By using this system, the business unit can easily understand the strengths and weaknesses thereof.

In order to obtain the unit machining cost ratio and indexical ratios mentioned above, it is needed to obtain various indexes. Therefore, it may be possible to compare these indexes of each business unit with ideal indexes.

Figure 8:
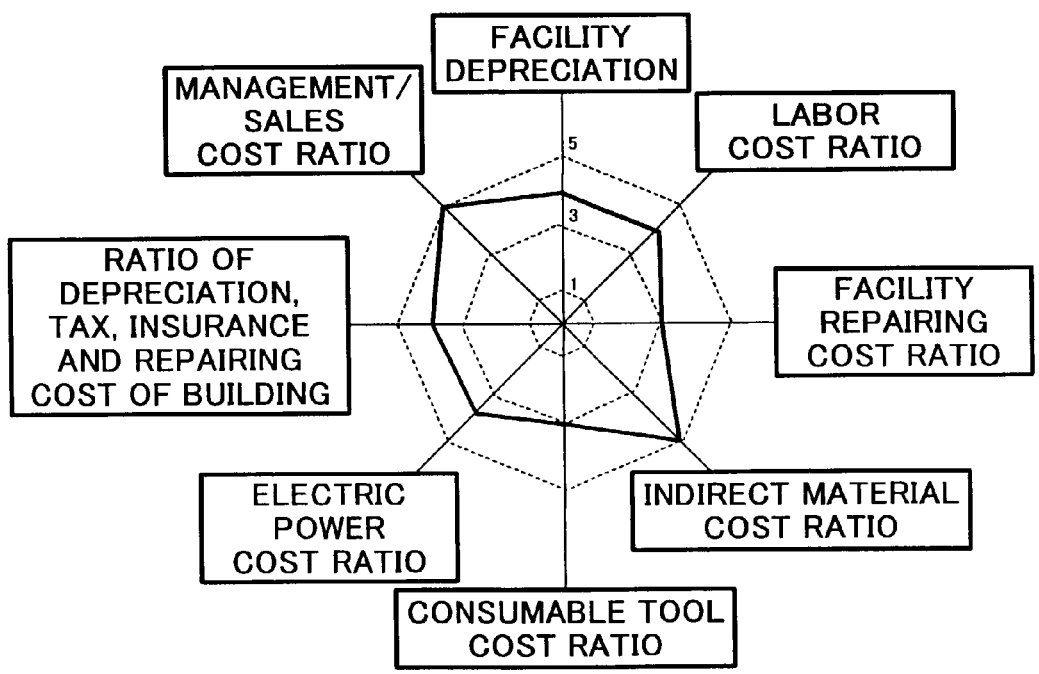
FIG. 8 is a radar chart in which various cost factors in a business unit are compared with those in a model business unit.

For example, various indexes such as a facility depreciation, a labor cost ratio; a facility repairing cost ratio; an indirect material cost ratio; a consumable tool cost ratio; an electric power cost ratio; a ratio of depreciation, tax, insurance and repairing cost of buildings; a ratio of tax and insurance cost of the facility; a material management cost ratio; a facility-related common cost ratio; a labor-related common cost ratio; a direct/indirect worker ratio; a profit rate; a sales amount per capita; an allocated cost ratio; and a management/sales cost ratio, which are needed for determining the unit machining cost and indexical ratios, may be input to be compared with those of an ideal business unit. The results are preferably illustrated as a radar chart as shown in FIG. 8.

The ideal indexes of an ideal business unit, which are stored in the memory unit 121, are not limited to one kind of index, and a set of plural ideal indexes may be stored such that a proper index can be selected depending on the manufacturing country and economic environment.

For example, two groups of ideal indexes, one of which is suitable for domestic manufacturing and the other of which is suitable for manufacturing in a foreign country such as China, may be stored in the storage device 121 to be compared with indexes of a company.

In this case, the unit machining cost and indexical ratios are determined for Japan and a foreign country such as Malaysia and China through research. The results are preferably arranged in a table as illustrated in FIGS. 9 and 10 and stored in the memory unit 121. The results may also be arranged in a radar chart as illustrated in FIG. 4.

In this case, when a user accesses the ASP 110, the user designates the manufacturing country. The server 111 prepares a radar chart while referring to the table for the designated country. By using such a system, the cost of a product can be compared with the ideal cost when the product is manufactured in a foreign country.

The indexes of an ideal business unit are not limited to theoretical values. For example, in a case in which the ASP 110 is set in a maker and the terminal 120 is set in each of plural companies to which the maker orders, the ideal index may be set at a value which can be achieved by the top one or two companies by considerable efforts. In this case, other companies make an effort to achieve such an index.

Second Embodiment

Then a second embodiment of the present invention will be explained.

In the first embodiment, the business unit is needed to determine the unit machining cost and indexical ratios and input them using the terminal thereof. However, the operations of determining the unit machining cost and indexical ratios are difficult and need skills. Therefore the operations are typically performed by a specialist.

Hereinafter an ASP system assisting the operations of determining the indexical ratios will be explained in detail.

Figure 11A:
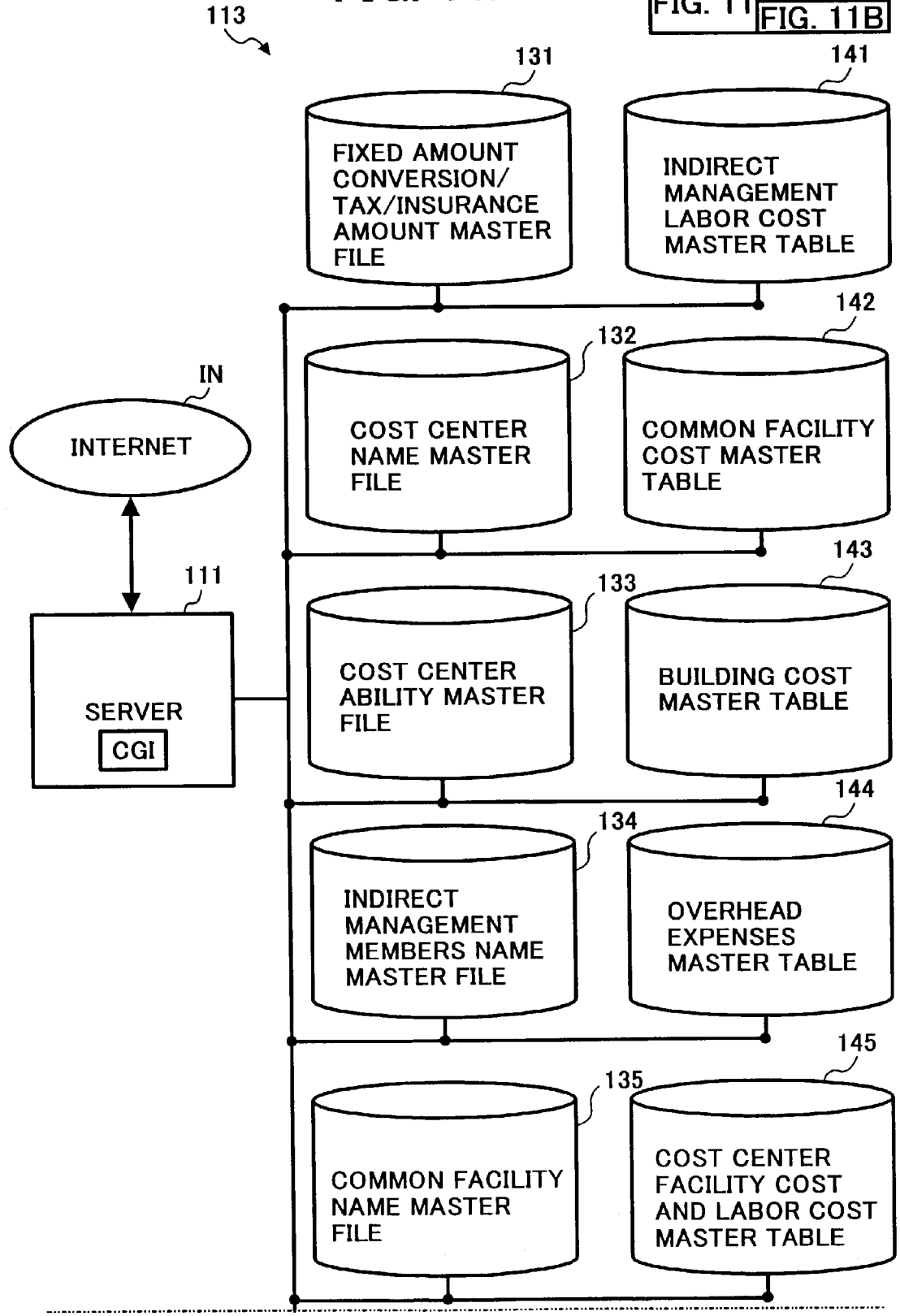
FIG. 11 is a schematic view illustrating an example of the ASP (Application Service Provider) illustrated in FIG. 1.
Figure 11B:
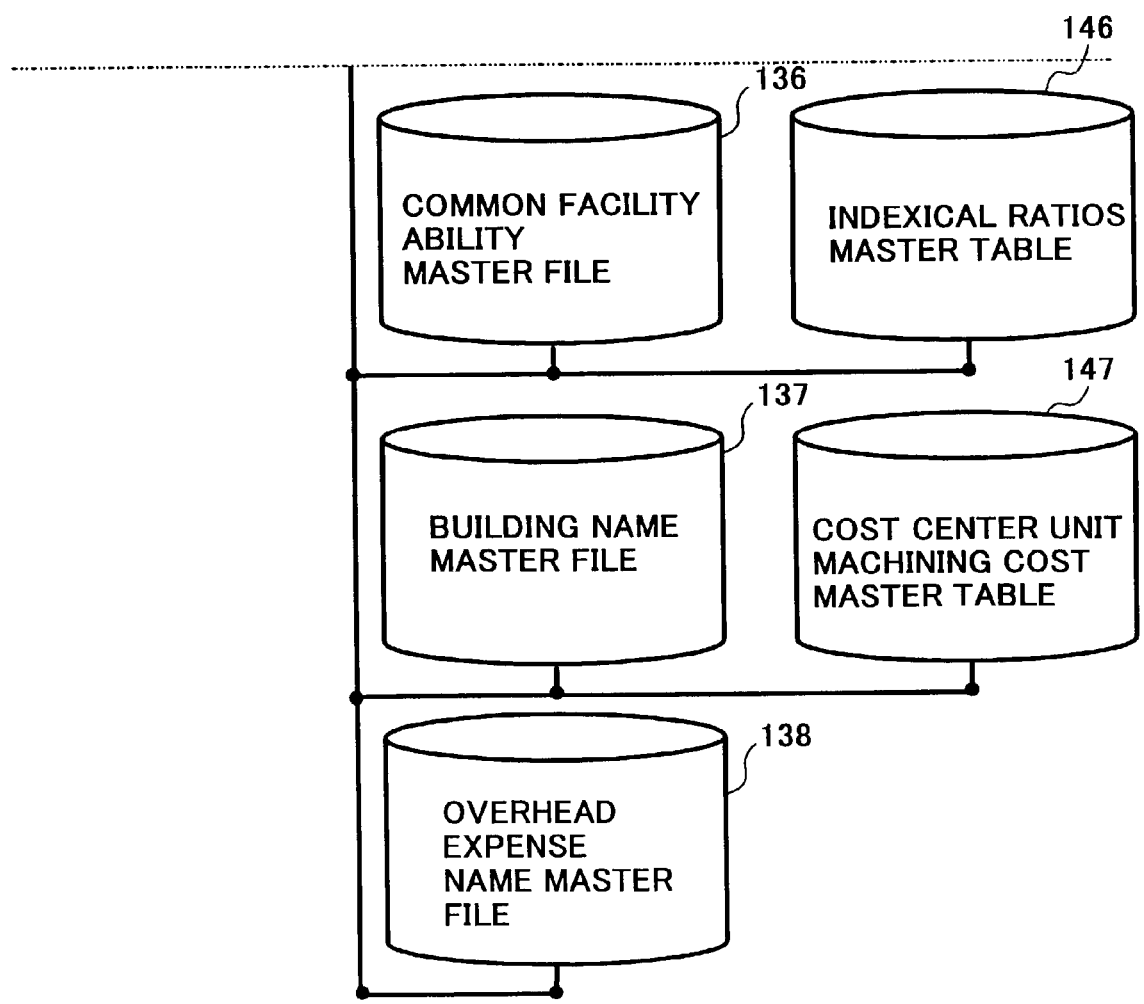

The entire constitution of the second embodiment of the model factory system of the present invention, which is illustrated in FIG. 11, is similar to that illustrated in FIG. 1.

In FIG. 11, a memory unit 121 includes a fixed amount conversion/tax/insurance amount master file 131, a cost center name master file 132, a cost center ability master file 133, an indirect management members name master file 134, a common facility name master file 135, a common facility ability master file 136, a building name master file 137, and an overhead expense name master file 138.

In addition, the memory unit 121 also includes an indirect management labor cost master table 141, a common facility cost master table 142, a building cost master table 143, an overhead expense master table 144, a cost center facility cost and labor cost master table 145, an indexical ratios master table 146 and a cost center unit machining cost master table 147.

Each of the master files is a file in which information is stored to be commonly used while personal factors are deleted from the titles and sections.

The fixed amount conversion/tax/insurance amount master file 132 is a file in which information concerning the fixed amount conversion of a facility cost, and information concerning the tax and insurance amount of a facility are stored.

The cost center name master file 132 is a file in which a list of names of cost centers is stored, and for example, pressing machines, cutting machines and the like names are stored therein.

The cost center ability master file 133 is a file in which a list of ability of cost centers is stored, and for example, abilities such as 350 ton and 35 ton are stored with respect to the pressing machines.

The indirect management members name master file 134 is a file in which the names of members of management sections and indirect sections are stored. For example, a copy of a part of personal data is used.

The common facility name master file 135 is a file in which the names of common facilities such as compressors, trucks and fork lifts are stored.

The common facility ability master file 136 is a file in which the abilities of the common facilities are stored.

The building name master file 137 is a file in which a list of names of buildings such as factories, laboratories, dining halls and warehouses are stored.

The overhead expense name master file 138 is a file in which a list of names of overhead expenses such as enterprise tax, illumination expenses, water expenses, fuel expenses and supplies expenses, which are needed for manufacturing a product, is stored.

In each master table, the data input for each cost center or each business unit, or the data obtained by performing calculation based on the input data, are stored.

In the indirect management labor cost master table 141, information concerning salaries of the members of management sections and indirect sections is stored.

In the common facility cost master table 142, information concerning costs of the common facilities is stored.

In the building cost master table 143, information concerning costs of the buildings is stored.

In the overhead expenses master table 144, information concerning the overhead expenses is stored.

In the cost center facility cost and labor cost master table 145, information concerning facility costs and labor costs of each cost center is stored.

In the indexical ratios master table 146, indexical ratios are stored.

In the cost center unit machining cost master table 147, the unit machining cost of each cost center is stored.

Next, the procedures for determining the unit machining cost in this system will be explained referring to flowcharts illustrated in FIGS. 12 to 16.

At first, a person in charge of a business unit (i.e., a user) operates the terminal 120 of the business unit to access the server 111 and to be certified.

When the user is certified, the server 111 sends a processing selection image as illustrated in FIG. 17A to the terminal 120. The user selects the processing of determining a unit machining cost and indexical ratios.

Figure 12:
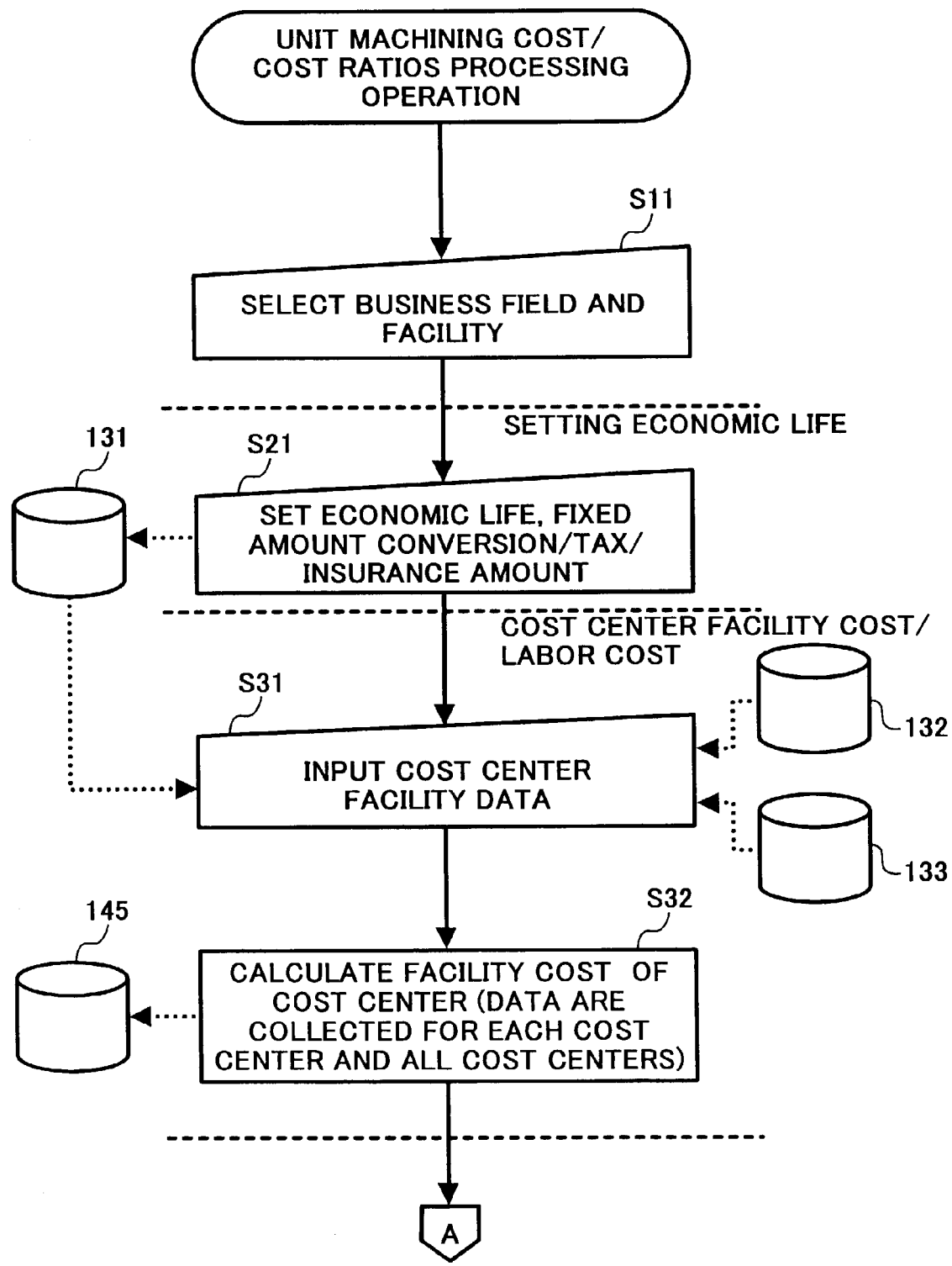
FIGS. 12 to 16 are flowcharts illustrating the flow of determining the unit machining cost and indexical ratios.
Figure 13:
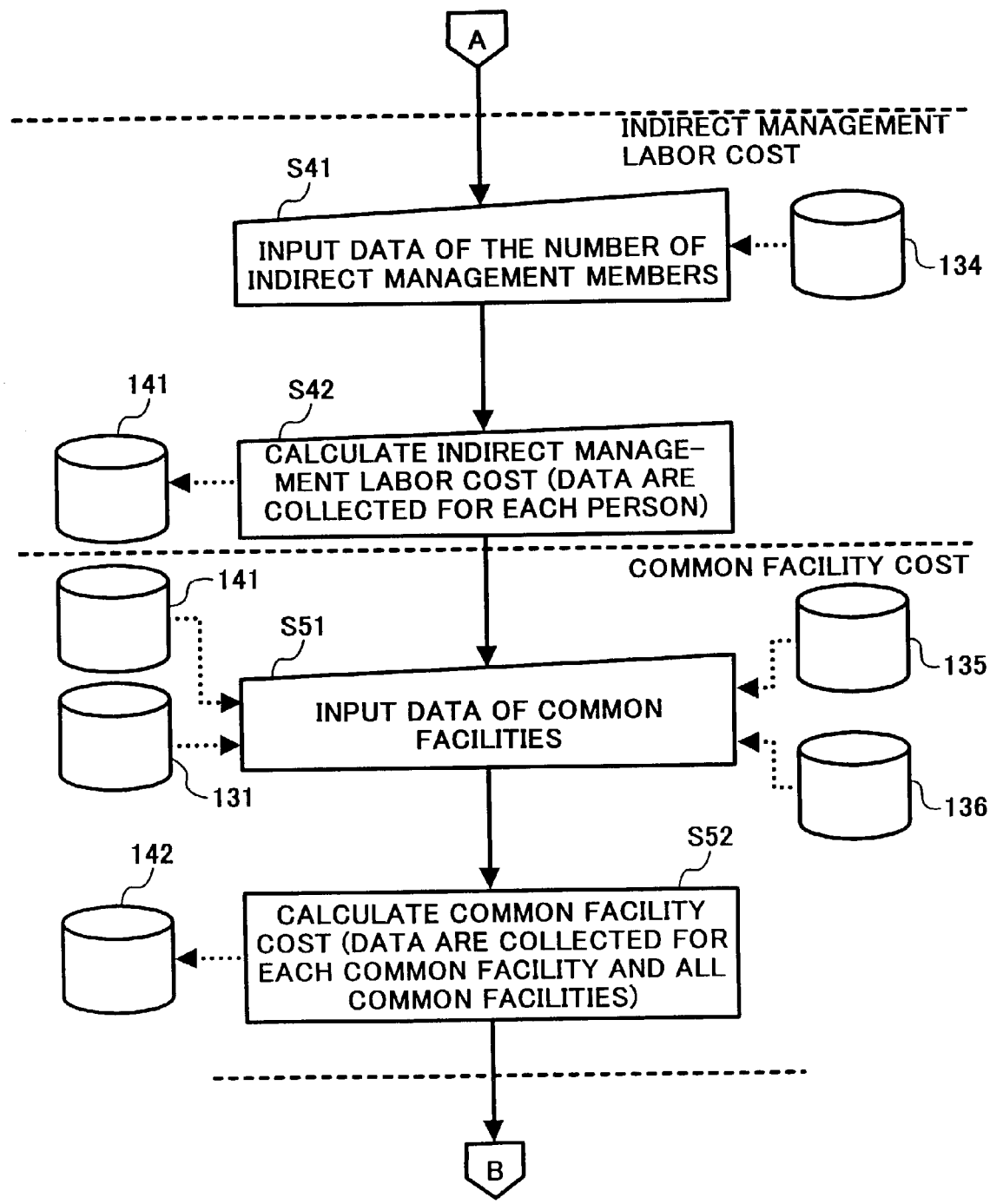
Figure 14:
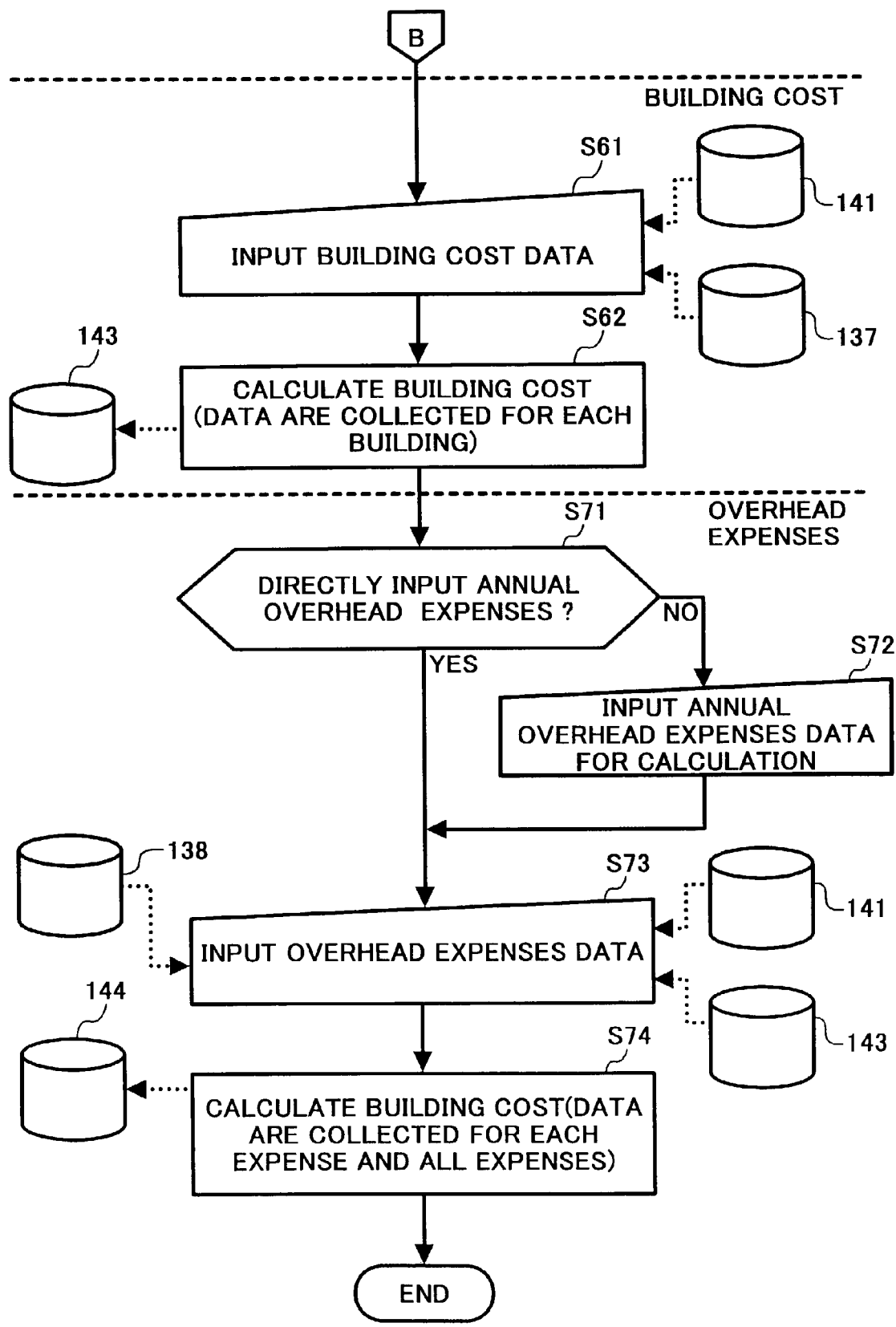
Figure 15:
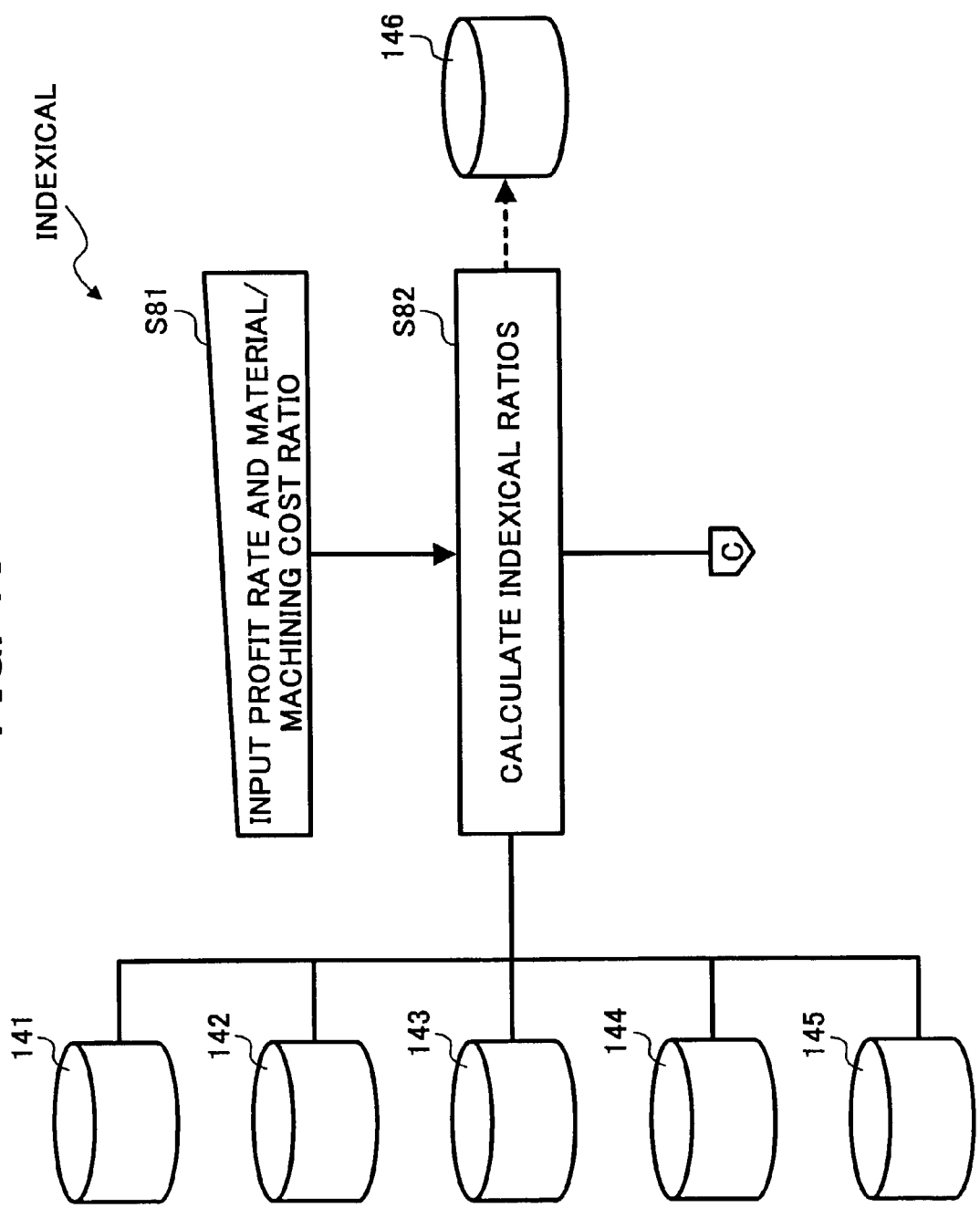
Figure 16:
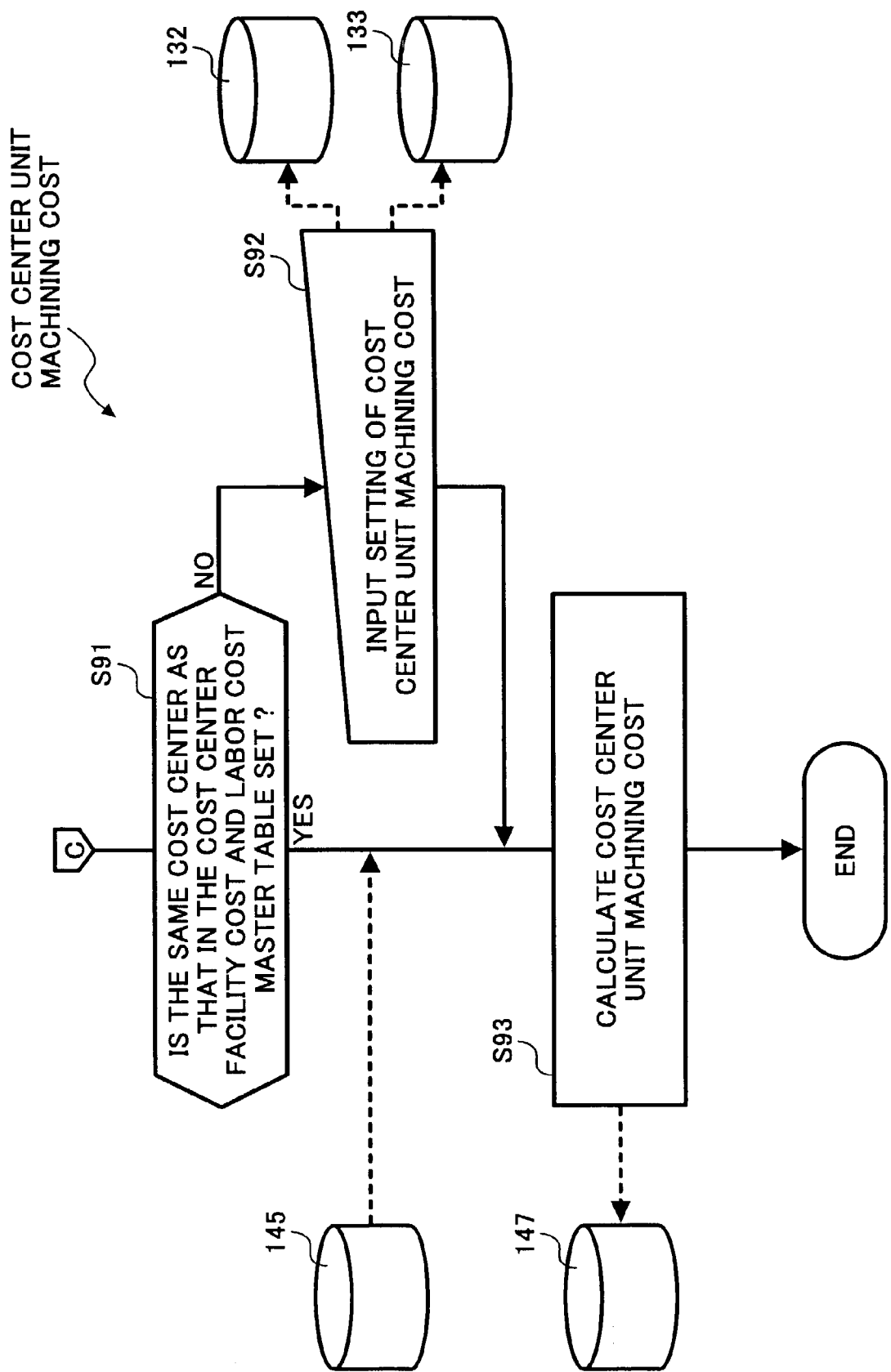

Upon receiving the selection information, the server 111 starts the proceedings as illustrated in the flowchart of FIG. 12, and sends a business field/facility selection image, which is illustrated in FIG. 17B and from which the business field and facility (i.e., the cost center) to be examined are input, to the terminal 120 (Step S11). The user selects the business field of the business unit and the facility for which the unit machining cost is determined in the screen of the terminal 120 to notify the server 111.

Then, the user inputs the economic life, fixed amount conversion rate and tax/insurance rate to the fixed amount conversion/tax/insurance amount master file 131 via the server 111 (Step S12).

Then, the server 111 sends an input form image, from which data concerning the cost center to be examined are to be input, to the terminal 120. The user inputs data concerning the cost center in the screen of the terminal 120 (Step S31). The data inputting procedures are as follows.

At first, the name of the cost center is input while referring to the cost center name master file 132. In addition, the ability of the facility is input while referring to the cost center ability master file 133.

In addition, the current price of the facility (C/C) (unit of Yen) at which the new one of the facility can be purchased at the present time, the annual working time of the facility (unit of hour), the standard operating rate of the facility (unit of %), the labor cost (i.e., labor costs of direct/indirect members) and the like are input.

The server 111 provides data of the facility cost and labor cost, which directly concern the cost center itself and which are determined based on the input information and the fixed amount conversion/tax/insurance amount, for each cost center and all cost centers. The thus obtained data are stored in the cost center facility cost and labor cost master table 145 (Step S32).

Then the server 111 sends an information input form image concerning the number of indirect management members to the terminal 120.

The user inputs data concerning the labor cost of the indirect sections and management sections, which concerns the cost center and the cost of which cannot be directly identified by the user, while referring to the indirect management members name master file, etc (Step S41).

For example, it is supposed that the number of the indirect management members including the president and factory manager is seven. The salary of the president is 840 thousand Yen/month, and the collateral labor cost ratio (for example, bonus) is 15% of the salary. Namely, the annual wage of the president is 11,592 thousand Yen/year. In addition, it is supposed that the labor-related common cost ratio is 0%, the allocated cost ratio is 30% of the annual wage, i.e., 3,478 thousand Yen/year, the management/sales cost ratio is 70%, i.e., 8,114 thousand Yen/year, and the material management cost is 0%. These data are input. In this system, the annual wage, labor-related cost, allocated cost, management/sales cost and material management cost may be automatically calculated only by inputting such percentage data as exemplified above.

The server 111 then processes the input data to determine each indirect management cost and totals the indirect management costs. The thus obtained data are stored in the indirect management master table 141 (Step S42). By this data processing, the total cost of the indirect management members cost, the cost of which cannot be directly identified, can be determined. The thus obtained cost information is distributed to the allocated cost (i.e., a cost to be included in the processing cost), management/sales cost and material management cost.

Then the server 111 sends to the terminal 120 an input form image, from which data concerning costs of the common facilities which each cost center commonly uses for manufacturing a product, are to be input.

The user inputs the costs concerning the common facilities such as trucks and fork lifts, the cost of which cannot be directly identified, while referring to the common facility name master file 135 and common facility ability master file 136 (Step S51). In addition, the user may refer to the fixed amount conversion/tax/insurance amount master file 131 and indirect management cost master file 141 to input the data.

The server 111 then processes the input data to determine the common facility cost and totals the common facility costs. The thus obtained data is stored in the common facility master table 142 (Step S52). By performing this data processing, the total cost of the common facility cost, which cannot be directly identified, can be determined. The thus obtained cost information is distributed to the processing cost (facility-related common cost, labor-related common cost and allocated cost), management/sales cost and material management cost.

Then the server 111 sends to the terminal 120 an input form image, from which data concerning the building which is needed for manufacturing the product are to be input.

The user inputs data concerning the building while referring to the building name master file 137 (Step S61).

The server 111 processes the input data to determine the building cost of each building and totals the building costs. The thus obtained data are stored in the building cost master table 143 (Step S62). By performing this data processing, the total cost of the building cost, which cannot be directly identified, can be determined. The input cost information is distributed to the processing cost (facility-related common cost, labor-related common cost and allocated cost), management/sales cost and material management cost.

Then the server 111 sends to the terminal 120 an inputting form image, from which overhead expenses needed for manufacturing the product, such as business tax, illumination expenses, water expenses, fuel expenses and supplies expenses, are to be input.

When overhead expenses are input, the user selects YES in Step S71. The user input data concerning the overhead expenses while referring to the overhead expense name master file 138, indirect management cost master table 141, building cost master table 143, etc (Step S73).

When the annual overhead expenses are not directly input, each of the costs constituting the overhead expenses may be input (Step S72) to calculate the annual overhead expenses (Step S73).

The server 111 processes the input data to determine each overhead expense and totals the overhead expenses. The thus obtained data are stored in the overhead expense master table 144 (Step S74).

By performing this data processing, the total cost of the overhead expenses, which cannot be directly identified, can be determined. The input cost information is distributed to the processing cost (facility-related common cost, labor-related common cost and allocated cost), management/sales cost and material management cost.

Thus, the data needed for calculating the processing cost and unit machining cost are input in each master table.

Then the server 111 sends to the terminal 120 an inputting form image, from which a profit rate and a material/machining cost ratio are to be input.

The user inputs data concerning the profit rate and material/machining cost ratio in the screen (Step S81). The server 111 processes the data stored in the tables 141 to 145 and the input data such as profit rate (Step S82) to determine the indexical ratios. The thus obtained indexical ratios are stored in the indexical ratios master table 146.

The allocated cost is a part of costs such as labor costs and overhead expenses of the administration sections, personnel sections, production engineering sections, production management sections and cost management sections, which sections directly relate to the manufacturing of the product in the factory; and the depreciation cost of the common facilities. The allocated cost ratio can be determined by the following equation:

Allocated cost ratio=(sum of the allocated costs)/
(sum of the facility costs of the cost center+
sum of the labor costs of the cost center+sum
of the common costs of the work site)

Then the server 111 processes to determine the unit machining cost of the cost center.

At this point, the user decides whether a cost center which is the same as that already set in the cost center facility cost and labor cost master table 145 is set (Step S91). When the unit machining cost of a new cost center is set, the name and ability of the new cost center are added to the cost center name master file 132 and cost center ability master file 133 (Step S92).

When setting of a new cost center is completed, the unit machining cost is determined based on the cost center costs (facility cost and labor cost) which can be directly identified, and calculated common cost ratio and allocated cost ratio using the equation mentioned below (Step S93). The thus obtained unit machining cost of the cost center is stored in the cost center unit cost master table 147.

When a cost center which is the same as that already set in the master table is set, the unit machining cost is determined based on the cost center costs (facility cost and labor cost) which can be directly identified, and calculated common cost ratio and allocated cost ratio using the equation mentioned below, while referring to the cost center facility cost and labor cost master table 145 (Step S93). The thus obtained cost center unit machining cost is stored in the cost center unit cost master table 147.

> Unit machining cost=(facility cost ratio+facility-related common cost ratio)×(1+allocated cost ratio)+(labor cost ratio+labor-related common cost ratio)×(1+allocated cost ratio)

Thus, the unit machining cost and indexical ratios can be determined and stored in the cost center unit machining cost master table 147 and indexical ratios master table 146.

As mentioned above, according to the embodiment of the present invention, direct costs are at first input, and then data concerning the indirect management cost, common facility cost, building cost, and overhead expenses, which cannot be directly identified, are input one by one. These costs are classified into five categories, i.e., the facility-related common cost, labor-related common cost and allocated cost, which are to be included in the processing cost, and management/sales cost and material management cost. The unit machining cost is automatically determined by the thus obtained results.

Therefore, the user can determine the unit machining cost and indexical ratios even when the user does not have detailed knowledge of the unit machining cost and indexical ratios.

The procedures for determining the unit machining cost and indexical ratios are the same whether the business unit to be examined is an ideal business unit or an actual factory. Namely the above-mentioned input/calculation procedures can be used whether the business unit to be examined is an ideal business unit or an actual factory.

When data are input, similar data which have been already input may be displayed such that the user can amend only different data in the display.

In addition, when the calculated data are stored in the master tables 141 to 147, the data may be output from the terminal 120 such that the user can use the output copies.

As a modified second embodiment of the present invention, it is possible to utilize the data input and calculated in the second embodiment for simulation of work restructuring. For example, when there is a plan in which a member is thrown in an indirect management section, the indirect management cost can be re-calculated to be compared with the former indirect management cost. Namely, the influence of increase of a member on the business can be simulated.

Third Embodiment

Next, a third embodiment of the system of the present invention will be explained.

In the system of the present invention, the unit machining cost and indexical ratios are determined while being compared with reference data. However, the system of the present invention can also be utilized for estimating or comparing the manufacturing costs of various products or parts. Hereinafter an embodiment of part cost estimation system will be explained in detail.

Figure 18:
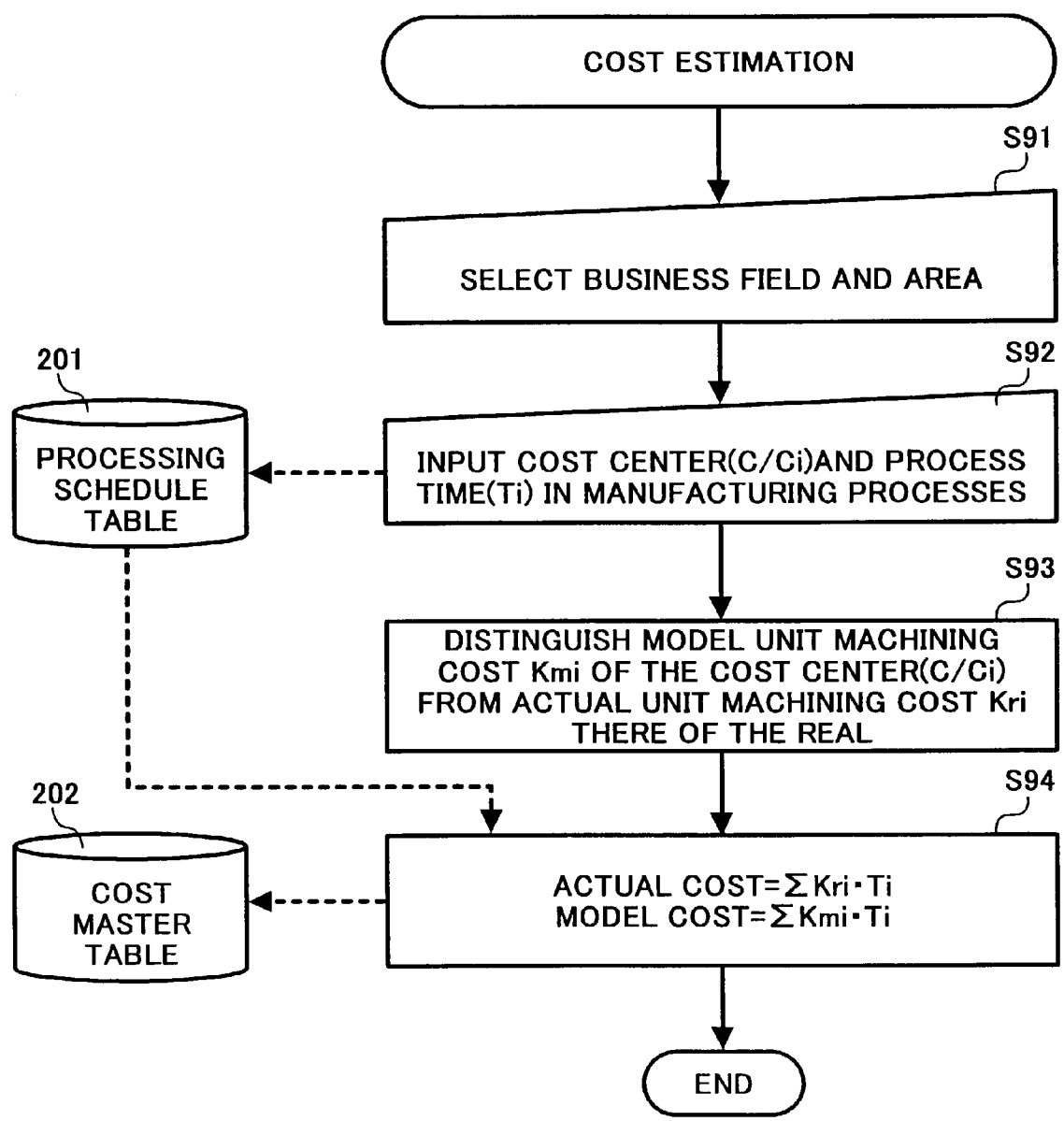
FIG. 18 is a flowchart illustrating an embodiment of the flow of the cost estimation in the third embodiment.

The constitution of the part cost estimation system is the same as that illustrated in FIGS. 1 and 2. The operation of the part cost estimation system will be explained while referring to FIG. 18.

At first, a user accesses the ASP 110 using a terminal 120 of the business unit of the user. The user designates his business field and the area where a product is to be produced, such as Japan and China (Step S91).

Then the user identifies a cost center C/C$_i$ (i is an integer of from 1 to n, i.e., C/C$_1$ to C/C$_n$), which is used in the manufacturing processes of the product, and in addition the user identifies information on the cost center C/C$_i$ and processing time T$_i$ of the cost center (Step S92). The server 111 stores in a processing schedule table 201 the input cost center C/C$_i$ and the processing time T$_i$ while they are associated with each other.

Then the server 111 reads the unit machining cost K$_{mi}$ of each cost center C/C$_i$ of the model factory in the designated area and the actual unit machining cost K$_{ri}$ of the company (i.e., the user) from the memory unit 121 (Step S93).

Then the server 111 calculates the model manufacturing cost of the product, which is a cost when the product is manufactured in the model factory in the designated area, using the equation mentioned below. Similarly, the server 111 calculates the actual manufacturing cost, which is a cost when the product is manufactured in the actual factory, using the equation mentioned below (Step S94).

> Model manufacturing cost=$\Sigma K_{mi} \cdot T_i$
>
> Actual manufacturing cost=$\Sigma K_{ri} \cdot T_i$ Then the server 111 stores the thus obtained two manufacturing costs in a cost master table 203, and sends the cost data to the terminal 120.

Thus, the user can compare the estimated two manufacturing costs. These cost data are useful when business planning is performed.

In addition, it is possible for the user to compare two or more manufacturing processes by performing the above-mentioned cost estimation operation while changing the cost estimation conditions such as cost tables and manufacturing processes.

The above-mentioned embodiments may be modified as follows.

For example, a recording medium (e.g., CD-ROMs) is prepared in which a program allowing a computer to execute the operation of the ASP is stored. By installing the program stored in the recording medium in a computer, the program can provide the ASP to the computer or a memory such as hard discs which serves as a peripheral equipment of the computer.

Fourth Embodiment

Next, a fourth embodiment of the cost estimation system (i.e., another part cost estimation system) of the present invention will be explained while referring to drawings.

Figure 19:
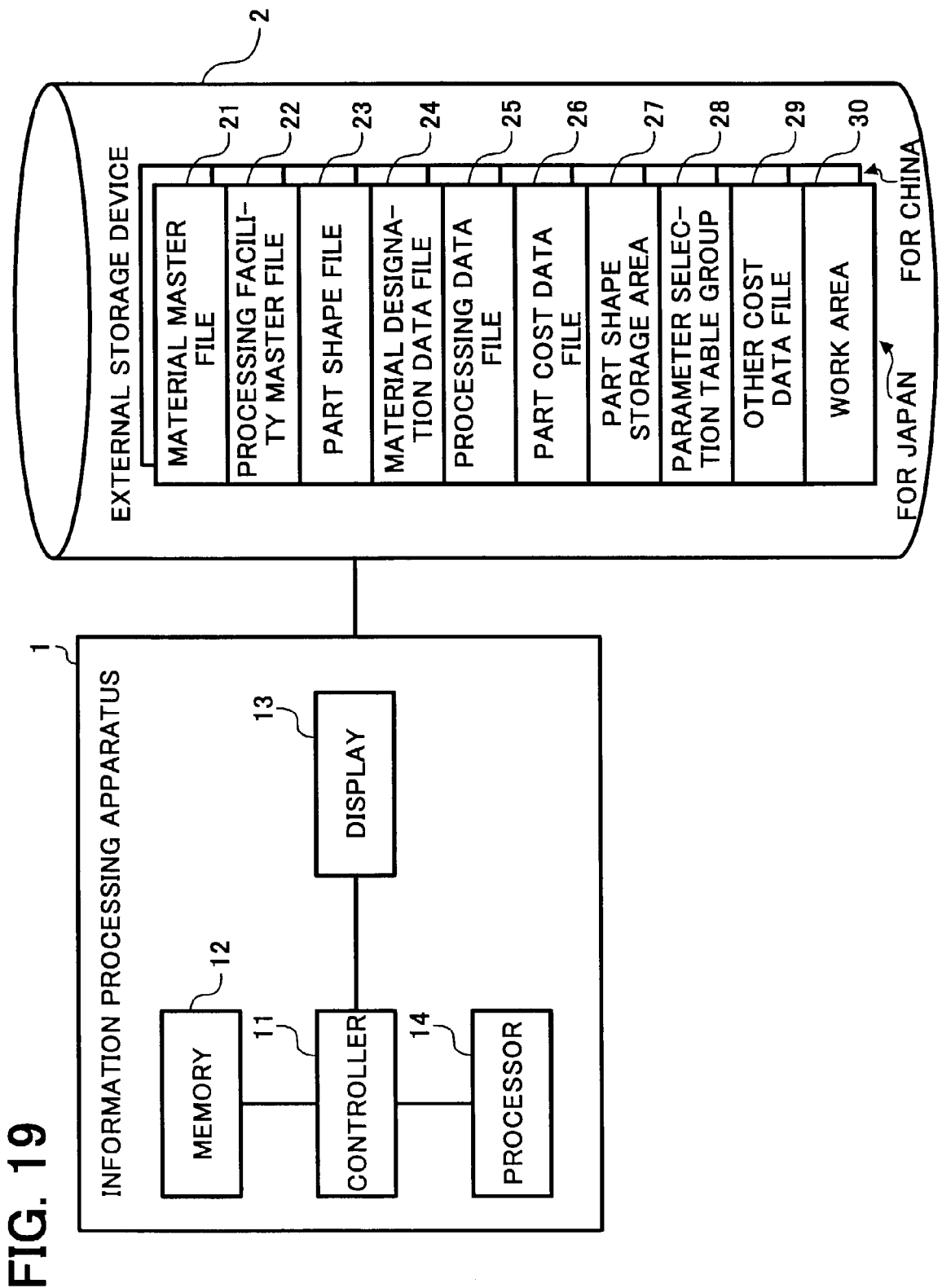
FIG. 19 is a block diagram illustrating an embodiment of the part cost estimation system of the fourth embodiment of the present invention.

FIG. 19 is a block diagram illustrating another embodiment of the part estimation system of the present invention.

This part cost estimation system is a system in which the cost of a part which is manufactured by cutting or turning is estimated. The part cost estimation system includes an information processing device 1 and an external storage device 2.

The information processing device 1 includes a controller 11, a memory 12, a display 13 and an operating device 14.

The controller 11 includes a CPU (i.e., a central processing unit) or the like. The controller 11 estimates the cost of a part based on the information input by an estimation operator using a control program stored in the memory 12. The controller 11 performs a processing of displaying the estimated cost in the display 13.

The memory 12 includes a ROM (Read Only Memory), a RAM (Random Access Memory) and the like. The ROM stores a control program by which the CPU is operated. The RAM stores temporary data when estimating the cost of a part, and has a work area needed for processing of the CPU.

The display 13 includes a liquid crystal display panel or the like display. The display 13 displays a window having an image to which the estimation operator inputs information needed for estimating the cost of the part, another window having an image in which the estimated cost of the part to be manufactured is displayed.

The operating device 14 includes a keyboard, a mouse and the like, and is a device by which information needed for designing the part, such as name of the material of the part and shape of the part, is input.

The external storage device 2 is connected with the information processing device 1 directly or through a LAN (i.e., Local Area Network), and has plural files in which information needed for estimating the part costs are stored.

The stored files in the external storage device 2 includes a material master file 21, a processing facility master file 22, a part shape file 23, a material designation data file 24, a processing data file 25, a part cost data file 26, a part shape storage area 27, parameter selection tables 28, another cost data file 29 and a work area 30.

At this point, it is preferable that the data in each of the material master file 21 to part cost data file 26 are prepared for each manufacturing county (e.g., Japan and China) in which the part is manufactured and stored in the external storage device 2.

Figure 20B:
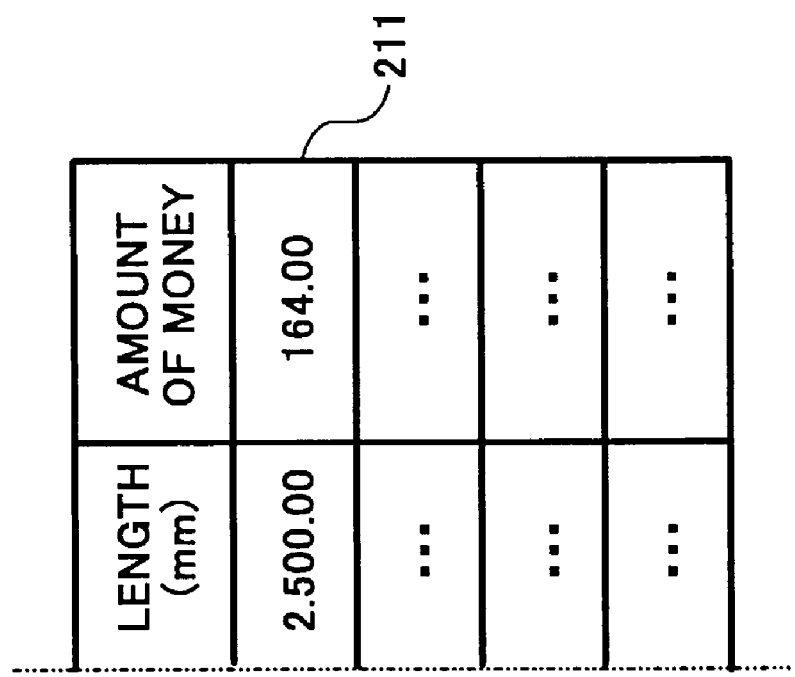
FIG. 20 is a schematic view illustrating an embodiment of the material master file illustrated in FIG. 19.

As illustrated in FIG. 20, the material master file 21 illustrated in FIG. 19 stores material data 211 including information on the materials (i.e., raw materials) to be used for manufacturing parts.

The material data 211 includes, for example, the following data concerning materials to be used for manufacturing parts:
(1) name;
(2) constituents;
(3) outside diameter (mm);
(4) inside diameter (mm) (when a material is not a tube, the inside diameter of the material is 0.00 mm);
(5) surface roughness (Å);
(6) tolerance of width;
(7) grade in dimension of a cut portion (i.e., the tolerance of the dimension of a cut portion);
(8) total length (mm); and
(9) cost.

As illustrated in FIG. 21, the processing facility master file 22 illustrated in FIG. 19 stores processing facility data 221 including the cost needed for operating each facility.

The processing facility data 221 includes, for example, the following data concerning facilities to be used for manufacturing parts:
(1) name of each facility, i.e., cost center (C/C name);
(2) type of each cost center indicating the ability thereof (C/C ability);
(3) facility cost at which a facility can be operated for one hour (unit of Yen/Hr);
(4) labor cost needed for operating a facility for one hour (unit of Yen/Hr);
(5) total of the facility cost and labor cost (unit of Yen/Hr);
(6) facility cost at which a facility can be operated for one second (unit of Yen/s);
(7) labor cost needed for operating a facility for one second (unit of Yen/s); and
(8) total of the facility cost and labor cost (unit of Yen/s).

The part shape file 23 as illustrated in FIG. 19 includes plural figures needed for designating the shape of each part to be manufactured.

Figure 22C:
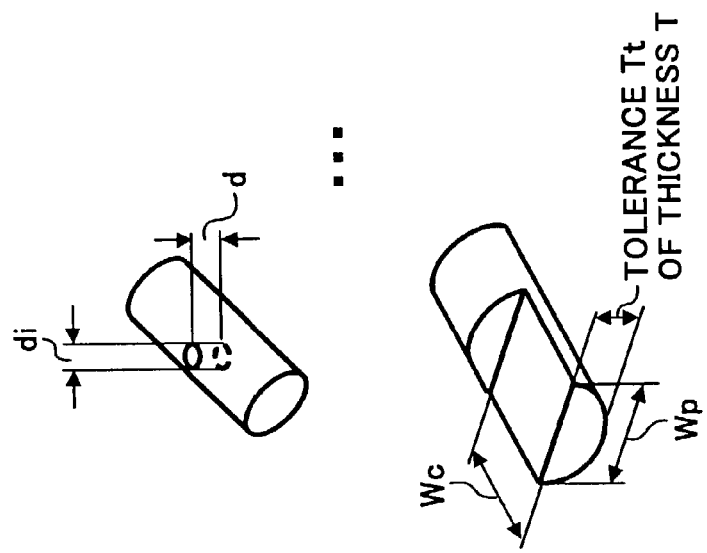
FIG. 22 is a schematic view illustrating an embodiment of the part shape file illustrated in FIG. 19.
Figure 22B:
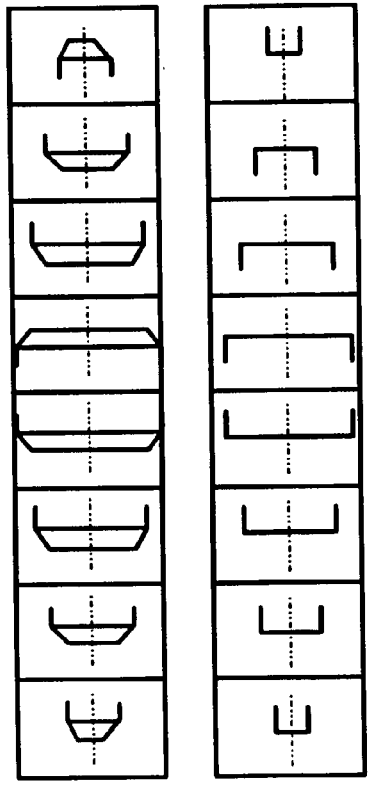
Figure 22A:
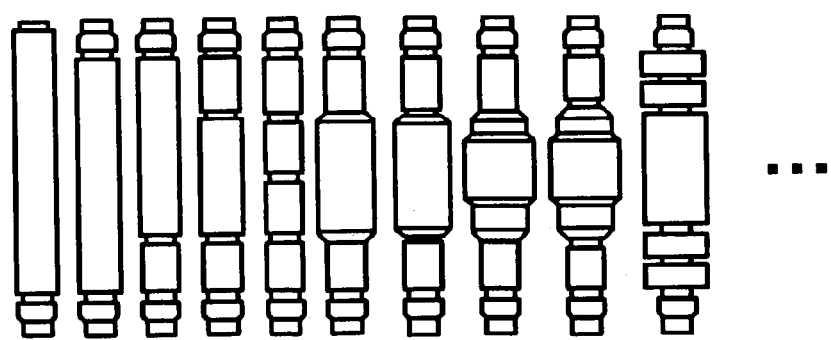

The part shape file 23 stores figures (i.e., candidate figures) as illustrated in FIG. 22A. The user selects one of the figures which is the same as or similar to the shape of the part to be manufactured and inputs the selected figure. In addition, the part shape file 23 stores figures as illustrated in FIG. 22B. The user uses the figures when the selected figure is changed into the desired shape of the part to be manufactured. Further, the part shape file 23 stores figures used for explaining how to input dimension information needed for drilling/tapping processing, fraise processing or the like.

As illustrated in FIG. 23, the material designation data file 24 illustrated in FIG. 19 stores material designation data 241 including information needed for manufacturing parts.

The material designation data 241 includes, for example, the following data concerning the parts to be manufactured:
(1) part number by which a part is identified;
(2) names of parts;
(3) number of lots of the part to be manufactured in one month (unit of pieces);
(4) total length of parts (unit of mm);
(5) constituents of materials used for manufacturing parts;
(6) outside diameter of the materials (unit of mm);
(7) inside diameter of the materials (unit of mm);
(8) surface roughness (Å) of the materials;
(9) tolerance of width of the materials; and
(10) grade in dimension of the materials.

The processing data file 25 illustrated in FIG. 19 stores processing data 251 including information concerning all processings performed on the part to be manufactured.

As illustrated in 24, the processing data 251 includes, for example, the following data:
(1) part number of the part to be manufactured;
(2) information as to chamfering of the part to be manufactured;
(3) grooving information needed for performing a grooving processing on the part;
(4) edge-dressing information needed for performing an edge-dressing processing on the part;
(5) radial processing information needed for performing a radial drilling or tapping processing on the part;
(6) fraise processing information needed for performing a fraise processing on the part; and
(7) other processing information.

The above-mentioned edge-dressing information includes information on a countersinking processing in which a cone-form recess is formed at an edge portion as illustrated in FIG. 38C; information on a drilling processing in which a hole is formed at an edge portion as illustrated in FIG. 38C; and information on a tapping processing in which a tapping hole is formed at an edge portion as illustrated in FIG. 38C.

The other processing information mentioned above includes processing information as to whether the part to be manufactured is to be subjected to an induction hardening treatment; whether the part is to be subjected to a hardening treatment other that induction hardening treatments; straightness of the part; circumferential fluctuation; total fluctuation; and whether there is a processing direction using a drawing.

As illustrated in FIG. 25, the part cost data file 26 illustrated in FIG. 19 stores part cost data 261 including the part number of the part to be manufactured; the estimated cost of the part; the material cost of the part; the processing cost of the part; and other costs of the part.

The part cost mentioned above is a total cost which is obtained by totaling the material cost, processing cost and other costs. The material cost is a material cost needed for manufacturing a piece of part. The processing cost is a processing cost needed for performing a cutting processing on a material to manufacture apiece of part. The other processing costs are costs needed for other processings such as plating and hardening when manufacturing a piece of part.

The part shape storage area 27 illustrated in FIG. 19 stores a temporary figure which is used for forming a figure corresponding to the shape of the part is prepared.

The parameter selection tables 28 include plural tables which are used for designating parameters needed for calculating the manufacturing time spent for manufacturing a part using an equation established for each processing facility.

The manufacturing time mentioned above includes an operating time expended in actually operating a processing facility and a set-up time expended in setting a tap or the like to the facility.

For example, a cam shaft automatic lathe is used as a processing facility, the operating time of the facility is determined by the following equations 1 to 6. The set-up time is determined by the following equations 7 and 8.

Equations Concerning Operating Time

Operating time=(machining time+material changing time)×1.0  Equation 1

Machining time=(needed total revolution)×86.4/ (main shaft revolution×main shaft revolution coefficient)+edge processing time  Equation 2

Machining time=(needed total revolution)×108.0/ (main shaft revolution×main shaft revolution coefficient)+5  Equation 3

Machining time=(needed total revolution)×108.0/ (main shaft revolution×main shaft revolution coefficient)+7  Equation 4

Needed total revolution=Σ{(dimension in drawing+ approach amount)/(standard feeding amount× feeding coefficient)}  Equation 5

Material changing time=45/(pieces of part made from one material)  Equation 6

Equations Concerning the Set-up Time

Set-up time=(1903+935×number of tools set on the main body+695×number of tools set for edge processing)×1.10/(number of manufacturing lots)  Equation 7

Set-up time=(2028+935×number of tools set on the main body)×1.10/(number of manufacturing lots)  Equation 8

Then the parameter selection tables 28 of a cam shaft automatic lathe will be explained.

The parameter selection tables 28 of a cam shaft automatic lathe includes a main shaft revolution coefficient designation table 281 as illustrated in FIG. 26; a main shaft revolution designation table 282 as illustrated in FIG. 27; a standard feeding amount selection table 283 as illustrated in FIG. 28; a feeding coefficient selection table 284 as illustrated in FIG. 29; an approach amount selection table 285 as illustrated in FIG. 30; a tool number selection table 286 as illustrated in FIG. 31; and an edge processing time selection table 287 as illustrated in FIG. 32.

As shown in FIG. 26, the main shaft revolution coefficient table 281 is a table used for determining the parameters of the main shaft revolution coefficient in equations 2, 3 and 4. The main shaft revolution coefficient table 281 includes the name of the materials used for the part to be manufactured and the main shaft revolution coefficient for each of the materials.

As shown in FIG. 27, the main shaft revolution table 282 is a table used for determining the parameters of the main shaft revolution in equations 2, 3 and 4. The main shaft revolution table 282 includes items such as the outside diameter of the material used for the part to be manufactured and the main shaft revolution for the outside diameter.

As shown in FIG. 28, the standard feeding amount selection table 283 is a table used for determining the standard feeding amount in equation 5. The standard feeding amount selection table 283 includes drawing factors such as processing conditions in the cutting or turning operation to be performed on the part, and corresponding standard feeding amount of the main shaft.

The drawing factors represent the surface accuracy, such as rough finishing, normal finishing and fine finishing, and tolerance of the part subjected to cutting or turning. Among the factors (i.e., surface accuracy and tolerance), the severer factor is used.

The feeding amount is a standard feeding amount of the main shaft in a case in which an outside diameter grinding processing, grooving processing, parting processing or chamfering processing is performed.

As shown in FIG. 29, the feeding coefficient selection table 284 is a table used for determining the feeding coefficient in equation 5. The feeding coefficient selection table 284 includes items such as the feeding coefficient for each material used for the part to be manufactured and the feeding coefficient for the operation performed on the part.

The feeding coefficient in equation 5 is determined as a product of the feeding coefficient for the material and the feeding coefficient for the operation. In addition, when there are two factors, the feeding coefficient is determined as a product of the feeding coefficients of the two factors.

As shown in FIG. 30, the approach amount selection table 285 is a table used for determining the approach amount in equation 5. The approach amount table 285 includes items such as operations performed for manufacturing the part, size in drawing, and approach amount for the operations and size in drawing.

As shown in FIG. 31, the tool number selection table 286 is a table used for determining the number of edge processing tools to be set in equation 7. The tool number selection table 286 includes items such as the operations performed for manufacturing the part, and the number of tools set on the cam shaft automatic lathe when each operation is performed.

As shown in FIG. 32, the edge processing time selection table 287 is a table used for determining the edge processing time in equation 2. The edge processing time selection table 287 includes items such as the operations of processing the edges of the part and time expended in performing the operations.

The other cost master file 29 stores other cost master data used for calculating the unit cost of the part to be manufactured. The other cost master data include data of costs other than the material costs and processing costs, such as a part management cost, a management/sales cost, a profit rate, a transport cost, and a material handling cost.

The work area 30 as illustrated in FIG. 19 temporarily stores the chamfering information, grooving information, edge-dressing information, radial processing information, fraise processing information and other processing information, which have been input from the display 13.

Figure 33:
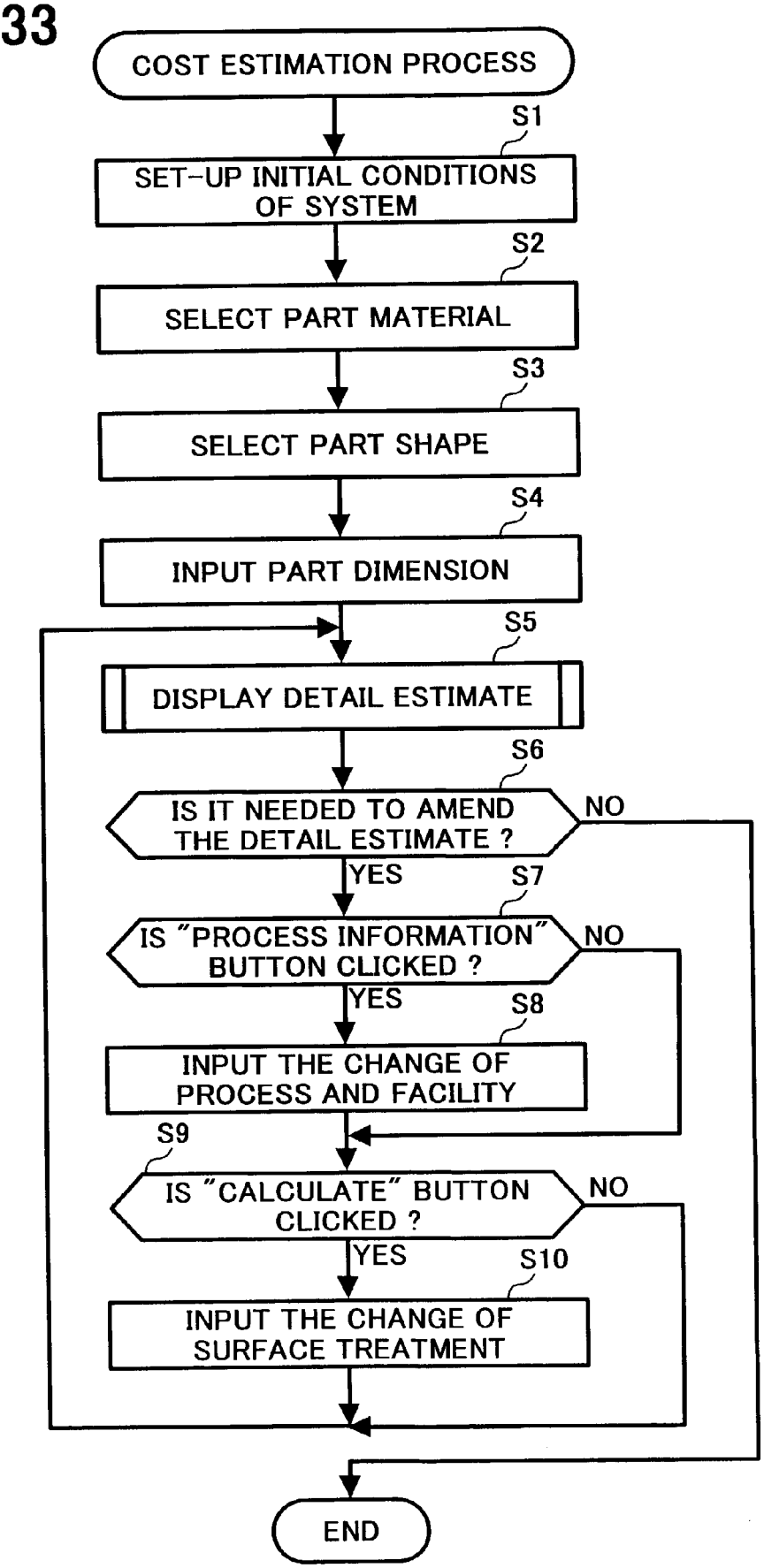
FIG. 33 is a flowchart illustrating the flow of operations of the part cost estimation system.

Then the cost estimation processing of the cost estimation system will be explained referring to the flowchart illustrated in FIG. 33.

At first, the information processing apparatus 1 performs an initial set-up operation (Step S1). Namely, the information processing apparatus 1 achieves a state in which the cost estimation processing of the part to be manufactured can be performed, i.e., the files in the external storage device 2, such as the material master file 21 and processing facility master file 22, are opened and a window 150 having an image to which drawing information is to be input is displayed in the display 13.

Figure 34:
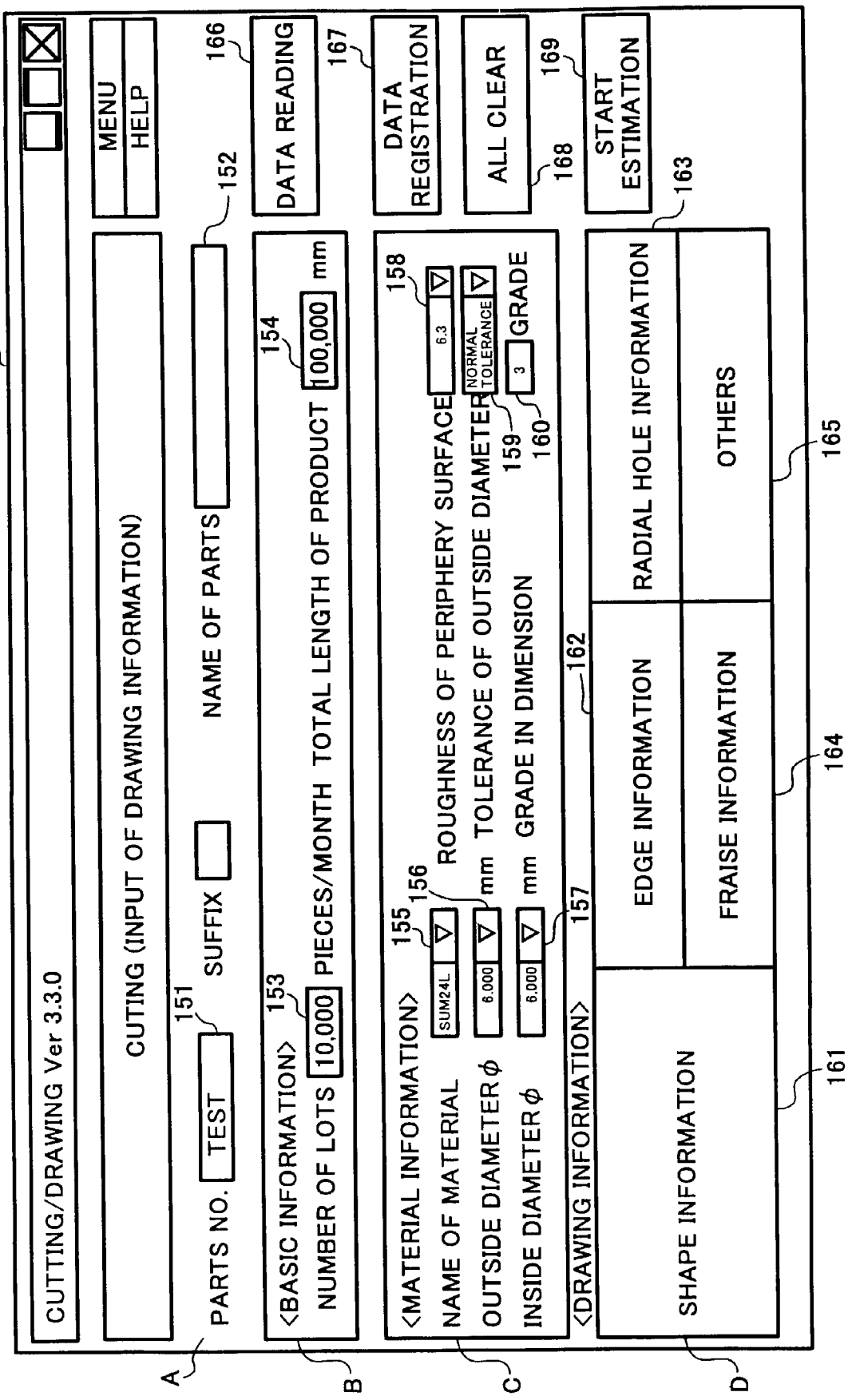
FIG. 34 is a schematic view illustrating an embodiment of the window displaying a figure information inputting image.

As shown in FIG. 34, the window 150 has an image to which the information on the materials to be used for manufacturing the part are to be input. The image includes an area A to which the part designation information designating the part to be manufactured is to be input; an area B to which the basic information on the part is to be input; an area C to which the material information on the part is to be input; and area D including various buttons assisting inputting operation of an operator.

The area A includes a portion 151 to which the part number is input to designate the part to be manufactured and a portion 152 to which the part name attached to the part having the part number is to be input.

The area B includes a portion 153 to which the number of lots of the part manufactured in a month is to be input and a portion 154 to which the total length of the part is to be input.

The area C includes a portion 155 to which the name of the material used for the part is to be input; a portion 156 to which the outside diameter of the material is to be input; a portion 157 to which the inside diameter of the material is to be input; a portion 158 to which the surface roughness of the material is to be input; a portion 159 to which the tolerance of the outside diameter of the material is to be input; and a portion 160 to which the grade in dimensions of the processed material is to be input.

The area D includes a shape information button 161, an edge information button 162, a radial hole information 163, a fraise information 164, an others button 165, a data reading button 166, a data registration button 167, an all clear button 168 and an estimation start button 169.

The shape information button 161 is used when it is desired to display a window having an image, which includes plural figures used for designating the shape of the part to be manufactured, in the display 13 to select one of the plural figures.

The edge information button 162 is used when it is desired to display a window having an image, to which the information on the edges of the part is to be input, in the display 13.

The radial hole information 163 is used when it is desired to display a window having an image, in which the shape of the hole or tap formed on the part in a radial direction is to be designated, in the display 13.

The fraise information button 164 is used when it is desired to display a window having an image, in which the shape of the D cut formed by subjecting the part to a fraise processing is to be designated, in the display 13.

The others button 165 is used when it is desired to display a window having an image, to which the information on processings other than the chamfering, grooving, edge-dressing, radial drilling processing and fraise processing is to be input, in the display 13.

The data reading button 166 is used when the information on the previously manufactured parts is displayed in the display 13.

The data registration button 167 is used when the material designation data 241 are generated based on the information input in the window 150 and stored in the material designation data file 24.

The all clear button 168 is used when all the information input in the window 150 is erased.

The estimation start button 169 is used when it is desired to start the cost estimation processing of the part after all the information such as parts number, information on the materials and part processing information mentioned below, has been input.

Then the information processing apparatus 1 selects the material of the part to be manufactured based on the information input by the operator in the window 150 (Step S2).

Namely, when the data registration button 167 is clicked after the operator has input the information, such as part number and material information, in the portions 151 to 160 in the window 150, the information processing apparatus 1 generates the material designation data 241 as illustrated in FIG. 23 based on the information input in the window 150. The information processing apparatus 1 stores the thus generated material designation data 241 in the material data file 24.

Figure 35:
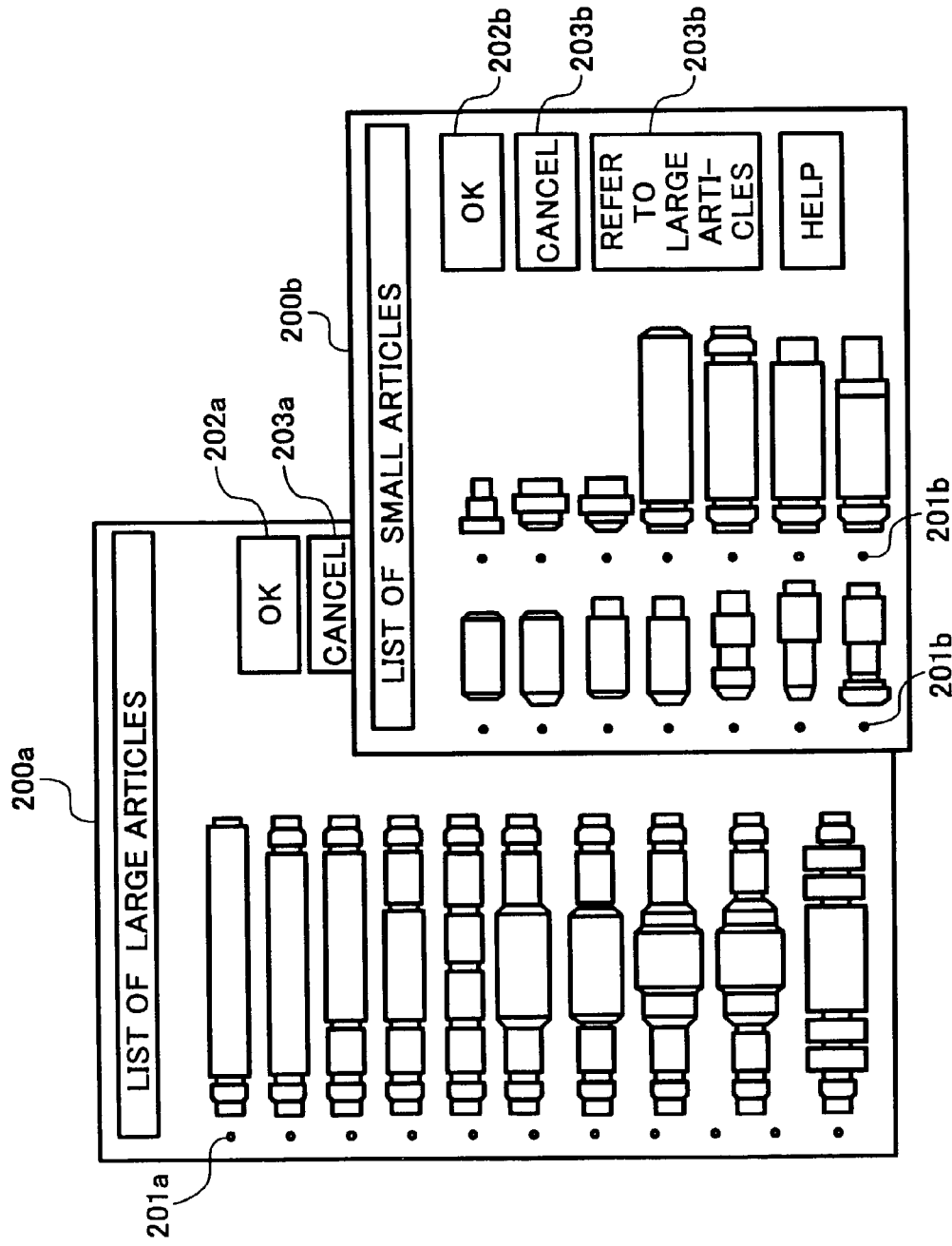
FIG. 35 is a schematic view illustrating an embodiment of the window displaying the shape of a part to be produced.

When the operator clicks the shape information button 161, the information processing apparatus 1 displays in the display 13 a window 200a having a part shape selection image as illustrated in FIG. 35.

As illustrated in FIG. 35, the window 200a includes plural candidate figures among which a suitable shape is to be selected for long parts; a button 201a which is provided in front of each figure and by which the figure is designated; an OK button 202a; a cancel button 203a; and a small article reference button 204a which is hidden by the upper figure in FIG. 35.

Figure 36:
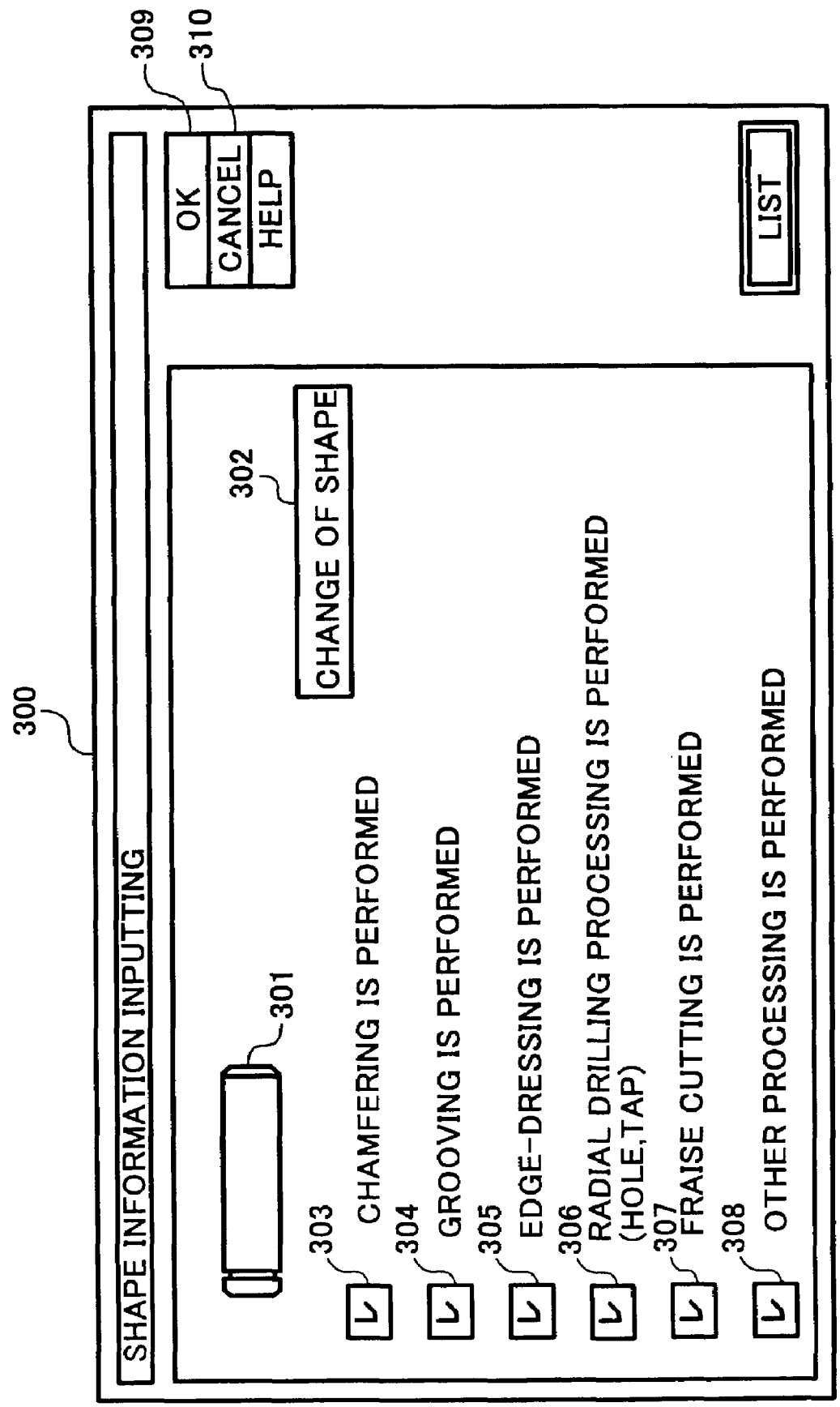
FIG. 36 is a schematic view illustrating an embodiment of the window displaying an image in which shape change information is input and the dimension information of the part to be produced is input.

The OK button 202a is used when the designated figure is stored in the part shape storage area 27 in the external storage device 2 and a window 300 as illustrated in FIG. 36 is displayed in the display 13.

The cancel button 203a is used when the designated figure is canceled.

The small article reference button 204a is used when a window 200b including candidate figures for small articles is displayed in the display 13.

When the operator clicks the small article reference button 204a in the window 200a, the information processing apparatus 1 displays the window 200b displaying candidate figures for small articles in the display 13.

The window 200b has the same buttons as those provided in the window 200a including candidate figures for long parts.

When the operator clicks the OK button 202a (or 202b) in the window 200a (or 200b), the information processing apparatus 1 displays a window 300 as illustrated in FIG. 36 in the display 13.

The window 300 is used when the designated figure in the window 200a (or 200b) is changed, or a dimension is input in the designated figure.

As illustrated in FIG. 36, the window 300 displays a FIG. 301 which is designated in the window 200a (or 200b), and plural buttons for assisting inputting operation are provided therein.

The above-mentioned plural buttons include a shape change button 302, a chamfering information button 303, a grooving information button 304, an edge processing information button 305, a radial processing information button 306, a fraise processing information button 307, an other processing information button 308, an OK button 309 and a cancel button 310.

The shape change button 302 is used when the FIG. 301 illustrated in the window 300 is changed.

The chamfering information button 303 is used when the dimension of the part is input when the part is subjected to a chamfering processing.

The grooving information button 304 is used when a dimension of the part is input when the part is subjected to a grooving processing.

The edge processing information button 305 is used when a dimension of the part is input when the part is subjected to an edge processing.

The radial processing information button 306 is used when a dimension of the part is input when the material used for manufacturing the part is subjected to a radial drilling or tapping processing.

The fraise processing information button 307 is used when a dimension of the part is input when the part is subjected to a fraise processing.

The other processing information button 308 is used when a dimension of the part is input when the part is subjected to a processing other than the grooving processing, such as hardening.

The OK button 309 is used when a next processing is performed.

The cancel button 310 is used when all the information input in the window 300 is canceled.

Figure 37:
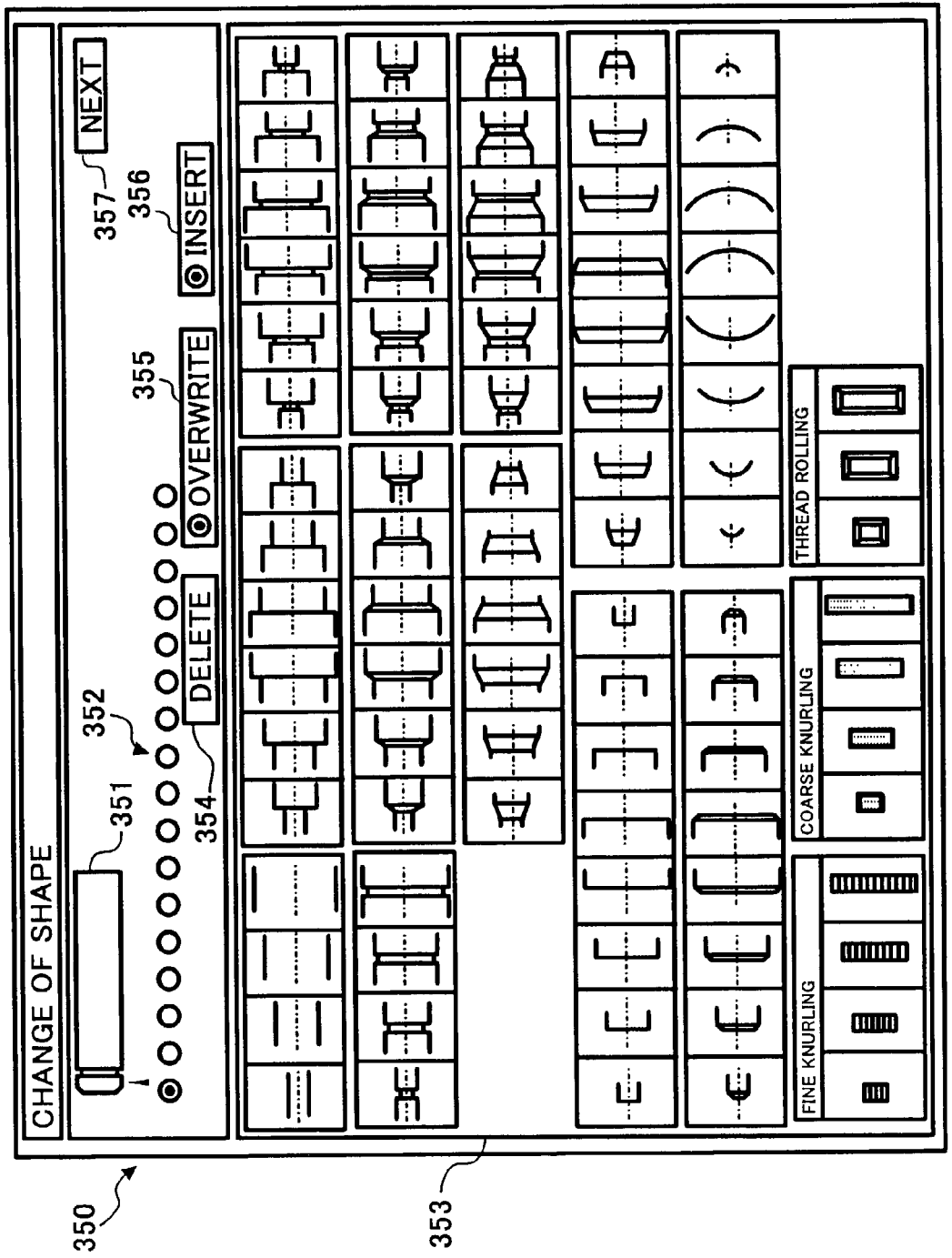
FIG. 37 is a schematic view illustrating the window displaying an embodiment of the image in which part shape change information is input.

When the operator clicks the shape change button 302, chamfering information button 303, grooving information button 304, edge processing information button 305, radial processing information button 306, fraise processing information button 307 and other processing information button 308, and then clicks the OK button 309, the information processing apparatus 1 displays in the display 13 a window 350 as illustrated in FIG. 37.

As illustrated in FIG. 37, the window 350 includes a FIG. 351 designated in the window 200a (or 200b) in the upper portion thereof; and plural buttons 352, which are used when the FIG. 351 is changed, below the FIG. 351. The FIG. 351 is one of the figures stored in the part shape storage area 27 of the external storage device 2.

In addition, the window 350 includes a figure list 353 including plural buttons (hereinafter referred to as a figure change button) by which one of the candidate figures is designated when the shape of the FIG. 351 is changed.

Further, the window 350 includes a delete button 354, an overwrite button 355, an insert button 356 and a next button 357 to assist inputting operations.

The delete button 354 is used when the portion of the figure, which portion is designated by the button 352, is deleted. The overwrite button 355 is used when the portion of the FIG. 351, which portion is designated by the button 352, is overwritten with any one of the figures illustrated in the figure list 353. The insert button 356 is used when any one of the figures illustrated in the figure list 353 is inserted to the portion of the FIG. 351, which portion is designated by the button 352.

The next button 357 is used when the window to which the dimension of the part to be manufactured is to be input is displayed in the display 13.

When the operator clicks any one of the buttons in the figure list 353 followed by clicking of one of the delete button, overwrite button and insert button, the information processing apparatus 1 displays in the display 13 an amended figure of the FIG. 351.

Figure 38:
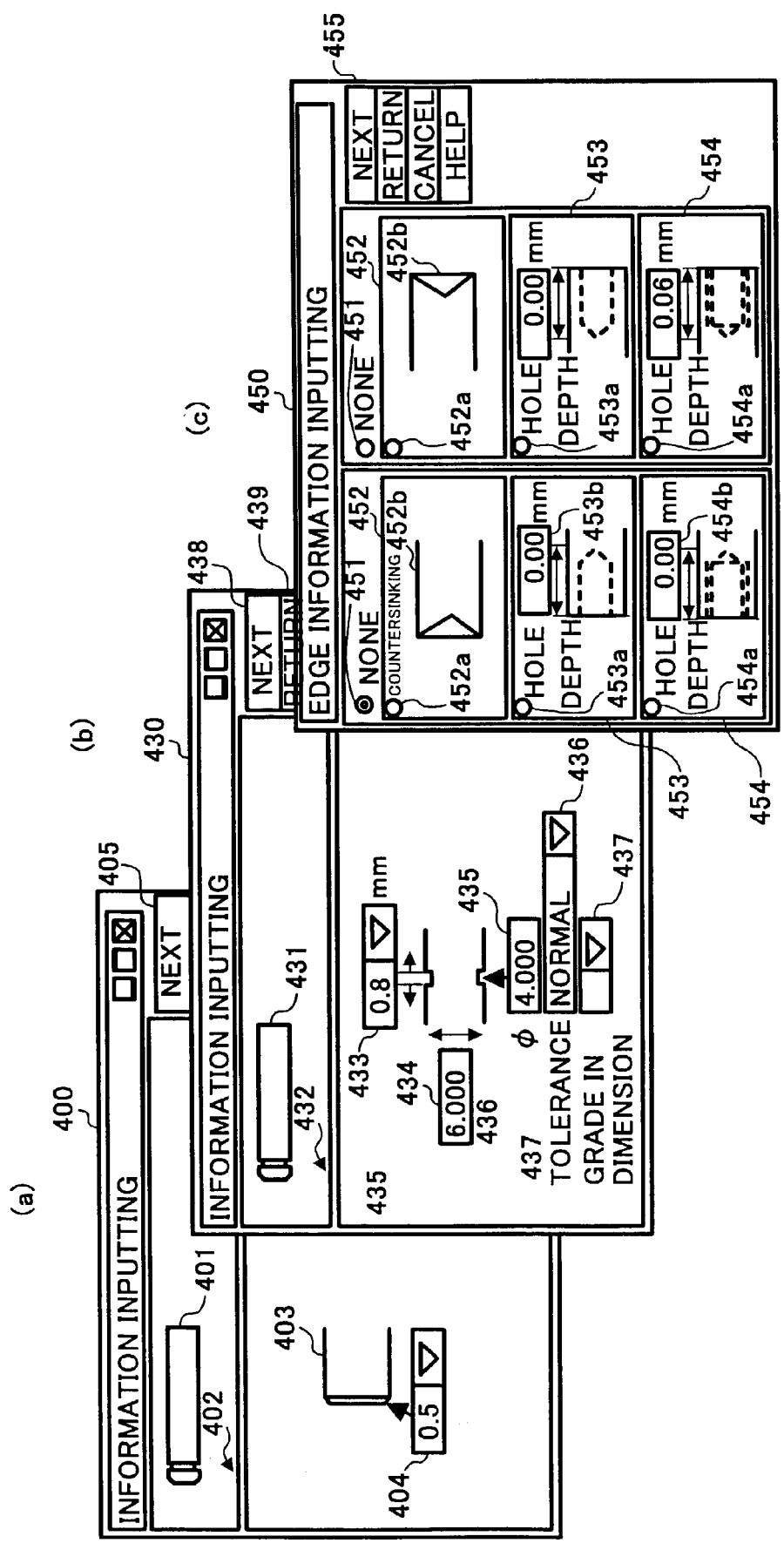
FIGS. 38 and 39 are schematic views illustrating the windows displaying embodiments of the part dimension inputting image.

Then the operator clicks the next button 357, the information processing apparatus 1 stores the amended version of the FIG. 351 in the part shape storage area 27 and displays a window 400 as illustrated in FIG. 38-(a).

The window 400 displays an image to which the dimension of the part is input when the part is subjected to a chamfering processing.

As illustrated in FIG. 38-(a), a FIG. 401 which is the amended version of the FIG. 351 in the window 350 and which is stored in the part shape storage area 27 is displayed in an upper portion of the window 400. If the shape of the part is not changed in the window 350, the figure is the figure designated in the window 200a or 200b.

In addition, the window 400 displays a FIG. 403 which is an enlarged figure of a portion of the part to be subjected to a chamfering processing, and a portion 404 to which the dimension of the part subjected to a chamfering processing is input.

When the operator inputs the dimension (0.5 mm in this case) of the part in the portion 404 and clicks the next button 405, the information processing apparatus 1 stores the dimension in the work area 30. In addition, as illustrated in FIG. 38-(b) the information processing apparatus 1 displays in the display 13 a window 430 to which the information on the grooving processing is to be input.

As illustrated in FIG. 38-(b), an amended FIG. 431 of the part which is amended in the window 400 and which is stored in the part shape storage are 27 is displayed in an upper portion of the window 430.

In addition, the portion of the part, to which a grooving processing is to be performed and which is designated by a cursor 432 in the FIG. 431, is displayed in the window 430.

Further, the window 430 includes a portion 433 which is located in the vicinity of the FIG. 431 and to which the width of the groove to be formed is to be input; a portion 434 to which the outside diameter of the part (i.e., a rod material) is to be input; a portion 435 to which the outside diameter of the grooved portion is to be input; a portion 436 to which the tolerance is to be input; and a portion 437 to which the dimension grade is to be input.

When the operator inputs in the portions 433 to 437, for example, the following dimensions:

(1) 0.8 mm for the groove width;
(2) 6.00 mm for the outside diameter of the rod material;
(3) 4.00 mm for the outside diameter of the grooved portion;
(4) normal tolerance for the tolerance; and
(5) 3 grade for the dimension grade, and then clicks the next button 438, the information processing apparatus 1 stores the information on the grooving processing in the work area 30. Then the information processing apparatus 1 displays a window 450 as illustrated in FIG. 38-(c).

Needless to say, the grooving processing is not limited to formation of one groove, and plural grooves may be formed.

As illustrated in FIG. 38-(c), the window 450 includes portions to which the shapes and dimensions of the left and right sides of the part are to be input.

Each of the portions to which the shapes and dimensions of the left and right sides of the part are to be input has a none button 451 which is used when no processing is needed; a portion 452 to which the countersinking processing information is to be input; a portion 453 to which the drilling processing information is to be input; and a portion 454 to which the tapping processing information is to be input.

The portion 452 includes a button 452a which is used for designating whether or not a countersinking processing is performed. The portion 453 includes a button 453a which is used for designating whether or not a hole is formed, and a portion 453b to which the depth of the hole is to be input. The portion 454 includes a button 454a which is used for designating whether or not a tapping processing is performed, and a portion 454b to which the depth of the tap is to be input.

When the operator inputs the dimension concerning the edge portion of the part in the window 450 and then clicks the next button 455, the information processing apparatus 1 stores in the work area 30 the information concerning the processing to be performed on the edge portion, which information has been input in the window 450.

Figure 39:
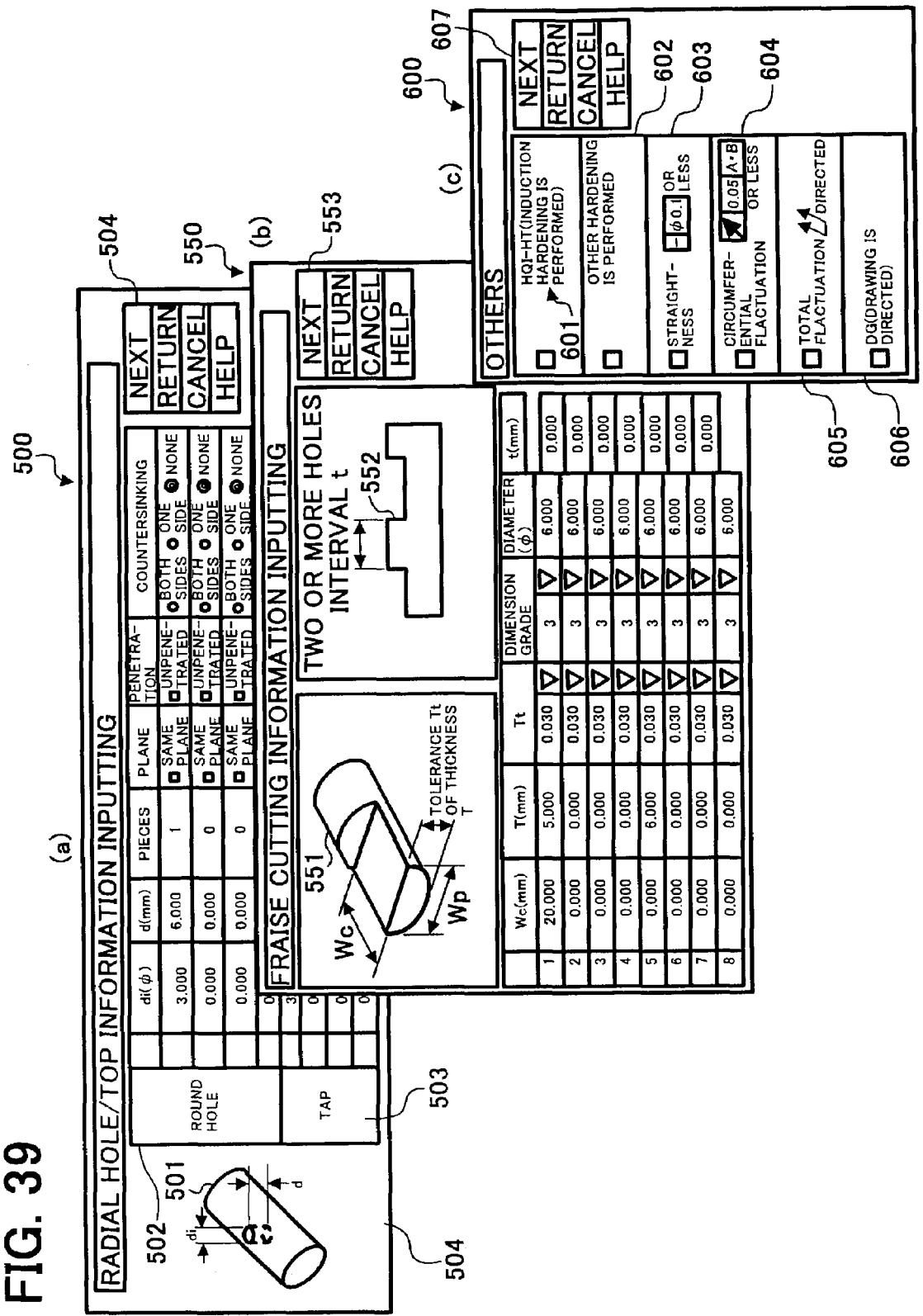

Then the information processing apparatus 1 displays in the display 13 a window 500 as illustrated in FIG. 39-(a) to which the information concerning the radial processing performed on the part is to be input.

As illustrated in FIG. 39-(a), the window 500 includes a figure 501 used for explaining the radial processing; a portion 502 to which the hole information is to be input; and a portion 503 to which the tap hole information is to be input.

The portions 502 and 503 include portions in which the following information is input:
(1) diameter of the hole;
(2) depth of the hole (mm);
(3) the number of the holes;
(4) the surface on which the hole is formed;
(5) whether the hole is a pass-through hole; and
(6) whether a countersinking processing is performed.

When the operator inputs processing information in the portions 502 and 503 of the window 500 and then clicks a next button 504, a window 550 having an image which is illustrated in FIG. 39-(b) and to which the fraise processing information is to be input is displayed in the display 13 while the radial information input in the window 500 is stored in the work area 30 of the external storage device 2.

As illustrated in FIG. 39-(b), the window 550 includes a FIG. 551 which is used for explaining the processing and a portion 552 to which the fraise processing information is to be input.

The portion 552 includes portions to which the following information is to be input:
(1) cutting width (unit of mm);
(2) final thickness (unit of mm);
(3) tolerance;
(4) dimension grade;
(5) diameter of the processed material; and
(6) interval between a D-cut portion and another D-cut portion (unit of mm).

When the operator inputs the fraise processing information in the portion 552 of the window 550 and then clicks a next button 553, the information processing apparatus 1 displays a window 600 having an image as illustrated in FIG. 39-(c) to which the other processing information including hardening information is to be input while storing the fraise processing information input in the window 550 in the work area 30 of the external storage device 2.

As illustrated in FIG. 39-(c), the window 600 includes a portion 601 to which information as to whether or not an induction hardening processing is performed is to be input; a portion 602 to which information as to whether or not another hardening processing is performed is to be input; a portion 603 in which the straightness of the product is designated; a portion 604 to which the circumferential fluctuation is to be input; a portion 605 to which the total fluctuation is to be input; and a portion 606 indicating whether there is an instruction using a drawing for the processings.

When the operator inputs the other processing information in the portions 601 to 606 of the window 600 and then clicks an end button 607, the information processing apparatus 1 stores the other processing information input in the window 600 in the work area 30 of the external storage device 2. In addition, the information processing apparatus 1 erases the window 600 and displays in the display 13 only the window 150 to which the above-mentioned drawing information can be input.

Then the information processing apparatus 1 reads the chamfering processing information, grooving processing information, edge processing information, radial processing information, fraise processing information and other processing information from the work area 30, to generate the processing data 251 of the part (see FIG. 24). The generated processing data 251 are stored in the processing data file 25 of the external storage device 2.

Thus, the part dimension input processing of Step S4 performed by the information processing apparatus 1 ends.

Figure 41:
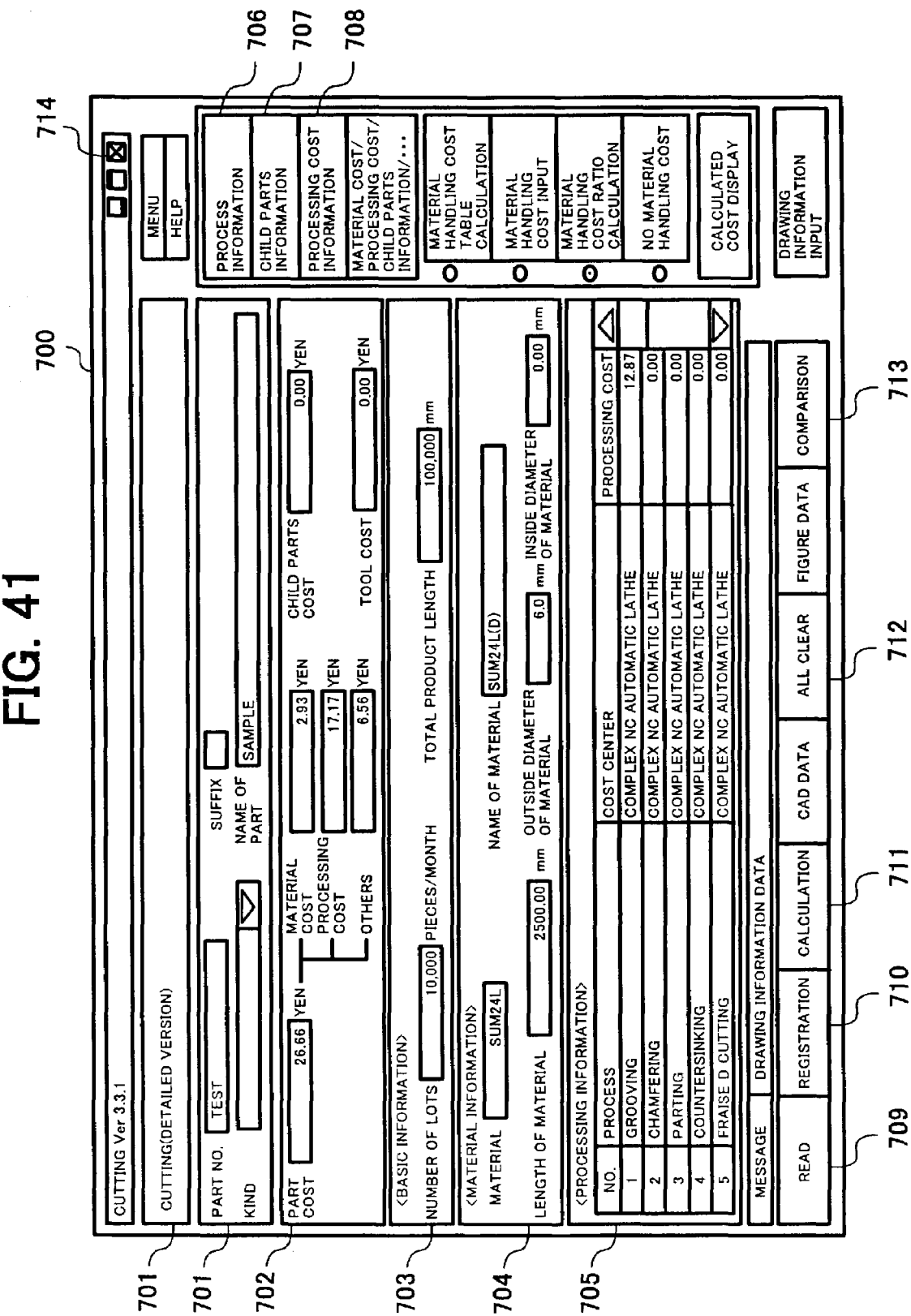

When the operator clicks an estimation start button 169 in the window 150, the information processing apparatus 1 estimates the cost of the part corresponding to the designated part number, and then displays in the display 13 a window 650 as illustrated in FIG. 40, a window 700 as illustrated in FIG. 41 or a window 800 as illustrated in FIG. 42 (Step S5).

As illustrated in FIG. 40, the window 650 includes a portion 651 displaying the basic information such as identification information of the part; a portion 652 displaying the part cost; a portion 653 displaying the material information of the part to be manufactured; a portion 654 displaying the cost of the child part of the part to be manufactured; and a portion 655 displaying the processing information of the part.

The portion 651 displays the part number, part name, production site, number of production lots per one month, etc.

The portion 653 displays the material cost, constituents, total length of the material, total length of the part, unit cost of the material, outside diameter of the material, number of parts to be produced, and quantity of standard material consumed.

The portion 654 displays the child part cost, part number of the child part, management-cost-related unit cost, number of child parts used, and total amount of money.

The portion 655 displays the processing cost spent on manufacturing the part; the tool cost spent on manufacturing the part; the production processes; the facilities used for the processes; the readying cost (i.e., cost spent until the part manufacturing starts); the time expended in manufacturing the part using the facilities; the facility cost spent on operating the facilities; the time expended in manufacturing the part; the labor cost spent on manufacturing the part; and processing cost.

The processing cost is the sum of the readying cost, facility cost and labor cost.

The window 650 has a close button 656, a next page button 657, and a print button 658 to assist inputting operations.

The close button 656 is used when the window 650 is closed. The next page button 657 is used when the below-mentioned window 700 which displays the details of estimation more specifically than the window 650 is displayed in the display 13.

The print button 658 is used when the image information displayed in the display 13 is printed on a paper.

The window 700 displays the details of the estimation more specifically than the window 650.

As illustrated in FIG. 41, the window 700 has a portion 701 displaying the basic information such as identification information of the part; a portion 702 displaying the part cost; a portion 703 displaying the basic information on the part to be manufactured; a portion 704 displaying the material information of the part; and a portion 705 displaying the information on the production processes of the part.

The portion 701 displays the part number, type of the part and part name.

The portion 702 displays the part cost, and the material cost, labor cost, other costs, child parts cost and tool cost constituting the part cost.

The portion 703 displays the number of production lots per one month (pieces/month) and the total length (mm) of the product.

The portion 704 displays the constituents, name of the material, total length of the material, outside diameter of the material and inside diameter of the material.

The portion 705 displays the process name, facilities (i.e., designated cost centers) used for the processing, and processing cost.

The window 700 has a process information button 706, a child part information button 707, a processing cost information button 708, a read button 709, a registration button 710, a calculation button 711, an all clear button 712, a comparison button 713, etc., to assist inputting operations.

The process information button 706 is used when the information on the production processes and facilities of the part to be manufactured is amended.

The child part information button 707 is used when the information on the child part provided on the part to be manufactured is input.

The processing cost information button 708 is used when the information concerning the plating to be performed on the part is input.

The read button 709 is used when the material designation data 241 corresponding to the designated part number, which are stored in the material designation data file 24 of the external storage device 2; the processing data 251 corresponding to the designated part number, which are stored in the processing data file 25; and the part cost data 261 corresponding to the designated part number, which are stored in the parts cost data file 26, are read out to display the information in each of the above-mentioned portions of the window 700 based on the data 241, 251 and 261.

The registration button 710 is used when the processing data 251 corresponding to the designated part number stored in the processing data file 25, and the part cost data 261 stored in the parts cost data file 26 are renewed based on the estimation details which are amended using the process information button 706, child part information button 707 or processing cost information button 708.

The calculation button 711 is used when the estimation details are amended using the process information button 706, child part information button 707 or processing cost information button 708.

The all clear button 712 is used when the contents displayed in the window 700 are cleared.

The comparison button 713 is used when a window 800 as illustrated in FIG. 42, which includes the processing cost and part cost for each of the facilities used for manufacturing the part, is displayed.

As illustrated in FIG. 42, the window 800 displays, for example, the name of the processes such as grooving and chamfering; and the processing cost and part cost for each of the cases in which the part is manufactured by, for example, an automatic processing (in FIG. 42a complex NC automatic lathe is used); a processing using a combination of a cam shaft automatic lathe with a secondary processing; a processing using a combination of a NC automatic lathe with a secondary processing; or a processing using a complex NC automatic lathe.

Figure 45A:
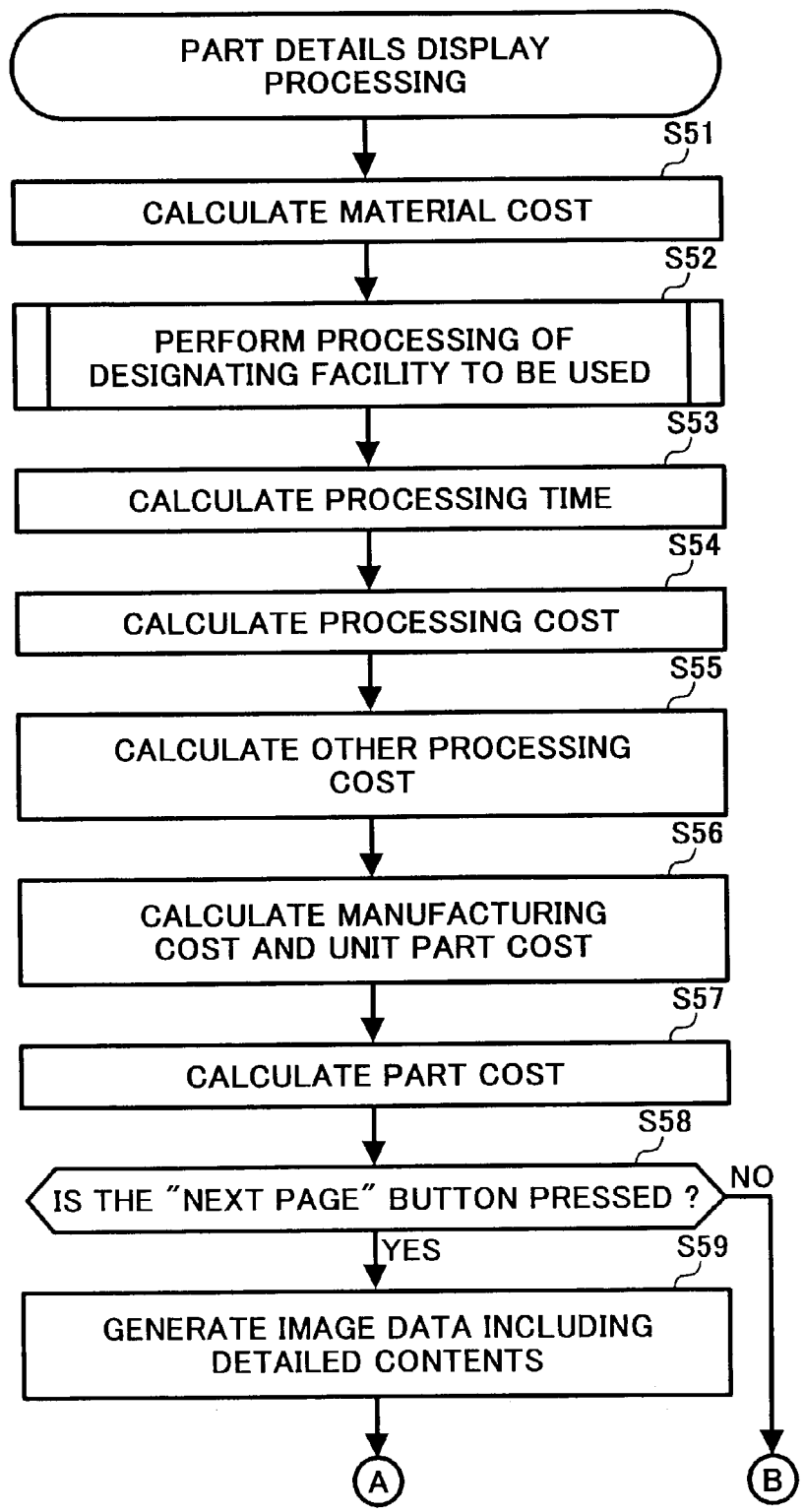
FIG. 45 is a flowchart illustrating the process of Step S5 in FIG. 33.
Figure 45B:
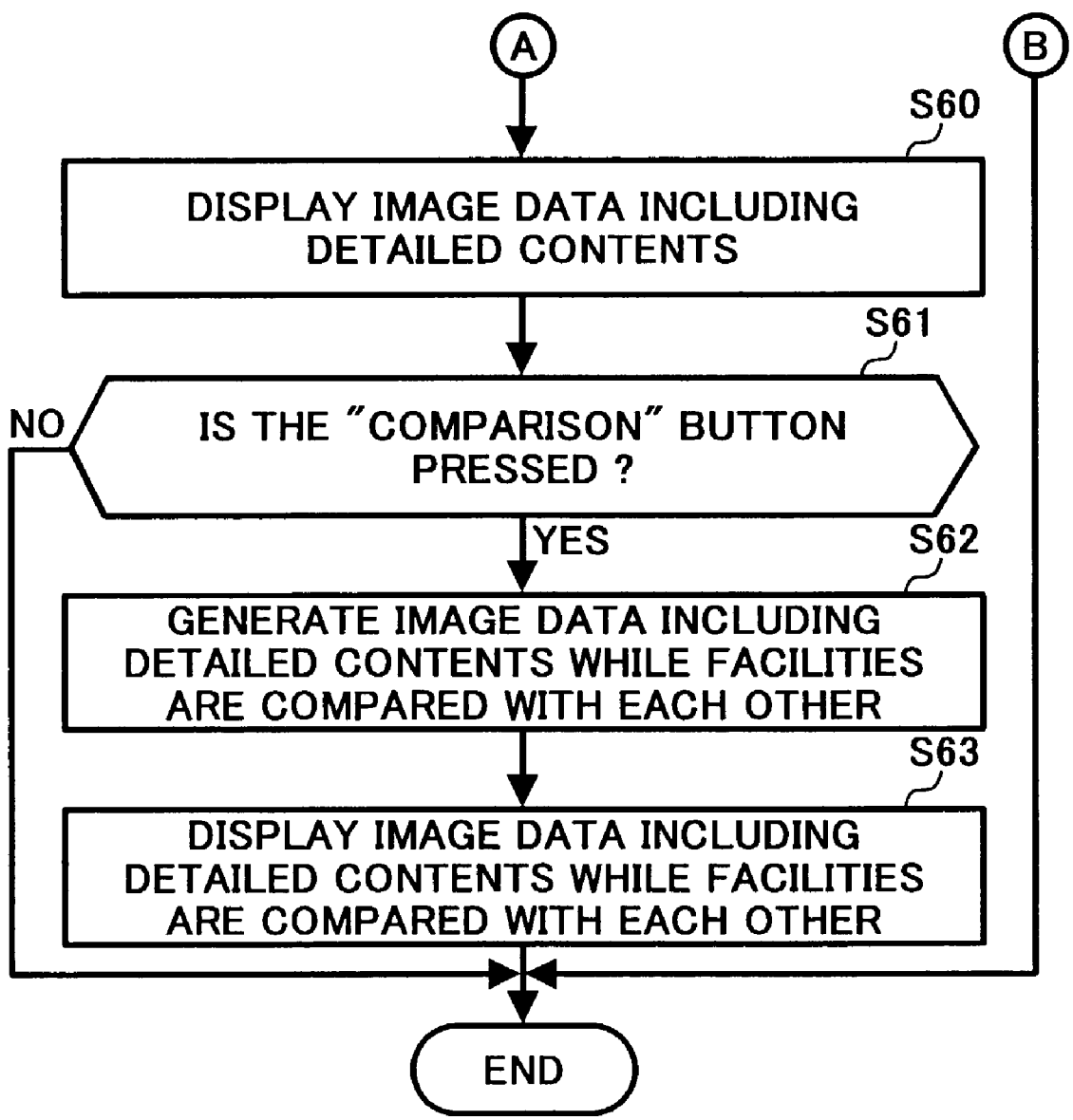

The facility used in the automatic processing is the facility designated by the information processing apparatus 1 in Step S52 in the flowchart illustrated in FIG. 45.

In Step S6, the operator decides whether or not the estimation is amended by changing the production processes and processing facilities and performing a surface treatment while referring to the window 700 displayed in the display 13.

When the production processes and processing facilities are not changed and a surface treatment is not performed, i.e., it is decided by the operator not to amend the estimation (Step S6; NO), the operator clicks a button 714 in the window 700. In this case, the information processing apparatus 1 deletes the window 700, resulting in end of this processing.

If the operator decides to change the production process and processing facilities or perform a surface treatment, the operator clicks the process information button 706 in the window 700 (Step S7; YES). In this case, the information processing apparatus 1 displays in the display a window 900 as illustrated in FIG. 43.

As illustrated in FIG. 43, the window 900 includes a portion 901 displaying the part cost and processing cost; a portion 902 displaying the manufacturing processes, processing facilities and processing cost; a portion 903 to which information is input to amend the manufacturing process and processing facilities.

In addition, the window 900 includes a return button 904, a calculation button 905, a process information renewal button 906 and a process information delete button 907 to assist inputting operations.

The portion 901 includes a portion 901a displaying the part cost before amendment; a portion 901b displaying the part cost after amendment; a portion 901c displaying the processing cost before amendment; and a portion 901d displaying the processing cost after amendment.

The portion 902 displays the names of the manufacturing processes of the part, the processing facilities used for the manufacturing processes, and the processing cost for each of the manufacturing processes.

The portion 903 includes a portion 903a to which the name of the process to be amended is to be input; a portion 903b to which the processing facility used for the amended process is to be input; a portion to which the amendment information of the amended process input in the portion 903a is to be input.

The return button 904 is used when the window 900 is returned to the former window 700.

The calculation button 905 is used when the part cost and processing cost are calculated based on the amended information input in the window 900.

The process information renewal button 906 is used when the contents of the processing data 251 of the designated part number stored in the processing data file 25 are amended based on the process name, processing facilities and amendment information input in the portion 903.

The process information delete button 907 is used when the contents of the processing data 251 of the designated part number stored in the processing data file 25 are deleted based on the information on the process name, processing facilities and amendment information input in the portion 903.

For example, as illustrated in FIG. 43 the operator inputs "grooving process" in the portion 903*a* as the process to be amended; "complex NC automatic lathe" in the portion 903*b* as the processing facility to be amended; "6.000" mm in a portion 903*c* as the groove width at a grooving portion D1; "4.000" mm in a portion 903*d* as the groove width at a grooving portion D2; "normal tolerance" in a portion 903*e* as the tolerance; and "3" grade in a portion 903*f* as the dimension grade, and then clicks the process information renewal button 906 and calculation button 905, the information processing apparatus 1 performs the following processings.

The information processing apparatus 1 amends the contents of the processing data 251 of the designated part number stored in the processing data file 25 based on the amendment information on the process name and processing facilities and other amendment information, which are input in the portion 903.

In addition, the information processing apparatus 1 recalculates the processing cost and part cost based on the above-mentioned amendment information, resulting in generation of new part cost data including a new processing cost and a part cost. The part cost data stored in the part cost data file 26 are replaced with the thus generated new part cost data.

Then the operator decides whether to change the manufacturing process and processing facilities and perform the surface treatment. As a result thereof, if the process information button 706 in the window 700 is not clicked, Step S9 is then performed.

Figure 44:
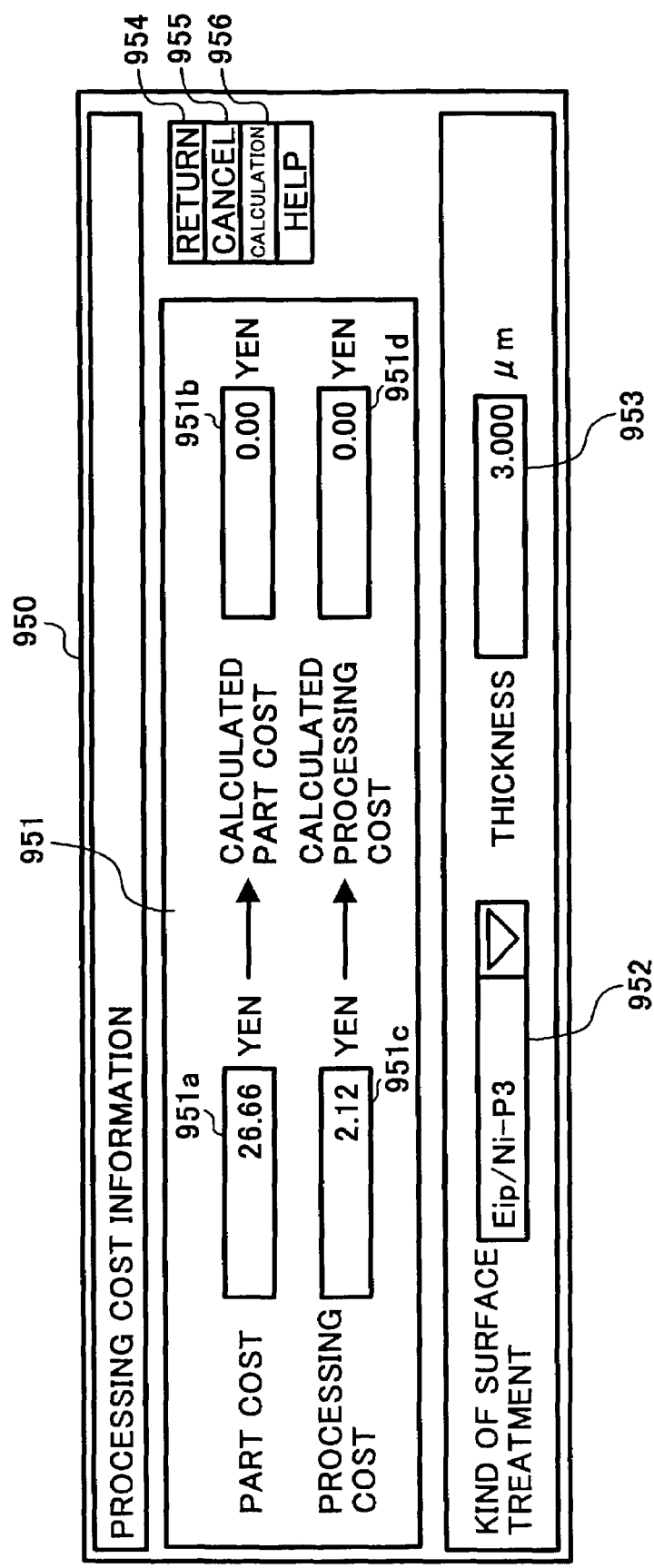
FIG. 44 is a schematic view illustrating the window displaying an embodiment of the processing cost inputting image.

When the operator clicks the process information button 706 in the window 700 after renewing the processing data 251 and part cost data 261 of the designated part number based on the amendment information on the manufacturing processes and processing facilities, the information processing apparatus 1 displays a window 950 as illustrated in FIG. 44.

As illustrated in FIG. 44, the window 950 includes a portion 951 displaying the part cost and processing cost; and a portion 952 to which the kind of the surface treatment to be performed is to be input. In addition, the window 950 has a return button 954, a cancel button 955, and a calculation button 956.

The portion 951 includes a portion 951*a* displaying the part cost before amendment; a portion 951*b* displaying the part cost after amendment; a portion 951*c* displaying the processing cost before amendment; and a portion 951*d* displaying the processing cost after amendment.

The return button 954 is used when the window 950 is returned to the former window 700.

The cancel button 955 is used when the information input in the window 950 is canceled.

The calculation button is used when the part cost and processing cost are calculated based on the surface treatment information input in the window 950.

For example, when the operator inputs "EIP/Ni-p3" in the portion 952 as the kind of the surface treatment; and "3.000" μm in the portion 953 as the thickness, as illustrated in FIG. 44, and then clicks the calculation button 956 (Step S9; YES), the information processing apparatus 1 performs the following processings.

The information processing apparatus 1 amends the processing data 251 of the designated part number stored in the processing data file 25 based on the information on the kind of the surface treatment and thickness input in the portion 952.

In addition, the information processing apparatus 1 recalculates the processing data and part cost based on the amendment information mentioned above to generate new part cost data including a processing cost and a part cost. The part cost data 261 stored in the part cost data file 26 are renewed with the thus generated part cost data.

Further, the information processing apparatus 1 displays the part cost and processing cost for the case in which the surface treatment is performed in the portions 951*a* and 951*b*, respectively. Then the step is returned to Step S5 to perform processings similar to those mentioned above.

In Step S9, if the operator does not clicks the calculation button 956 (Step S9; NO), the step is returned to S5 to perform processings similar to those mentioned above.

Then the processing of displaying the details of estimation in Step S5 will be explained referring to the flowchart illustrated in FIG. 45.

The information processing apparatus 1 calculates the material cost of the part to be manufactured (Step S51), and stores the material cost in the work area 30.

Namely, the information processing apparatus 1 reads the material data 211 of the material designated in the window 150 from the material master file 21. The information processing apparatus 1 divides the total length stored in the material data 211 by the total length of the part to be manufactured to obtain the number of the part to be manufactured per one piece of the material.

Then the information processing apparatus 1 divides the cost per one material by the number of part to be manufactured per one piece of the material to obtain the material cost of the part (Step S51). The material cost is stored in the material cost in the work area 30.

Then the information processing apparatus 1 designates the number of the part to be manufactured in a month (i.e., a product of the number of production lots and the number of the part per one lot); and the processing facility to be used for manufacturing the part, which are determined based on the input information on the manufacturing method of the part (the way to designate the processing facility is explained later).

Then the information processing apparatus 1 calculates the time needed for manufacturing the part using the designated facility (Step S53). In this case, the information processing apparatus 1 calculates the time using an equation predetermined for each processing facility.

For example, when the operator designates a cam shaft automatic lathe as the processing facility for manufacturing the part, the information processing apparatus 1 calculates the time needed for manufacturing the part, which time is defined in equation 1, using equation 2. As for the machining time defined in equation 2, the machining time defined in equation 3 is used if the part to be manufactured is a normal type. If the part is a long part having a grounded peripheral surface, equation 4 is used for determining the machining time. If the part is a long part whose peripheral surface is not grounded, equation 5 is used for determining the machining time.

In this case, equation 6 is used for determining the material changing time included in equation 1.

When the part to be manufactured is of a normal type, equation 7 is used for the set-up time defined in equation 1. When the part is a long part, equation 8 is used for the set-up time.

Similarly to the equation used for determining the processing time and provided for the above-mentioned cam shaft automatic lathe, an equation is also provided for a NC automatic lathe, a complex automatic lathe and another processing facility used for performing a secondary processing. Therefore, by substituting parameters for the equation while referring to the parameter selection table, the processing time for each processing facility can be determined.

After the time needed for manufacturing the part using the designated processing facility is determined, the information processing apparatus 1 multiplies the thus determined processing time by the processing cost per unit time of the processing facility in the processing facility data 221 stored in the processing facility master file 22 to determine the processing cost of the part. The information processing apparatus 1 stores the processing cost in the work area 30 (Step S54).

After the processing cost of the part is determined, the information processing apparatus 1 reads the processing costs of other processings such as plating and hardening processings from the processing costs data file 29 and stores the data in the work area 30 (Step S55).

After the other processing costs are calculated, the information processing apparatus 1 reads the material cost, processing cost and other processing costs from the work area 30 and adds the costs to determine the manufacturing cost of the part. Then the manufacturing cost is stored in the work area 30 (Step S56).

In addition, the information processing apparatus 1 adds the manufacturing cost and a predetermined profit to determine the part cost, and stores the unit part cost in the work area 30.

Then the information processing apparatus 1 reads the unit part cost, material cost, processing cost and other processing costs from the work area 30, to generate the part cost data 261 as illustrated in FIG. 25. The thus generated part cost data 261 are stored in the part cost data file 26 (Step S57).

When the operator directs to display the details of the estimation, the information processing apparatus 1 reads the following from the external storage device 2:
1) the material designation data 241 of the designated part number, which are stored in the material designation data file 24;
2) the processing data 251 of the designated part number, which are stored in the processing data file 25; and
3) the part cost data 261 of the designated part number, which are stored in the part cost data file 26.

The information processing apparatus 1 generates the window 650 including the estimation details as illustrated in FIG. 40 based on the read data.

Then the information processing apparatus 1 judges whether the operator clicks the next page button 657 in the window 650 (Step S58). When it is judged that the next page button is not clicked (Step S58; NO), the estimation processing ends.

When it is judged that the next page button 657 is clicked, the information processing apparatus 1 reads the material designation data 241, processing data 251 and part cost data 261 corresponding to the part number to generate the image data to be displayed in the window 700 based on the data 241, 251 and 261 (Step S59). The information processing apparatus 1 displays the window 700 including the image data in the display 13 (Step S60).

Then the information processing apparatus 1 judges whether or not the comparison button 713 in the window 700 is clicked by the operator (Step S61). When it is judged that the comparison button is not clicked (Step S61; NO), the estimation processing ends.

When the information processing apparatus 1 judges that the comparison button 713 is clicked, the material designation data 241, processing data 251 and part cost data 261 are read out to generate the image of window 800 (Step S62) Then the information processing apparatus 1 displays the window 800 including the image data in the window 800 (Step S63), resulting in end of the estimation processing.

Then the processing of designating the facility for use in Step S52 will be explained referring to the flowcharts illustrated in FIGS. 46 to 49.

Figure 46:
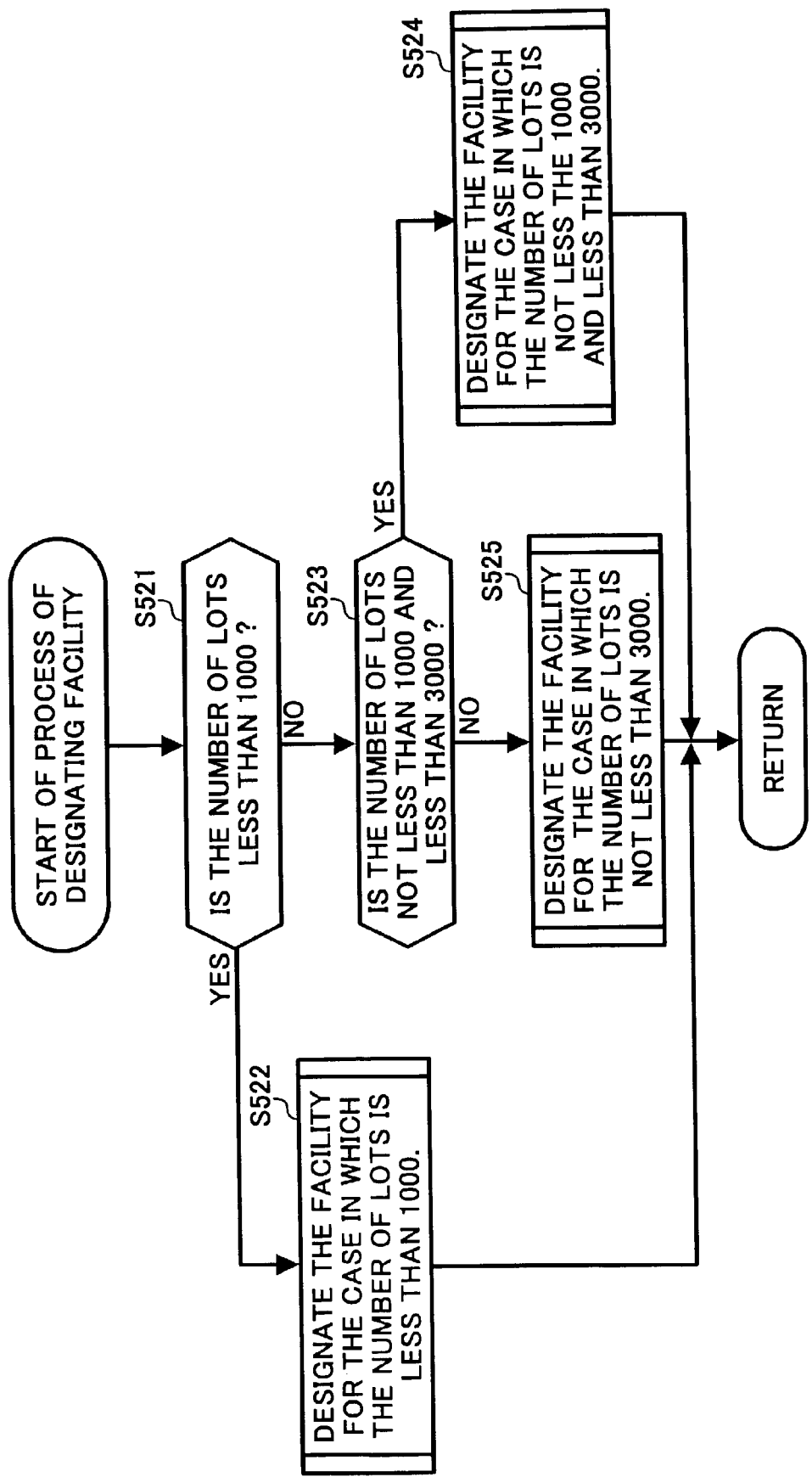
FIG. 46 is a flowchart illustrating the process of Step S52 in FIG. 45.

As illustrated in the flowchart in FIG. 46, the information processing apparatus 1 reads the material designation data 241 from the material data file 24 and judges whether the number of manufacturing lots of the part is less than 1,000 (Step S521). When it is judged that the number of lots is less than 1,000 per month (Step S521; YES), the information processing apparatus 1 performs the processing of designating the processing facility for the case in which the number of lots is less than 1,000 per month (Step S522), which processing is mentioned below.

When it is judged that the number of lots per month is not less than 1,000 (Step S521; NO), the information processing apparatus further judges whether the number of lots is not less than 1,000 and less than 3,000 (Step S523).

When it is judged that the number of lots is not less than 1,000 and less than 3,000 per month (Step S523; YES), the information processing apparatus 1 performs the processing of designating the processing facility for the case in which the number of lots is not less than 1,000 and less than 3,000 per month (Step S524), which processing is mentioned below.

When it is judged that the number of lots is not less than 3,000 per month (Step S523; NO), the information processing apparatus 1 performs the processing of designating the processing facility for the case in which the number of lots is not less than 3,000 per month (Step S525), which processing is mentioned below. Thus, the processing ends.

Figure 47B:
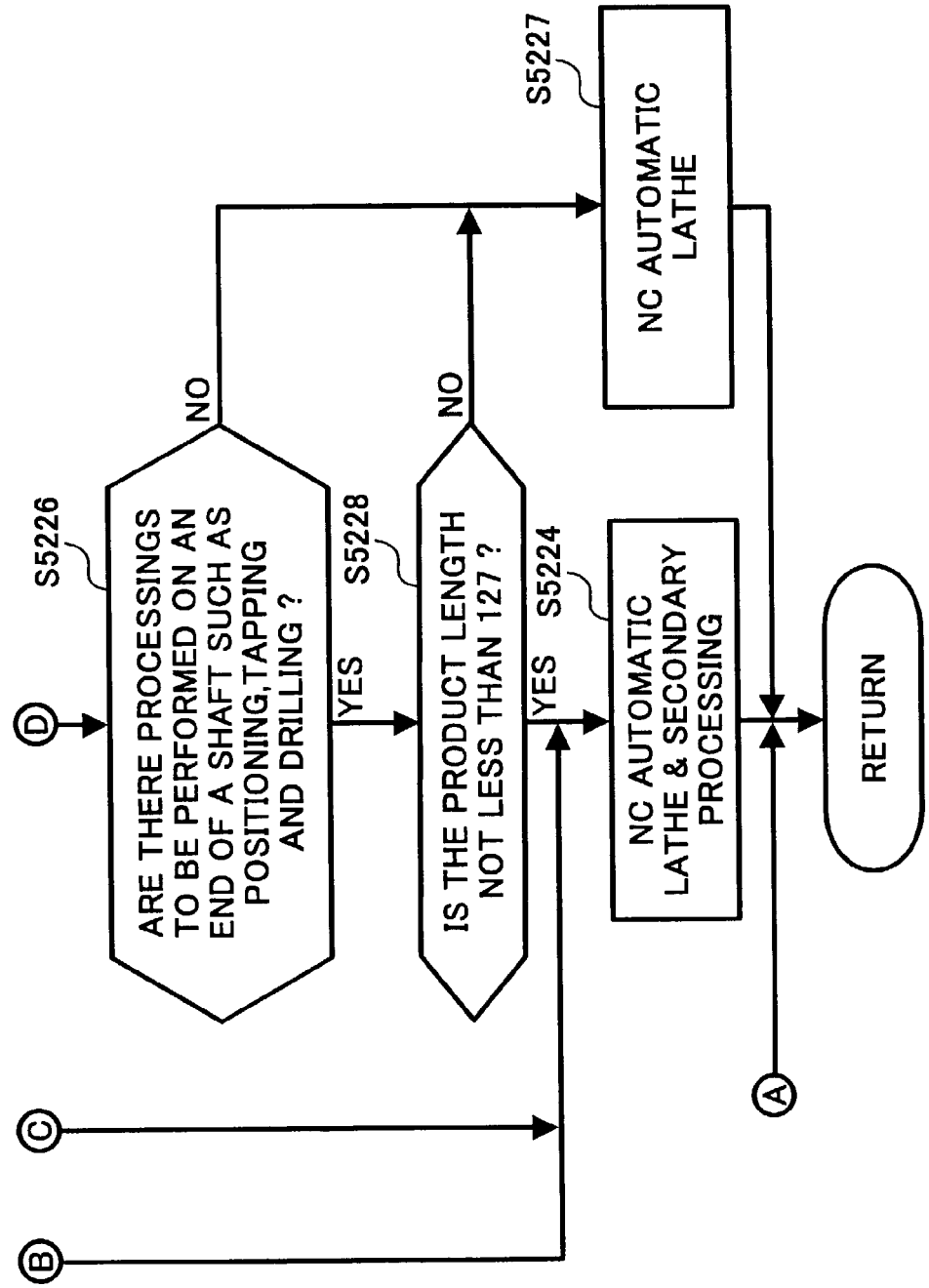
FIG. 47 is a flowchart illustrating the process of Step S522 in FIG. 46.

Then the processing of designating the processing facility in Step S522, i.e., in the case in which the number of lots is less than 1000, will be explained referring to the flowchart illustrated in FIG. 47.

The information processing apparatus 1 judges whether there are plural D cut processings to be performed on the peripheral surface of the part to be manufactured, plural radial drilling processings and plural radial tapping processings (Step S5221).

When the information processing apparatus 1 judges that it is needed to perform plural D cut processings and plural radial processings on the part to be manufactured (Step S5221; YES), a complex NC automatic lathe is designated as the processing facility (Step S5222). Thus, the processing ends.

When the information processing apparatus 1 judges that it is not needed to perform plural D cut processings and plural radial processings on the part to be manufactured (Step S5221; NO), the information processing apparatus 1 judges whether it is needed to perform one D cut processing and one radial processing on the part to be manufactured (Step S5223).

When the information processing apparatus 1 judges that it is needed to perform one D cut processing and one radial processing on the part to be manufactured (Step S5223; YES), a combination of a NC automatic lathe with a facility for secondary processing is designated as the processing facility (Step S5224). Thus, the processing ends.

When it is judged that there is no need to perform a D cut processing and a radial processing on the part to be manufactured (Step S5223; NO), the information processing apparatus judges again whether there is a need to perform a processing, such as countersinking, tapping and drilling, on both ends of the part (Step S5225).

When it is needed to perform a processing, such as countersinking, tapping and drilling, on both ends of the part (Step S5225; YES), the information processing apparatus 1 designates a combination of a NC automatic lathe with a facility for secondary processing as the processing facility (Step S5224). Thus, the processing ends.

When it is not needed to perform a processing, such as countersinking, tapping and drilling, on both ends of the part (Step S5225; NO), the information processing apparatus 1 judges whether it is needed to perform a processing, such as countersinking, tapping and drilling, on one end of the part (Step S5226).

When it is not needed to perform a processing, such as countersinking, tapping and drilling, on one end of the part (Step S5226; NO), the information processing apparatus 1 designates a NC automatic lathe as the processing facility (Step S5227). Thus, the processing ends. When it is needed to perform such a processing on one end of the part (Step S5226; YES), the information processing apparatus 1 further judges whether the total length of the part is not less than 127 mm (Step S5228).

When it is judged that the total length is not less than 127 mm (Step S5228; YES), the information processing apparatus 1 designates a combination of a NC automatic lathe with a facility for secondary processing as the processing facility (Step S5224). Thus, the processing ends.

When it is judged that the total length is less than 127 mm (Step S5228; NO), the information processing apparatus 1 designates a NC automatic lathe as the processing facility (Step S5227). Thus, the processing ends.

Then the processing of designating the processing facility in Step S523, i.e., in the case in which the number of manufacturing lots is not less than 1,000 and less than 3,000, will be explained referring to the flowchart illustrated in FIG. 48.

Figure 48B:
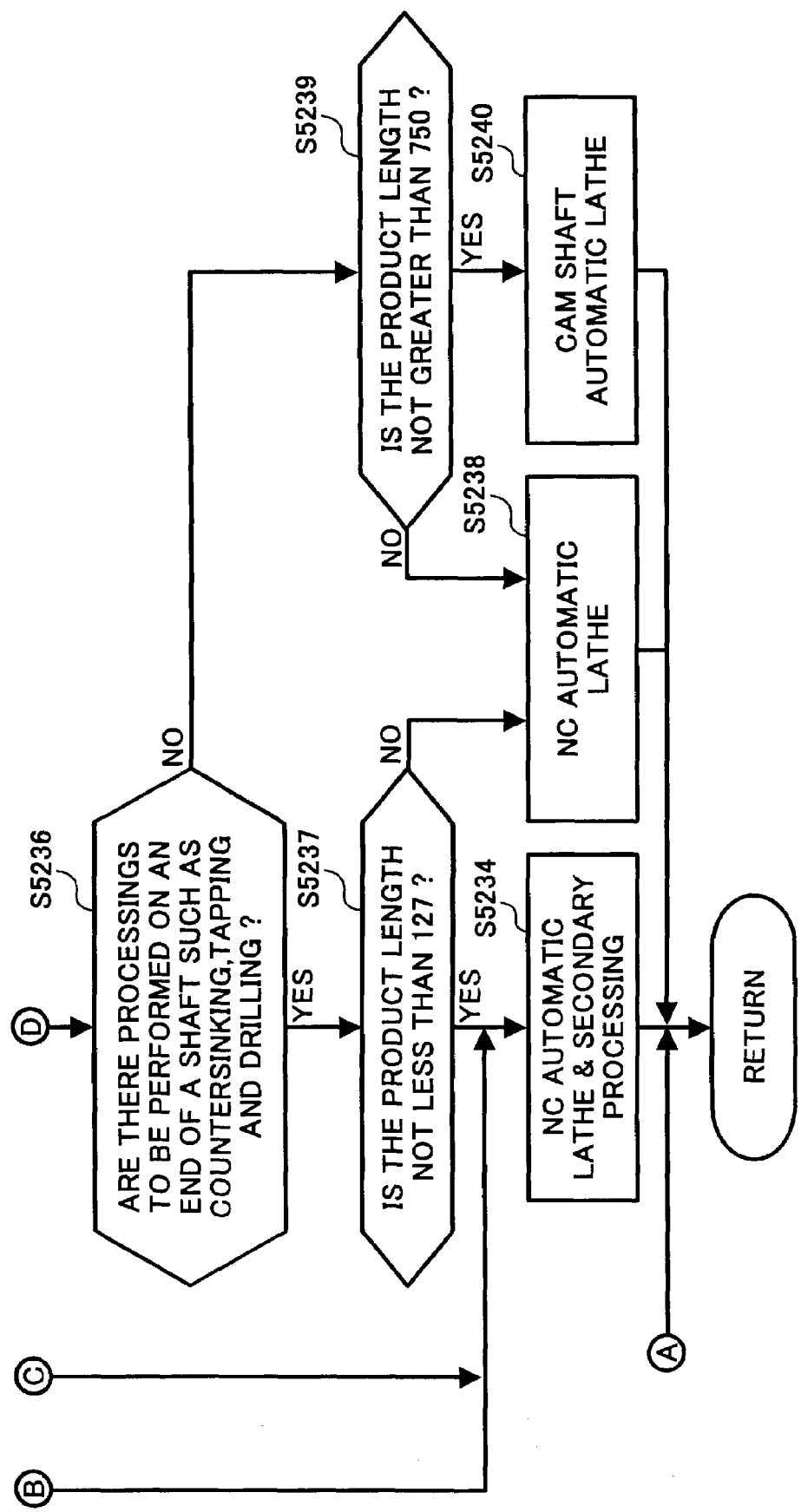
FIG. 48 is a flowchart illustrating the process of Step S523 in FIG. 46.

As illustrated in FIG. 48, the information processing apparatus 1 judges whether there are plural D cut processings to be performed on the peripheral surface of the part to be manufactured, plural radial drilling processings and plural radial tapping processings (Step S5231).

When the information processing apparatus 1 judges that it is needed to perform plural D cut processings and plural radial processings on the part to be manufactured (Step S5231; YES), a complex NC automatic lathe is designated as the processing facility (Step S5232). Thus, the processing ends.

When the information processing apparatus 1 judges that it is not needed to perform plural D cut processings and plural radial processings on the part to be manufactured (Step S5231; NO), the information processing apparatus 1 judges whether it is needed to perform one D cut processing and one radial processing on the part to be manufactured (Step S5233).

When the information processing apparatus 1 judges that it is needed to perform one D cut processing and one radial processing on the part to be manufactured (Step S5233; YES), a combination of a NC automatic lathe with a facility for secondary processing is designated as the processing facility (Step S5234). Thus, the processing ends.

When it is judged that there is no need to perform a D cut processing and a radial processing on the part to be manufactured (Step S5233; NO), the information processing apparatus judges again whether there is a need to perform a processing, such as countersinking, tapping and drilling, on both ends of the part (Step S5235).

When it is needed to perform a processing, such as countersinking, tapping and drilling, on both ends of the part (Step S5235; YES), the information processing apparatus 1 designates a combination of a NC automatic lathe with a facility for secondary processing as the processing facility (Step S5234). Thus, the processing ends.

When it is not needed to perform a processing, such as countersinking, tapping and drilling, on both ends of the part (Step S5235; NO), the information processing apparatus 1 judges whether it is needed to perform a processing, such as countersinking, tapping and drilling, on one end of the part (Step S5236).

When it is needed to perform a processing on one end of the part (Step S5236; YES), the information processing apparatus 1 further judges whether the total length of the part is not less than 127 mm (Step S5237).

When it is judged that the total length is not less than 127 mm (Step S5237; YES), the information processing apparatus 1 designates a combination of a NC automatic lathe with a facility for secondary processing as the processing facility (Step S5234) Thus, the processing ends.

When it is judged that the total length is less than 127 mm (Step S5237; NO), the information processing apparatus 1 designates a NC automatic lathe as the processing facility (Step S5238). Thus, the processing ends.

When it is not needed to perform a processing on one end of the part (Step S5236; NO), the information processing apparatus 1 further judges whether the total length is not longer than 750 mm (Step S5239).

When it is judged that the total length of the part is longer than 750 mm (Step S5239; NO), a NC automatic lathe is designated as the processing facility (Step S5238). Thus, the processing ends. When it is judged that the total length of the part is not longer than 750 mm (Step S5239; YES), a cam shaft automatic lathe is designated as the processing facility (Step S5240). Thus, the processing ends.

Figure 49B:
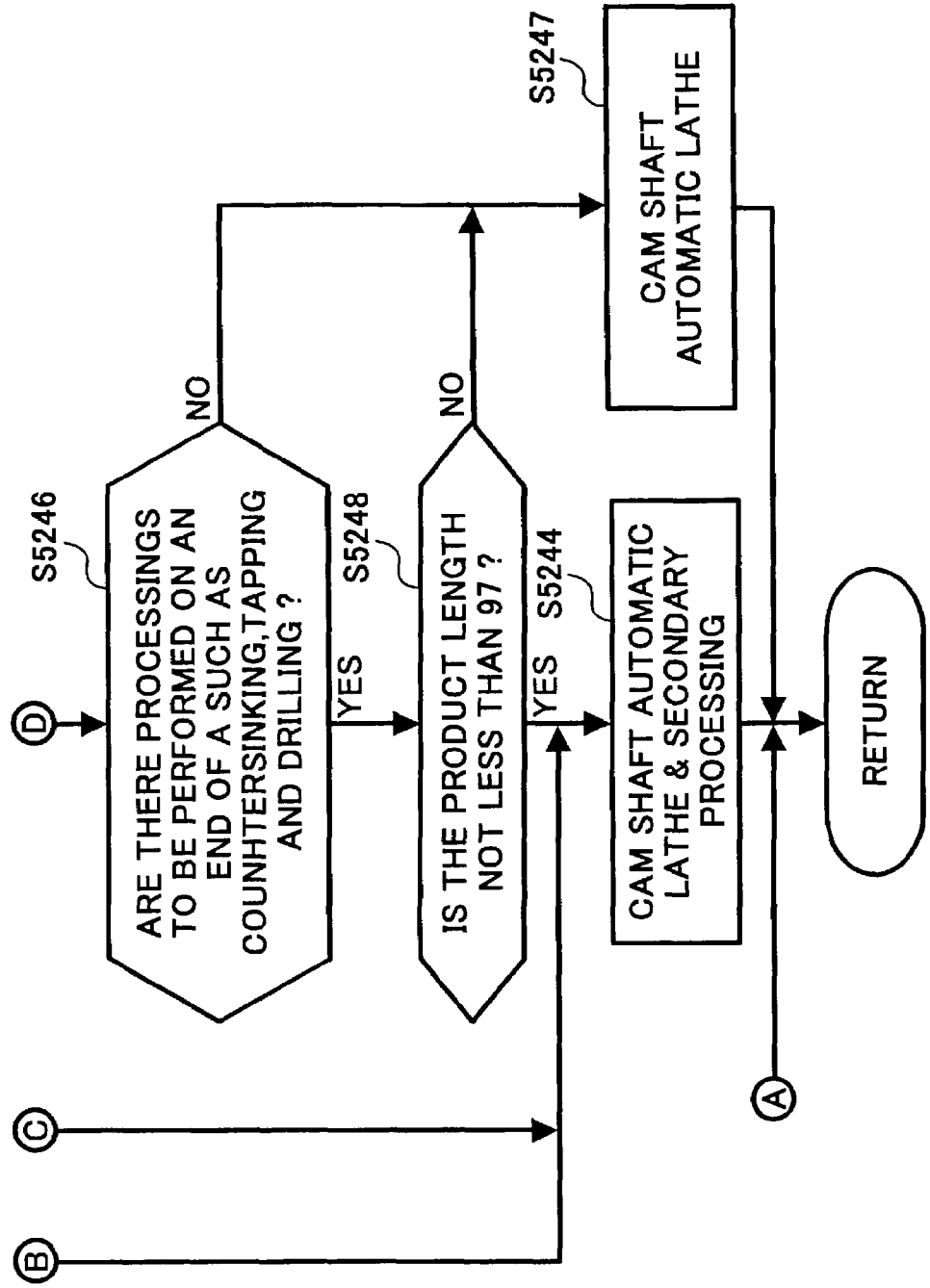
FIG. 49 is a flowchart illustrating the process of Step S524 in FIG. 46.

Then the processing of designating the processing facility in Step S524, i.e., in the case in which the number of lots is not less than 3000, will be explained referring to the flowchart illustrated in FIG. 49.

When the information processing apparatus 1 judges whether there are plural D cut processings to be performed on the peripheral surface of the part to be manufactured, plural radial drilling processings and plural radial tapping processings (Step S5241).

When the information processing apparatus 1 judges that it is needed to perform plural D cut processings and plural radial processings on the part to be manufactured (Step S5241; YES), a complex NC automatic lathe is designated as the processing facility (Step S5242). Thus, the processing ends.

When the information processing apparatus 1 judges that it is not needed to perform plural D cut processings and plural radial processings on the part to be manufactured (Step S5241; NO), the information processing apparatus 1 judges whether it is needed to perform one D cut processing and one radial processing on the part to be manufactured (Step S5243).

When the information processing apparatus 1 judges that it is needed to perform one D cut processing and one radial processing on the part to be manufactured (Step S5243; YES), a combination of a cam shaft automatic lathe with a facility for secondary processing is designated as the processing facility (Step S5244). Thus, the processing ends.

When it is judged that there is no need to perform a D cut processing and a radial processing on the part to be manufactured (Step S5243; NO), the information processing apparatus judges again whether there is a need to perform a processing, such as countersinking, tapping and drilling, on both ends of the part (Step S5245).

When it is needed to perform a processing, such as countersinking, tapping and drilling, on both ends of the part (Step S5245; YES), the information processing apparatus 1 designates a combination of a cam shaft automatic lathe with a facility for secondary processing as the processing facility (Step S5244). Thus, the processing ends.

When it is not needed to perform a processing, such as countersinking, tapping and drilling, on both ends of the part (Step S5245; NO), the information processing apparatus 1 judges whether it is needed to perform a processing, such as countersinking, tapping and drilling, on one end of the part (Step S5246).

When it is not needed to perform a processing on one end of the part (Step S5246; NO), the information processing apparatus 1 designates a cam shaft automatic lathe as the processing apparatus 1 (Step S5247). Thus, the processing ends.

When it is needed to perform a processing on one end of the part (Step S5246; YES), the information processing apparatus 1 further judges whether the total length of the part is not less than 97 mm (Step S5248).

When it is judged that the total length is not less than 97 mm (Step S5248; YES), the information processing apparatus 1 designates a combination of a NC automatic lathe with a facility for secondary processing as the processing facility (Step S5244). Thus, the processing ends.

When it is judged that the total length is less than 97 mm (Step S5248; NO), the information processing apparatus 1 designates a cam shaft automatic lathe as the processing facility (Step S5247). Thus, the processing ends.

In this part cost estimation system, an operator amend a FIG. 351 which is displayed in the display 13 by the information processing apparatus 1 such that the figure becomes the same as the shape of the part to be manufactured, and the processing cost of the part is estimated based on the amended FIG. 351. Therefore the cost of the part can be easily estimated.

In addition, in this cost estimation system, the time expended in processing the part is calculated based on the designated processing facility and manufacturing processes, and the processing cost of the part can be calculated based on the processing time. Therefore the processing cost of the part can be estimated in detail.

Further, in this cost estimation system, the processing facility can be selected depending on the requests for the precision of the part to be manufactured and cost of the part, and the cost can be estimated based on the selected processing facility.

Fifth Embodiment of the Cost Estimation System of the Present Invention

The cost estimation system having a constitution as illustrated in FIG. 19 may be changed such that a client server or an ASP (Application Service Provider) is provided in the system and information on the part costs is shared among the plural divisions of a company or among plural companies to improve the business efficiency. When such a system is available, the costs of parts can be estimated by plural companies on the common basis thereof, and therefore business meetings tend to become successful.

The constitution and operation of this system will be explained.

FIG. 50 is a view illustrating the constitution of another embodiment of the part cost estimation system of the present invention.

As illustrated in FIG. 50, the system includes a part cost estimation site 151, a group of terminals 161-1 to 161-m, a group of terminals 171-1 to 171-p and a group of terminals 181-1 to 181-q, which are arranged through Internet IN.

The terminal groups 161 and 171 are arranged in the purchase/procurement section, development section, manufacturing section, quality control section, financial affairs section, etc., which need the part cost information. The terminal groups are directly connected with Internet IN, or indirectly connected with Internet IN with an in-company LAN, an Internet gateway or an access point therebetween.

Figure 51:
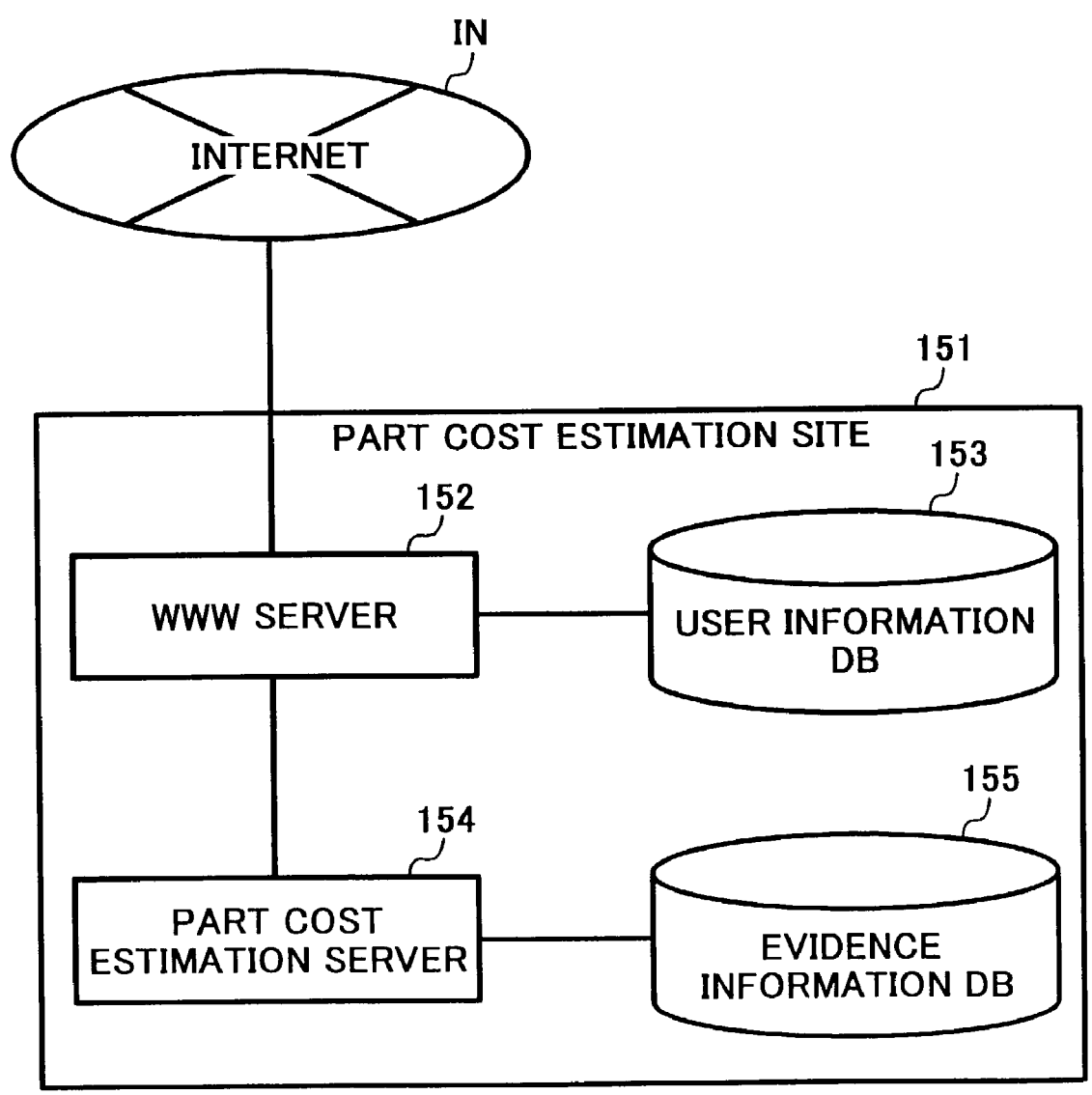
FIG. 51 is a schematic view illustrating an embodiment of the part cost estimation site as illustrated in FIG. 50.

The part cost estimation site 151 provides estimation results of a part and evidence information for the part estimation (i.e., information on grounds for the estimation) to the requester. As illustrated in FIG. 51, the part cost estimation site 151 includes a WWW server 152, a user information database (DB) 153, a part cost estimation server 154 and an evidence information DB 155.

The WWW server 152 performs certification upon receiving an access from the terminals 161, 171 and 181 through Internet. After performing certification, the WWW server 152 connects the accessing terminal with the part cost estimation server 154.

In the user information DB 153, the information on the users who are certified to access the part cost estimation site 151 is stored. The part cost estimation system is utilized by company groups wishing to share part cost information to produce high quality parts having low manufacturing costs, and information concerning the companies, such as identification information (ID), password, company name, person and section in charge of the system, address, and contact address (phone number, facsimile number and/or e-mail address), is stored in the user information DB 153.

The part cost estimation server 154 and evidence information DB 155 have a constitution similar to those of the information processing apparatus 1 and external storage device 2 illustrated in FIG. 19. The part cost estimation server 154 and evidence information DB 155 provide estimation information and its evidence information upon receiving the request from the terminal groups 161, 171 and 181. It is preferable that the information stored in the evidence information DB 155 is objective information which is targeted by the companies, such as data for the top three of the companies.

Then the operation of the part cost estimation system having the above-mentioned constitution will be explained.

1. User Registration

In order to utilize this part cost estimation system, a user has to perform user registration. A company wishing to be registered connects the administration section of the part cost estimation site 151. The administration section checks the company according to the predetermined criteria. When the company meets the criteria, the information on the company is registered in the user information DB 153. In this case, it is preferable to receive the information on part costs from the registered companies, and the registered information in the evidence information DB 155 is renewed as necessary.

2. Estimation of Part Cost

When a person in charge of this system (hereinafter referred to as a user) wishes to utilize the service provided by the part cost estimation site 151, the user accesses the WWW server 152 using a terminal of the terminal group 161, 171 or 181 (hereinafter referred to as the terminal 161), via an Internet service provider (ISP) or the like, which is not illustrated in FIG. 50.

Figure 52:
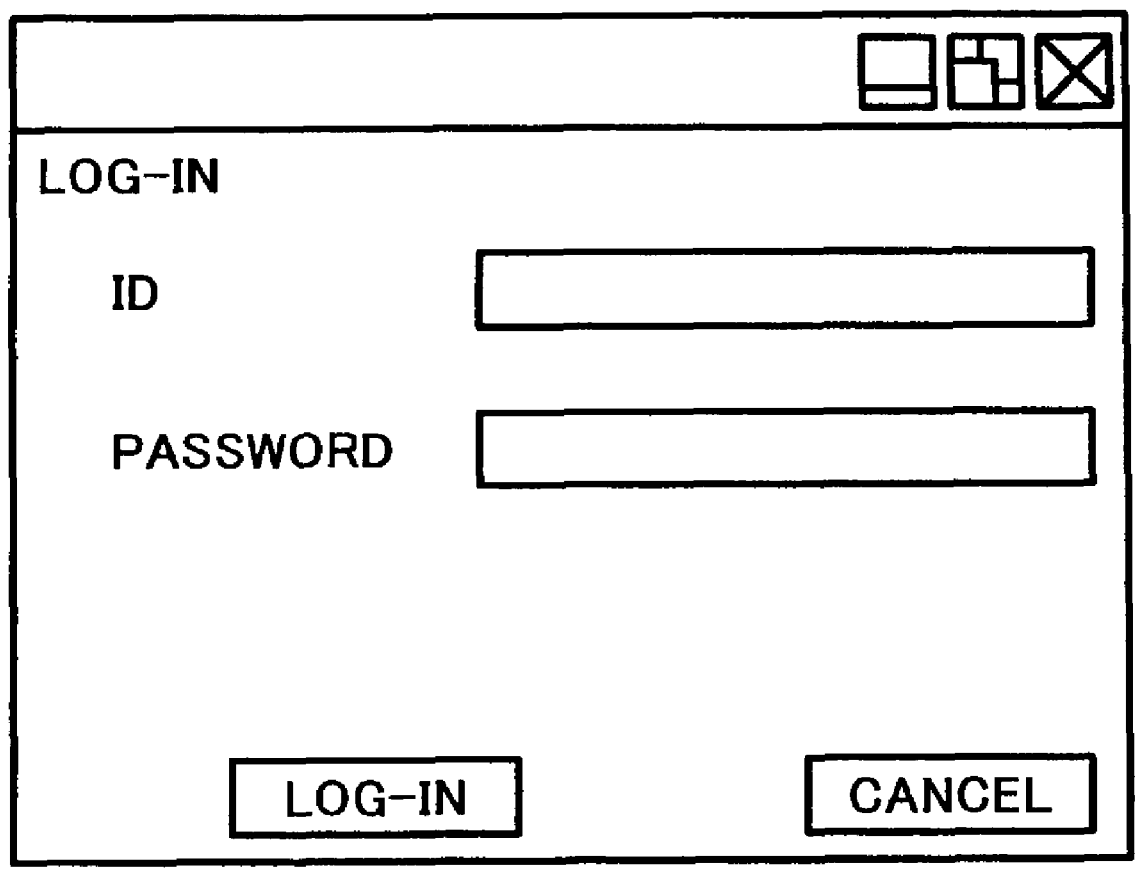
FIG. 52 is a schematic view illustrating an embodiment of the log-in image from which the part cost estimation site can be accessed.

In response to the access, the WWW server 152 sends the certification image as illustrated in FIG. 52 to the terminal 161 to display the image in the terminal 161.

The user input an ID and a password in the certification image and sends the image to the WWW server 152. The WWW server 152 judges whether the pair of ID and password are registered in the user information DB 153. When the pair of ID and password are not registered, the WWW server 152 sends an error message to the terminal 161. When the pair of ID and password are registered, the cost estimation processings as mentioned in the fourth embodiment are performed.

In this system, when part procuring companies manage the part cost estimation site 151 and part supplying makers manage the estimation system, the procurement companies can objectively transmit their requests concerning part costs to the part supplying makers, resulting in decrease of part costs. Therefore the part supplying makers can objectively recognize their ability and target, i.e., the cost estimation results are useful for improving the parts costs.

In this system, the estimation data and estimated costs may be provided via a network in response to the request made by the terminal 161. In this constitution, the part makers can compare their part costs with the registered part costs, and therefore the part makers can recognize advantages and weak points. Thereby, it becomes possible to strengthen the advantages and remedy the weak points.

The cost estimation system of the embodiment is not limited to the constitution in which the processing facility is designated depending on the kind of the processing, and, for example, the processing facility may be designated depending on the substance of the material to be processed or dimension of the part.

In addition, the part cost estimation system of the present invention is not limited to the above-mentioned embodiments, and the part cost estimation system can be applied to other applications. For example, the cost estimation system has been explained while referring to a cut processing which typically has a great influence on the part cost estimation, however, the cost estimation system can also be applied to parts manufactured by a sheet metal processing or a mold processing. Particularly, since a die is needed for a mold processing, the cost estimation processing mentioned above can be applied to the mold processing as it is.

As clearly understood from the first to fifth embodiments mentioned above, since in the system of the present invention a model business unit or factory is set and various indexical ratios and processing costs of the model business unit or factory are compared with those of a real business unit or factory, the system can be utilized for work restructuring and cost estimation.

In addition, according to the cost estimation system of the present invention, the cost of a part can be precisely estimated. In addition, when the design of a part is changed, the cost of the changed part can be easily estimated.

This document claims priority and contains subject matter related to Japanese Patent Applications Nos. 2001-239708 and 2001-275478, filed on Aug. 7, 2001, and Sep. 11, 2001, respectively, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A part cost estimation system which estimates a part cost including a manufacturing cost including a processing cost and a material cost, and a profit, comprising:

a material information storage device configured to store information on the material to be used to manufacture a part, the material information including diameter measurements, roughness measurements, width tolerances, tolerances of the dimension of a cut portion and total length of the material;

a processing cost information storage device configured to store processing cost information including information on each of processing facilities which can be used for performing a processing on a material to manufacture a part and information on a unit machining cost of each of the processing facilities;

a shape designating device configured to designate a shape of the part;

a processing designating device configured to designate a cutting or turning process to be performed on the material to form the part having the shape;

a processing facility designating device configured to designate at least one processing facility among the processing facilities based on the contents of the processing;

a processing time calculating device configured to calculate a processing time expended in processing the material based on the contents of the processing using the processing facility designated by the processing facility designating device to form the part having the shape, wherein said processing time further includes operating time expended in actually operating a processing facility to process the material and to set-up the processing facility;

a processing cost calculating device configured to calculate a processing cost spent on manufacturing the part based on the unit machining cost and the processing time calculated by the processing time calculating device; and an adding device configured to add the processing cost for plural processings for manufacturing the part to determine a total processing cost of the part, wherein the processing cost calculating device is further configured to compare the calculated processing cost with a predetermined model processing cost, and wherein the model processing cost is a model manufacturing cost determined using the equation: model cost=$\Sigma K_{mi} * T_i$, where $K_{mi}$ manufacturing cost and $T_i$ is a processing time.

2. The part cost estimation system according to claim 1, further comprising:
a figure storage device configured to store a basic shape of the part, wherein the shape designating device further comprises:
a figure displaying device configured to display a candidate figure for designating the shape of the part; and
a figure changing device configured to change the candidate figure to a figure of the shape of the part to display the figure displaying device.

3. The part cost estimation system according to claim 1, wherein the contents of the processing include at least one of information on kinds of the processing to be performed on material, information on processing dimensions and information on constituents of the material.

4. The part cost estimation system according to claim 1, wherein the shape designating device further designates a total length of the part, and wherein the processing facility designating device designates a processing facility based on the total length and the contents of the processing.

5. The part cost estimation system according to claim 3, wherein the processing facility designating device designates a processing facility based on the kinds of the processing to be performed on the material.

6. The part cost estimation system according to claim 1, further comprising:
a material cost storage device configured to store the material cost of the material;
an additional processing cost storage device configured to store an additional processing needed for manufacturing the part other than the processing to be performed for forming the designated shape;
a material designating device configured to designate the material to be used for manufacturing the part; a number determining device configured to determine a number of pieces of the part to be manufactured from the material;
a material cost reading device configured to read the material cost of the material from the material cost storage device;
a part material cost estimating device configured to estimate a material cost of the part by dividing the material cost by the number of pieces of the part to be manufactured from the material;
an additional processing cost reading device configured to read the additional processing cost from the additional processing cost storage device; and
a manufacturing cost estimating device configured to add the processing cost, material cost and additional processing cost of the part to estimate the manufacturing cost of the part.

7. The part cost estimation system according to claim 6, further comprising:
a part cost estimating device configured to add the manufacturing cost of the part and the profit to estimate the cost of the part.

8. The part cost estimation system according to claim 1, further comprising:
a displaying device,
wherein the processing facility designating device designates plural processing facilities based on the contents of the processing, the processing time calculating device calculates the processing time for each of the plural processing facilities, the processing cost calculating device calculates the processing cost for each of the plural processing facilities, and the displaying device displays the processing cost of each of the plural processing facilities while comparing the processing costs of the plural processing facilities.

9. The part cost estimation system according to claim 7, further comprising a transmitting device configured to transmit the part cost to a terminal through a network, when the terminal requests to estimate the manufacturing cost of the part through the network.

10. A method for estimating a part processing cost of a part, comprising:
designating a material to be used in manufacturing the part;
designating a shape of the part to be manufactured;
designating a cutting or turning process to be performed on a material to process the material into the part having the shape;
designating a processing facility to process the material according to the designated contents of the processing;
calculating a material cost based on diameter measurements, roughness measurements, width tolerances, tolerances of the dimension of a cut portion and total length of the material;
calculating a processing time to be expended in performing the processing on the material using the processing facility according to the designated contents of the processing, wherein said processing time further includes operating time expended in actually operating a processing facility to process the material and to set-up the processing facility;
calculating a processing cost for the processing based on the processing time, the material cost and processing cost information including a unit machining cost of the processing facility stored in a memory, to determine the part processing cost; and
comparing the calculated processing cost with a predetermined model processing costs,
wherein the model processing cost is a model manufacturing cost determined using the equation: model cost=$\Sigma K_{mi} * T_i$, where $K_{mi}$ manufacturing cost and $T_i$ is a processing time.

11. The method according to claim 10, further comprising:
repeating the step of designating contents, the step of designating a processing facility, the step of calculating a processing time and the step of calculating a processing cost for plural processings to be performed on the part; and
adding the processing costs to determine the part processing cost.

12. The method according to claim 10, further comprising:
displaying a candidate figure of the part stored in the memory;
changing the candidate figure such that the changed figure is identical to the designated shape of the part.

13. The method according to claim 10, wherein the contents of the processing includes at least one of information on kinds of the processing to be performed on the material, information on processing dimensions and information on constituents of the material.

14. The method according to claim 10, further comprising:
designating a total length of the part,
wherein in the facility designating step the facility is designated based on the total length and the contents of the processing.

15. The method according to claim 13, wherein in the processing facility designating step the processing facility is designated based on the information on kinds of the processing.

16. The method according to claim 10, wherein in the step of designating a processing facility plural processing facilities are designated based on the contents of the processing; in the step of calculating a processing time the processing time is calculated for each of the plural processing facilities; and in the step of calculating a processing cost the processing cost is calculated for each of the plural processing facilities, and wherein the method further comprises:
    displaying the processing costs of the plural processing facilities while comparing the processing costs.

17. The method according to claim 10, further comprising:
    transmitting the part processing cost to a terminal through a network, when the terminal requests to estimate the manufacturing cost of the part through the network.

18. A method for estimating a manufacturing cost of a part, comprising:
    designating a material to be used in manufacturing the part;
    designating a shape of the part to be manufactured;
    designating a material to be processed to manufacture the part;
    designating a cutting or turning process to be performed on the material to manufacture the part having the shape;
    determining a number of pieces of the part when the part is manufactured from the designated material;
    estimating a material cost of the part by dividing a cost of the material stored in a memory by the number of pieces of the part;
    designating a processing facility to process the material according to the designated contents of the processing;
    calculating a material cost based on diameter measurements, roughness measurements, width tolerances, tolerances of the dimension of a cut portion and total length of the material;
    calculating a processing time to be spent for performing the processing on the material using the processing facility according to the designated contents of the processing;
    calculating a processing cost for the processing based on the processing time, the material cost and processing cost information including a unit machining cost of the processing facility and stored in a memory, to determine the part processing cost,
    wherein said processing time further includes operating time expended in actually operating a processing facility to process the material and to set-up the processing facility;
    reading an additional processing cost other than the processing cost of the part;
    adding the part processing cost and additional processing cost to estimate the manufacturing cost of the part; and
    comparing the estimated manufacturing cost of the part with a predetermined model processing costs,
    wherein the model processing cost is a model manufacturing cost determined using the equation: model cost=$\Sigma K_{mi} * T_i$, where $K_{mi}$ manufacturing cost and $T_i$ is a processing time.

19. The method according to claim 18, further comprising:
    repeating the step of designating contents, the step of designating a processing facility, the step of calculating the processing time and the step of calculating the processing cost for plural processings to be performed on the part; and
    adding the processing costs to determine the part processing cost.

20. The method according to claim 18, wherein in the step of adding the processing cost a predetermined profit is further added to the material cost, part processing cost and additional processing cost to estimate the manufacturing cost of the part.

21. The method according to claim 18, wherein in the step of designating a processing facility, plural processing facilities are designated based on the contents of the processing; in the step of calculating a processing time the processing time is calculated for each of the plural processing facilities; and in the step of calculating a processing cost the processing cost is calculated for each of the plural processing facilities, and wherein the method further comprises:
    displaying the processing costs of the plural processing facilities while comparing the processing costs.

22. The method according to claim 18, further comprising:
    transmitting the manufacturing cost of the part to a terminal through a network, when the terminal requests to estimate the manufacturing cost of the part through the network.

23. A computer readable medium storing computer instructions for performing the steps:
    designating a material to be used in manufacturing the part; designating a shape of the part to be manufactured;
    designating a cutting or turning process to be performed on a material to process the material into the part having the shape;
    designating a processing facility to process the material according to the designated contents of the processing;
    calculating a material cost based on diameter measurements, roughness measurements, width tolerances, tolerances of the dimension of a cut portion and total length of the material;
    calculating a processing time to be expended in performing the processing on the material using the processing facility according to the designated contents of the processing, wherein said processing time further includes operating time expended in actually operating a processing facility to process the material and to set-up the processing facility; and
    calculating a processing cost for the processing based on the processing time, the material cost and processing cost information including a unit machining cost of the processing facility stored in a memory, to determine the part processing cost; and
    comparing the calculated processing cost with a predetermined model processing cost
    wherein the model processing cost is a model manufacturing cost determined using the equation: model cost=$\Sigma K_{mi} * T_i$, where $K_{mi}$ manufacturing cost and $T_i$ is a processing time.

24. A computer readable medium storing computer instructions for performing the steps:
    designating a processing facility to process the material according to the designated contents of the processing;
    calculating a material cost based on diameter measurements, roughness measurements, width tolerances, tolerances of the dimension of a cut portion and total length of the material;

calculating a processing time to be spent for performing the processing on the material using the processing facility according to the designated contents of the processing;

calculating a processing cost for the processing based on the processing time, the material cost and processing cost information including a unit machining cost of the processing facility and stored in a memory, to determine the part processing cost, wherein said processing time further includes operating time expended in actually operating a processing facility to pr6cess the material and to set-up the processing facility; reading an additional processing cost other than the processing cost of the part;

adding the part processing cost and additional processing cost to estimate the manufacturing cost of the part; and comparing the estimated manufacturing cost of the part with a predetermined model processing cost, wherein the model processing cost is a model manufacturing cost determined using the equation: model cost=$\Sigma K_{mi} * T_i$, where $K_{mi}$ manufacturing cost and $T_i$ is a processing time.

* * * * *